(12) United States Patent
Yamada et al.

(10) Patent No.: US 7,825,996 B2
(45) Date of Patent: Nov. 2, 2010

(54) APPARATUS AND METHOD FOR VIRTUAL RETINAL DISPLAY CAPABLE OF CONTROLLING PRESENTATION OF IMAGES TO VIEWER IN RESPONSE TO VIEWER'S MOTION

(75) Inventors: Shoji Yamada, Konan (JP); Yasufumi Mase, Chita-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1069 days.

(21) Appl. No.: 11/413,046

(22) Filed: Apr. 28, 2006

(65) Prior Publication Data

US 2006/0197832 A1  Sep. 7, 2006

Related U.S. Application Data

(63) Continuation-in-part of application No. PCT/JP2004/016025, filed on Oct. 28, 2004.

(30) Foreign Application Priority Data

Oct. 30, 2003  (JP) .............................. 2003-370842
Mar. 11, 2004  (JP) .............................. 2004-068889

(51) Int. Cl.
*H04N 5/64*  (2006.01)
*H04N 7/00*  (2006.01)

(52) U.S. Cl. .......................... 348/744; 348/115; 345/8; 359/632

(58) Field of Classification Search .................. 348/744, 348/51, 52, 53, 115, 750, 755, 757, 759; 345/8; 600/558; 359/630, 632
See application file for complete search history.

(56) References Cited

U.S. PATENT DOCUMENTS 4,849,692 A  7/1989  Blood
4,884,219 A * 11/1989  Waldren ........................ 345/8

(Continued)

FOREIGN PATENT DOCUMENTS

JP  B2 61-059132  12/1986

(Continued)

OTHER PUBLICATIONS

Japanese Patent Office, Notice of Reasons for Rejection mailed May 11, 2010 in Japanese Patent Application No. 2004-068889 w/English-language Translation.

*Primary Examiner*—M. Lee
(74) *Attorney, Agent, or Firm*—Oliff & Berridge, PLC

(57) ABSTRACT

An apparatus is disclosed which projects light onto a retina of a viewer, to thereby allow the viewer to perceive a display object via a virtual image. The apparatus includes: an emitter emitting light; a modulator modulating the light; a display unit outputting the modulated light to the retina of the viewer through an exit of the display unit, to thereby display in an image display region an image representative of the display object in the form of a virtual image; and a controller controlling the emitter and the modulator so that the image is displayed in the image display region. The controller detects a relative motion of the viewer with respect to a position of the viewer, and performs at least one of control of a display/non-display status of the image, and control of a display position of the image, in accordance with the detected relative motion.

28 Claims, 27 Drawing Sheets

U.S. PATENT DOCUMENTS

| | | | |
|---|---|---|---|
| 5,579,026 A | 11/1996 | Tabata | |
| 5,781,165 A | 7/1998 | Tabata | |
| 5,844,530 A | 12/1998 | Tosaki | |
| 5,889,577 A | 3/1999 | Kohayakawa | |
| 5,917,460 A | 6/1999 | Kodama | |
| 6,120,461 A * | 9/2000 | Smyth | 600/558 |
| 6,388,638 B2 | 5/2002 | Fukushima et al. | |

FOREIGN PATENT DOCUMENTS

| | | |
|---|---|---|
| JP | A 03-096913 | 4/1991 |
| JP | A 05-199996 | 8/1993 |
| JP | A-06-121256 | 4/1994 |
| JP | A 06-289318 | 10/1994 |
| JP | A 07-095498 | 4/1995 |
| JP | A 07-167618 | 7/1995 |
| JP | A 07-261112 | 10/1995 |
| JP | A 07-298165 | 11/1995 |
| JP | A 07-303225 | 11/1995 |
| JP | A 08-021975 | 1/1996 |
| JP | A 08-123979 | 5/1996 |
| JP | A 08-160349 | 6/1996 |
| JP | A 08-220470 | 8/1996 |
| JP | A 08-328512 | 12/1996 |
| JP | A-09-284675 | 10/1997 |
| JP | A 10-093889 | 4/1998 |
| JP | B2 2874208 | 1/1999 |
| JP | A 11-095155 | 4/1999 |
| JP | A 11-271666 | 10/1999 |
| JP | A 2004-255074 | 9/2004 |

* cited by examiner

DISPLAY COORDINATE SYSTEM

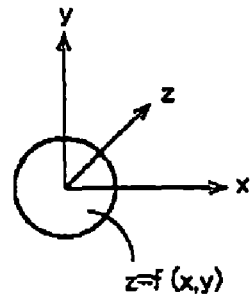

z=f(x,y)

DEFINITION COORDINATE SYSTEM

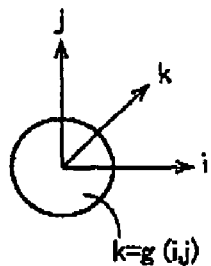

k=g(i,j)

REFERENCE COORDINATE SYSTEM

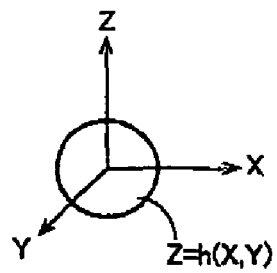

Z=h(X,Y)

HEAD-MOUNTED-UNIT-BASED DISPLAY MODE $$\begin{bmatrix} x \\ y \\ z \end{bmatrix} = \begin{bmatrix} OTM1 \end{bmatrix} \begin{bmatrix} i \\ j \\ k \end{bmatrix} \quad \cdots (1)$$

MIDDLE-MOUNTED-UNIT-BASED DISPLAY MODE $$\begin{bmatrix} X \\ Y \\ Z \end{bmatrix} = \begin{bmatrix} CTM2 \end{bmatrix} \begin{bmatrix} i \\ j \\ k \end{bmatrix} \quad \cdots (2)$$

$$\begin{bmatrix} x \\ y \\ z \end{bmatrix} = \begin{bmatrix} CTM3 \end{bmatrix} \begin{bmatrix} X \\ Y \\ Z \end{bmatrix} \quad \cdots (3)$$

FIG.27

APPARATUS AND METHOD FOR VIRTUAL RETINAL DISPLAY CAPABLE OF CONTROLLING PRESENTATION OF IMAGES TO VIEWER IN RESPONSE TO VIEWER'S MOTION

CROSS-REFERENCE TO RELATED APPLICATIONS

This application is based on Japanese Patent Applications No. 2004-68889 filed Mar. 11, 2004 and No. 2003-370842 filed Oct. 30, 2003, and International Application No. PCT/JP2004/16025 filed Oct. 28, 2004, the contents of which are incorporated hereinto by reference.

This is a continuation-in-part application of International Application No. PCT/JP2004/016025 filed Oct. 28, 2004, now pending, which was published in Japanese under PCT Article 21(2).

BACKGROUND OF THE INVENTION

1. Field of the Invention

The invention relates to techniques of projecting light onto a retina of a viewer, to thereby allow the viewer to perceive a display object via a virtual image, and more particularly to techniques of controlling presentation of images to the viewer to reflect a motion of the viewer.

2. Description of the Related Art

There are already known systems, as referred to "virtual retinal display systems," for projecting light onto a retina of a viewer, to thereby allow the viewer to perceive a display object via a virtual image. See, for example, Japanese Patent Application Publication No. HEI 8-21975.

Typically, such systems are configured to include: (a) an emitter emitting light (e.g., a light source or the like); (b) a modulator modulating the light (e.g., an intensity modulator, a wavefront-curvature modulator, etc.); (c) a display unit outputting the modulated light to the retina of the viewer through an exit of the display unit, to thereby display in an image display region an image representative of a display object (e.g., a content or a group of contents, an object or a group of objects, etc.) in the form of a virtual image; and (d) a controller controlling the emitter and the modulator so that the image is displayed in the image display region.

One type of such display systems is a head-mounted display system having a display unit which is mounted on the head of a viewer in operation. One of conventional techniques of the head-mounted display system is disclosed in the above-mentioned Japanese Patent Application Publication No. HEI 8-21975.

A head-mounted display system may be configured to include a display unit for displaying a desired image with respect to the position of the display unit by treating the position of the display unit as a position reference for display. The thus-configured display system, in operation, enables a viewer to perceive a desired image at a fixed position without being affected by a viewer's motion, within an image display region (which is fixed with respect to the head position of the viewer).

That is to say, the above head-mounted display system operates the display unit to enable the viewer to perceive the desired image in fixed relation to the display unit, i.e., with a display position of the desired image being fixed within the viewer's field of view.

When the above head-mounted display system is also of a see-through type, a viewer is allowed to view a displayed image together a real outside world, with the displayed image being superimposed on the real outside world. If this head-mounted display system is configured, as discussed above, so as to allow the viewer to perceive the displayed image at a fixed position within the viewer's field of view, then the displayed image is fixed in position within the viewer's field of view, without being affected by a viewer's motion (e.g., changes in position of the viewer's body, movement of the viewer's head), within an image display region (which is fixed with respect to the head position of the viewer).

For these reasons, a viewer who essentially finds it natural that any images be viewed in fixed relation to a real outside world would feel unnaturalism in viewing a displayed image being formed in fixed relation not to the real outside world but to the view's field of view.

In contrast, a display system disclosed in the above-mentioned Japanese Patent Application Publication No. HEI 8-21975, is configured to display an image so as to allow a viewer to perceive the displayed image in fixed relation to a real outside world, in accordance with a relative position relation between the head position of the viewer and the real outside world.

BRIEF SUMMARY OF THE INVENTION

Having studied the above-described head-mounted display system with respect to the relation between the viewer's motion or movement and favorable presentation of images to the viewer, the present inventor found the capability of controlling the presentation of images to the viewer, by detecting the viewer's motion with respect to the viewer's position by treating the viewer's position as a position reference for display, and subsequently by referring to the detected viewer's motion.

It is therefore an object of the present invention to provide, based on the above findings, novel techniques of projecting light onto a retina of a viewer, to thereby allow the viewer to perceive a display object via a virtual image, and more particularly of controlling the presentation of images to the viewer to reflect a viewer's motion.

According to a first aspect of the present invention, there is provided an apparatus for projecting light onto a retina of a viewer, to thereby allow the viewer to perceive a display object via a virtual image.

The apparatus comprises: an emitter emitting light; a modulator modulating the light; a display unit outputting the modulated light to the retina of the viewer through an exit of the display unit, to thereby display in an image display region an image representative of the display object in the form of a virtual image, the display unit being mounted on a head of the viewer in operation; and a controller controlling the emitter and the modulator so that the image is displayed in the image display region.

The controller detects a relative motion of a selected segment (e.g., the head, the arm, etc.) of the viewer with respect to a position of the viewer by treating the position of the viewer as a position reference for display, and performs display control which includes at least one of control of a display/non-display status of the image, and control of a display position of the image, in accordance with the detected relative motion.

According to a second aspect of the present invention, there is provided a method of projecting light onto a retina of a viewer, to thereby allow the viewer to perceive a display object via a virtual image.

The method comprises the steps of: emitting light; modulating the light; causing a display unit to output the modulated light to the retina of the viewer through an exit of the display unit, to thereby display in an image display region an image representative of the display object in the form of a virtual image, the display unit being mounted on a head of the viewer in operation; and controlling the emitter and the modulator so that the image is displayed in the image display region.

The step of controlling includes: detecting a relative motion of the viewer with respect to a position of the viewer by treating the position of the viewer as a position reference for display; and performing display control which includes at least one of control of a display/non-display status of the image, and control of a display position of the image, in accordance with the detected relative motion.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 27 is a view for explaining about the coordinate conversion employed in the first embodiment.

DETAILED DESCRIPTION OF THE INVENTION

Figure 1:
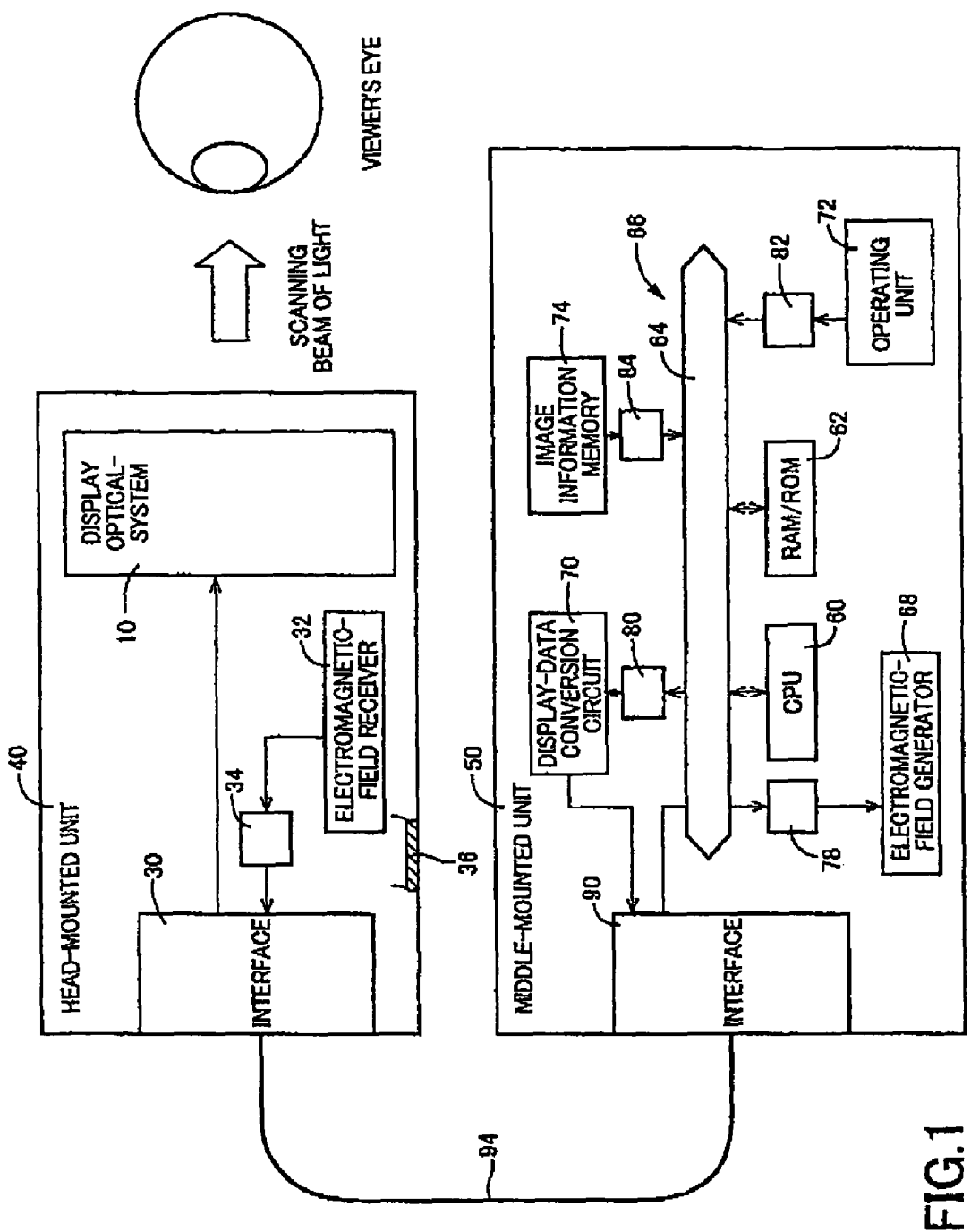
FIG. 1 is a block diagram schematically illustrating a display system constructed according to a first embodiment of the present invention.

The object mentioned above may be achieved according to any one of the following modes of this invention.

These modes will be stated below so as to be sectioned and numbered, and so as to depend upon the other mode or modes, where appropriate. This is for a better understanding of some of a plurality of technological features and a plurality of combinations thereof disclosed in this description, and does not mean that the scope of these features and combinations is interpreted to be limited to the scope of the following modes of this invention.

That is to say, it should be interpreted that it is allowable to select the technological features which are stated in this description but which are not stated in the following modes, as the technological features of this invention.

Furthermore, stating each one of the modes of the invention in such a dependent form as to depend from the other mode or modes does not exclude the possibility that the technological features set forth in a dependent-form mode become independent of those set forth in the corresponding depended mode or modes and to be removed therefrom. It should be interpreted that the technological features set forth in a dependent-form mode is allowed to become independent, where appropriate.

(1) An apparatus for projecting light onto a retina of a viewer, to thereby allow the viewer to perceive a display object via a virtual image, the apparatus comprising:

an emitter emitting light;

a modulator modulating the light;

a display unit outputting the modulated light to the retina of the viewer through an exit of the display unit, to thereby display in an image display region an image representative of the display object in the form of a virtual image, the display unit being mounted on a head of the viewer in operation; and a controller controlling the emitter and the modulator so that the image is displayed in the image display region, wherein the controller detects a relative motion of the viewer with respect to a position of the viewer by treating the position of the viewer as a position reference for display, and performs display control which includes at least one of control of a display/non-display status of the image, and control of a display position of the image, in accordance with the detected relative motion.

A viewer, when uses a display system of a type that allows the viewer to perceive a display object via a virtual image, by projecting light onto a retina of the viewer, may wish, for example, to transitorily interrupt an image display operation, for avoiding a displayed image in an image display region from obstructing the viewer's view, or to change a display position at which the displayed image is located within the image display region, while maintaining a desired relation between the display position and the viewer's motion.

These wishes may be fulfilled by, for example, transitorily causing the displayed image disappear out of the image display region, or causing the viewer to perceive the displayed image as if it were fixed in position to a selected segment (e.g., the middle (e.g., the waist, the abdomen, the buttock, etc.) of the viewer's body). These wishes may be also fulfilled by changing the display position of the displayed image within the image display region from a normal position (e.g., a central position) to an evacuated position disposed away from the normal position (e.g., somewhere near the edge of the image display region).

Therefore, the display system may be configured to include an operating member to be manually operated by the viewer, which allows the viewer to enter into the display system, for example, a command instructing the display system to transitorily stop (deactivate) a display operation of an image (or otherwise, a command instructing the display system to restart (activate again) a display operation of an image which had been transitorily stopped), or a command instructing the display system to change the display position of the displayed image from the normal position to the evacuated position (or otherwise, a command instructing the display system to return the display position to the normal position).

A display system incorporating the above operating member, in operation, upon detecting a viewer's manual operation of the operating member, may perform, in response to the detection, at least one of (a) switching of a display/non-display status of an image between a visible status and an invisible status, and (b) alternation of a display position of an image.

However, the above arrangement unavoidably requires the viewer to use the viewer's hand for operating the operating member. It follows that a viewer's viewing an image while performing a separate manual work entails unintended transitory interruption of the separate manual work.

In addition, as the operating member is altered in position, there moves a target position to which the viewer is required to move the viewer's hand for operating the operating member. As a result, each time the viewer attempts to manually operate the operating member, the viewer is required, prior to the manual operation, to visually or tactually seek a current position of the operating member, and to then move the viewer's hand toward the sought position of the operating member, eventually causing the viewer to feel tedious.

In contrast, the apparatus according to the above mode (1) is operated such that the viewer's motion is detected with respect to the viewers position, and such that the display control is performed which includes at least one of control of a display/non-display status of the image, and control of a display position of the image, in accordance with the detected viewer's motion.

The apparatus according to the above mode (1) would therefore make it inessential to incorporate such an operating member into the apparatus for detecting viewer's requests such as described above with respect to a display operation of an image (e.g., control of a display/non-display status of an image, alternation of a display position of an image).

Further, the apparatus according to the above mode (1) would also make it inessential for the viewer to manually operate such an operating member for entry of such requests into the apparatus.

For these reasons, the apparatus according to the above mode (1) may be practiced in an arrangement allowing entry of viewer's requests on image display operation into the apparatus, without causing unintended interruption of a viewer's manual work which is to be conducted in parallel while the viewer is using the apparatus.

Further, the apparatus according to the above mode (1) would isolate a required motion of the viewer for entry of requests on image display operation into the apparatus, from a variable position of the apparatus (e.g., a variable position of an operating member). As a result, entry of viewer's requests on image display operation is enabled without requiring the viewer to seek a specified physical target (e.g., an operating member in the form of a button, a switch, a dial, a touch panel, etc.), and to then behave to reach the physical target.

Therefore, the apparatus according to the above mode (1) would make it easier to simplify or standardize a required motion of the viewer for viewer's entry of requests on image display operation.

In the apparatus according to the above mode (1), the viewer's motion referred to by the apparatus for identifying the viewer's requests on image display operation is detected with respect to the position of the viewer (the position of a reference segment of the viewer's body). As a result, the viewer's motion detected for identifying the viewer's requests is not affected by the viewer's position relative to an absolute space or a real outside world.

Therefore, this apparatus would allow hardware construction of this apparatus for detecting the viewer's motion to be organized on the side of the viewer in a self-supporting manner. That is to say, this apparatus would eliminate disposition of the hardware construction for detection at somewhere in a real outside world. This is conducive to constitutional simplification of the hardware construction for detecting the viewer's motion.

The "modulator" set forth in the above mode (1) may be configured, for an arrangement in which a target composite light-beam is formed by combining a plurality of light-beam components different in wavelength, such that the modulator modulates the intensity of each light-beam component and optionally the curvature of wavefront of each light-beam component or the combined light-beam. That is to say, the "modulator" is not essential to be configured so as to modulate a curvature of wavefront.

An example of the "emitter" set forth in the above mode (1) may be a laser light source. An example of the laser light source may be a light source capable of modulating the intensity of outgoing light, such as a semiconductor laser. This light source functions as both the "emitter" and the "modulator."

In addition, the "control of a display position" set forth in the above mode (1) may be interpreted to mean alternation of a display position of an image within an image display region, for example.

(2) The apparatus according to mode (1), further comprising a detector detecting a relative position of a to-be-detected segment of a human body of the viewer, with respect to a reference segment of the human body, wherein the to-be-detected segment is selected from a plurality of segments constituting the human body which are displaceable relative to each other, for detection of a motion of the to-be-detected segment, and wherein the reference segment is selected from the plurality of segments for establishment of a reference position related to the human body, and wherein the controller performs the display control based on the detected relative position.

The apparatus according to the above mode (2) performs the display control set forth in the previous mode (1), in accordance with the relative position between selected ones of the plurality of segments making up the viewer's body.

The "reference position" set forth in the above mode (2) may be defined as a position on a selected one of segments making up the viewer's body, or as a position, although is separate from the selected segment, which is in fixed geometrical relation to the selected segment, for example.

(3). The apparatus according to mode (2), wherein the detector includes first and second portions which are displaceable relative to each other, the first portion being attached to the to-be-detected segment for allowing integral movement therewith, the second portion being attached to the reference segment for allowing integral movement therewith, and wherein the detector further includes a detecting device detecting a relative position between the first and second portions.

In the apparatus according to the above mode (3), the detector for detecting the viewer's motion, because of attachment to the viewer's body, is not required to employ any components disposed in a real outside world (e.g., a sensor disposed on an anchored structure such as a floor, a wall, etc.).

Therefore, this apparatus would not require great limits on an allowable range within which the viewer is allowed to move around while assuring the viewer's regular viewing of a displayed image using the same apparatus. That is to say, this apparatus would promote increase in a range within which the viewer is allowed to move while viewing a displayed image through the same apparatus, resulting in enhancement in the mobility of this apparatus.

The "detecting device" set forth in the above mode (3) may be of a type in which the relative position between the first and second positions is detected by employing at least one of electric field, magnetic field, electromagnetic wave, light, and sound wave.

(4) The apparatus according to mode (3), wherein one of the first and second portions functions as a signal generator generating a detection signal for use in detection of the relative position between the first and second portions, and wherein a remainder of the first and second portions functions as a receiver receiving the generated detection signal which propagates through space.

In the apparatus according to the above mode (4), the detector is adapted to detect the relative position between the first portion moving integrally with the to-be-detected segment of the viewer's body, and the second portion moving integrally with the reference segment of the viewer's body, using a signal propagating through space. Thus, the detection does not require interconnection between the first and second portions, via a motion mechanism such as a linkage mechanism, or a tangible signal-transmissive-medium such as a cable, a wire, etc.

Therefore, the apparatus according to the above mode (4) would not limit an allowable range within which the relative position between the first and second portions included in the detector is allowed while achieving the goal of detecting the viewer's motion, eventually resulting in no limits on an allowable range within which the viewer's motion is allowed to change.

The "detection signal" set forth in the above mode (4) may be, for example, electric field, magnetic field, electromagnetic wave, light, sound wave, etc.

(5) The apparatus according to any one of modes (1) through (4), wherein the controller activates the display control, upon satisfaction of the motion of the viewer with a predetermined condition, based on the detected relative motion.

An example of the "predetermined condition" set forth in the above mode (5) may be a condition relating to the orientation of the viewer's head, under which the head is oriented in a direction deviated from a direction allowing the viewer to look ahead (e.g., the viewer turns his or her head away, or moves his or her head down).

An alternative example of the "predetermined condition" may be a condition relating to the motion of the viewer's hand or hands, under which the viewer raises up his or her hand or hands to a given position.

The apparatus according to the above mode (5) is not essentially configured such that the determination as to whether or not the viewer wishes the image display operation to be performed necessarily depends on the presence or absence of the viewer's motion for deviating the view direction away from a normal direction (e.g., rotating the viewer's eyeball, turning his or her head).

In an arrangement of the apparatus according to the above mode (5), the predetermined condition includes the following first and second predetermined conditions.

In the above arrangement, if the viewer's motion meets the first predetermined condition, then there is performed at least one of (a) switching the display status of an image from an ON state (a display (visible) state) into an OFF state (a non-display (invisible) state), thereby transitorily interrupting an image display operation, and (b) alternation of the display position of the image from the normal position to the evacuated position.

On the other hand, if the viewer's motion meets the second predetermined condition, then there may be performed (a) switching the display status of an image from an OFF state into an ON state, thereby restarting an image display operation, and (b) displaying an image as if, for example, its display position were in fixed relation to a selected one of segments of the viewer's body (e.g., the middle segment) for stabilized image-presentation even in motion of the viewer's head. In this case, there may be alternatively or additionally performed return of the display position of the image from the evacuated position to the normal position.

(6) The apparatus according to any one of modes (2) through (5), wherein the plurality of segments include the head, and an upper limb, a lower limb, and a middle, of the viewer, wherein the head, optionally with at least one of the upper limb, and the lower limb, is assigned as the to-be-detected segment, and wherein the middle is assigned as the reference segment.

A plurality of segments constituting the viewer's body include, at least one segment which is moved relatively distinguishably by the viewer, to which there belong the head, the upper limb, and the lower limb, of the viewer's body, for example, while including at least one segment which is relatively stable in position irrespective of changes in the viewer's attitude, to which there belongs the middle of the viewer's body, for example. At least one segment which is moved integrally with the viewer's eyes includes the head.

Based on the above findings, the apparatus according to the above mode (6) is configured such that the head, optionally with at least one of the upper and lower limbs, is assigned as the to-be-detected segment, and such that the middle of the viewer is assigned as the reference segment.

(7) The apparatus according to any one of modes (2) through (6), wherein the controller controls the emitter and the modulator so as to allow the viewer to perceive the image at a position predetermined with respect to the reference segment.

Typically, for a display system configured to causing a display unit to display an image with respect to the position of the display unit, any motion of the viewer would not change a relative position between the viewer's head and the display unit, resulting in the viewer viewing the displayed image at the same position within an image display region (fixed with respect to the viewer's head), without being affected by a motion of the viewer.

In addition, for a see-through display system, which allows a viewer to perceive a displayed image together with a real outside world, with the displayed image being superimposed on the real outside world, there is the possibility that the viewer focuses on a certain object present in the real outside world, for and during a given work, with a display unit of the display system being mounted on the viewer's head.

For such a work, there is proposed for enabling, during the work, visual reference to information relevant to the work, an arrangement in which the relevant information is displayed in the form of an image on the image display region. In this arrangement, once the relevant information is displayed, the displayed image is superimposed on the above-mentioned certain object, creating the risk that the displayed image will obstruct at least partially the view of the object to be viewed.

In addition, in some cases, a viewer wishes to view the above relevant information in a given position in which the viewer has shifted its view direction away from the certain object. An example of such a given position is one in which a viewer moves his or her head down enough to see his or her middle. An alternative example is one in which a viewer turns his or her head to look aside partially or fully.

A still alternative example is one in which a viewer bends his or her head to look a segment (ante-brachium) of the upper limb of the viewer's body, wherein the segment is located between the wrist joint and the elbow joint of the upper limb. More specifically, in this position, the viewer bends his or her elbow so that the segment (ante-brachium) may extend substantially horizontally in front of the viewer's upper extremity.

In contrast, for the apparatus according to the above mode (7), in operation, an image is displayed not with respect to the position of the display unit, but with respect to the position of the viewer, which is to say, the reference segment of the viewer's body.

Therefore, for the apparatus according to the above mode (7), once any motion of the viewer causes a change in the relative position between the to-be-detected segment (e.g., the head) and the reference segment (e.g., the middle, the upper limb), the display/non-display status of an image in the image display region may be changed in accordance with the viewer's motion, and further, while the image is in a display state or ON state, the display position of an image displayed in the image display region may be changed in accordance with the viewer's motion.

More specifically, for example, in an example where the head is assigned as the to-be-detected segment, and the middle is assigned as the reference segment, an image is allowed to be displayed only when the viewer gazes at the middle. In an alternative example where the head is assigned as the to-be-detected segment, and the upper limb is assigned as the reference segment, an image is allowed to be displayed only when the viewer gazes at the upper limb.

In both examples, while an image is in a display state or ON state, the display position of the displayed image varies with the relative position between the head and the middle or the upper limb.

In addition, when the viewer's motion is detected with respect to the position of a stable segment (e.g., the middle) of the viewer's body, which is stable in position independently of the viewer's motion, no relative displacement between the viewer's stable segment and a real outside world is caused, whether the viewer's motion is present or not.

Therefore, a technique of detecting the viewer's motion with respect to the position of such a stable segment, and of then controlling the display position of a displayed image with respect to the viewer's position, in accordance with the detected viewer's motion, is equivalent to controlling the display position (conceptually, including a potential display position at which an image is not currently displayed but will be displayed, in the image display region), in accordance with the relative positional relation between the viewer's motion and a real outside world, in that an image is presented to the external in a stable manner, even if the viewer's head moves.

In an embodiment of the apparatus according to the above mode (7), determining the display position (conceptually, including a potential display position at which an image is not currently displayed but will be displayed, in the image display region), in accordance with the viewer's motion automatically means determining whether or not an image will be displayed in the image display region, in accordance with the viewer's motion.

That is to say, in this embodiment, determining the display position of an image, in accordance with the viewer's motion, and determining whether or not an image will be displayed, in accordance with the viewer's motion are not independent of each other, but are correlated with each other.

However, in an alternative embodiment of the apparatus according to the above mode (7), which is adapted such that, once the display position has been determined in accordance with the viewer's motion, then the image comes to be actually displayed in the image display region, after the viewer provides separate indication (e.g., the viewer's manual operation of an operating member, such as a switch).

In this embodiment, motion of a viewer for allowing the determination of the display position of an image, and indication provided by the viewer for finalized authorization of displaying an image are independent of each other.

(8) The apparatus according to any one of modes (1) through (7), wherein the controller uses, for allowing the viewer to perceive the image in the image display region, (a) a definition coordinate system for use in defining the display object, and (b) a display coordinate system for use in defining the image to be displayed in the image display region, the display coordinate system being fixed with respect to the display unit, wherein the controller detects a relative relationship between a position and orientation of the head of the viewer and a reference coordinate system which is predetermined so as to be related to the human body, wherein the controller converts definition data which defines the display object with respect to the definition coordinate system, into display data for displaying the image with respect to the display coordinate system, so as to reflect the detected relative relationship, and wherein the controller controls the emitter and the modulator based on the display data.

In the apparatus according to the above mode (8), the definition data defining the display object with respect to the definition coordinate system is converted into the display data for displaying the image with respect to the display coordinate system, so as to reflect the relative relationship between the position and the orientation of the viewer's head, and the reference coordinate system which is predetermined so as to be geometrically related to the viewer's body.

In this apparatus, the emitter and the modulator are controlled based on the display data.

Therefore, this apparatus would determine a position at which an image is displayed in the image display region, in accordance with the motion related to the viewer's head. Because, in this context, the "position to be determined" conceptually encompasses a potential position at which an image is not currently displayed but will be displayed, in the image display region, this apparatus would also determine whether or not an image is displayed in the image display region, in accordance with the motion related to the viewer's head.

(9) The apparatus according to mode (8), wherein the controller converts display-object data defining the display object with respect to the definition coordinate system, into the display data defined in the display coordinate system, and wherein the definition coordinate system is fixed with respect to the display coordinate system.

In the apparatus according to the above mode (9), in order to implement a viewer-based display mode (one of examples of operation modes), as described in more detail below, in which an image is displayed to allow a viewer to view the displayed image at a position predetermined with respect to the viewer's position, the definition data, i.e., the display-object data defining the display object with respect to the definition coordinate system is converted into the display data for displaying the image with respect to the display coordinate system, so as to reflect the relative relationship between the position and orientation of the viewer's head, and the reference coordinate system which is predetermined so as to be geometrically related to the viewer's body.

For example, for the viewer to continuously perceive an image at the same position in an absolute space, irrespective of any possible relative displacement of the viewer's head relative to the viewer's middle (e.g., the viewer's waist), the above coordinate conversion may be performed such that the definition data is converted into the display data in a direction and by an amount allowing the apparent cancellation of an actual relative displacement between the head and the middle.

This apparatus may implement, instead of the viewer-based display mode, a display-unit-based display mode, as described in more detail below, in which an image is displayed to allow a viewer to view the displayed image at a position predetermined with respect to the position of the display unit of this apparatus. In this case, there is no substantial coordinate transformation for the definition data.

Once the apparatus according to the above mode (9) implements the display-unit-based display mode, the definition data defining the display object with respect to the definition coordinate system, is apparently mapped onto the display coordinate system. As a result, the display data for displaying the image with respect to the display coordinate system is obtained to be identical with the above definition data.

(10) The apparatus according to mode (8), wherein the controller converts display-object data defining the display object with respect to the definition coordinate system, into the display data defined in the display coordinate system, and wherein the definition coordinate system is fixed with respect to the reference coordinate system.

This apparatus would display an image as if it were fixed with respect to the reference coordinate system, because of the equivalency between the definition coordinate system and the reference coordinate, and as a result of a required substantial coordinate transformation being performed.

In this apparatus, the display-object data or the definition data, which is original data expressed based on the definition Coordinate system, is converted into the display data for displaying the corresponding image with respect to the display coordinate system, in accordance with the relative relationship between the position and the orientation of the viewer's head, and the reference coordinate system which is predetermined to be geometrically related to the viewer's body.

As a result, this means that the display-object data or the definition data defined in the definition coordinate system is mapped onto the display coordinate system.

In addition, a plurality of segments organizing the human body include a segment reluctant to vary in position with changes in attitude of the human body, which is, for example, the middle (e.g., the waist, the abdomen, the buttock, etc.) of the human body.

Therefore, when it is needed to detect the position and the orientation of the head of the human body with respect to the position of the human body, it is more preferable to detect the position and the orientation of the head with respect to the position of the middle.

Accordingly, in an example where a display system is configured to display an image to a viewer in geometrical relation to the position of the viewer's middle, the display system determines, based on the relative geometrical relationship between the middle and the head, whether or not the viewer is allowed to view the image. When it has been determined that the viewer is allowed to view, then the display apparatus further determines a position at which the viewer views the image.

In this regard, for enabling a display system to display an image with respect to the position of the viewer's middle, and to detect the position and the orientation of the viewer's head with respect to the position of the viewer's middle, it suffices that the reference coordinate system and the definition coordinate system are both fixed with respect to the viewer's middle. This means that the reference coordinate system serves as the definition coordinate system, and vice versa.

In view of the above findings, the apparatus according to the above mode (10) is provided.

(11) The apparatus according to mode (8), wherein the controller converts display-object data defining the display object with respect to the definition coordinate system, into the display data defined in the display coordinate system, and wherein the definition coordinate system is fixed with respect to a third coordinate system which is different from the reference coordinate system and the display coordinate system, and which is related to any one of a plurality of segments constituting the human body of the viewer.

In an example where a display system is needed to display an image with respect to the position of the viewer's upper limb (e.g., the arm), and to detect the position of the viewer's upper limb wither respect to the viewer's middle, it is possible that, for example, the definition coordinate system is fixed with respect to the viewer's upper limb, while the reference coordinate system is fixed with respect to the viewer's middle.

This example is one of situations where the reference coordinate system is identical with none of the definition coordinate system and the display coordinate system.

In view of the above findings, the apparatus according to the above mode (11) is provided.

(12) The apparatus according to any one of modes (8) through (11), wherein the reference coordinate system is defined using any one of (a) a combination of at least one set of position information indicative of at least one position of at least one point related to the human body, and at least two sets of orientation information indicative of orientations related to the at least one point; (b) a combination of at least two sets of position information indicative of positions of at least two points related to the human body, and at least one set of orientation information indicative of at least one orientation related to at least one of the at least two points; and (c) a combination of at least three sets of position information indicative of positions of at least three points related to the human body.

For uniquely defining any coordinate system in three-dimensional space, it suffices that coordinate values of three selected different points in the three-dimensional space are identified; a combination of coordinate values of two selected different points in the three-dimensional space, and one selected orientation (e.g., the direction of one selected coordinate axis) of the coordinate system to be defined is identified; or a combination of coordinate values of one selected point in the three-dimensional space, and two selected different orientations (e.g., the directions of two selected different coordinate axes) of the coordinate system to be defined.

It is added that, for detecting an orientation related to each point, it is possible to refer to the direction of gravity acting on each point. Where a coordinate system to be defined is related to a segment of the human body, the segment has mass, and gravity acts anything on the earth. The direction of gravity is a relatively easily detectable quantity.

Based on the findings described above, in the apparatus according to the above mode (12), the reference coordinate system set forth any one of the preceding modes (8) through (11) is defined using any one of (a) a combination of at least one set of position information indicative of at least one position of at least one point related to the human body, and at least two sets of orientation information indicative of orientations related to the at least one point; (b) a combination of at least two sets of position information indicative of positions of at least two points related to the human body, and at least one set of orientation information indicative of at least one orientation related to at least one of the at least two points; and (c) a combination of at least three sets of position information indicative of positions of at least three points related to the human body.

The "point or points related to the human body" set forth in the above mode (12) may be interpreted to mean a point or points located on the human body, or mean a point or points located on a physical object in generally fixed relation to the human body (e.g., an auxiliary tool attached to the human body).

The above-mentioned physical object may be, for example, an article held with the human hand in use, or an article attached to a segment of the human body other than the hand in use.

Further, the above-mentioned physical object may be in the form of a unitary body to which a plurality of points are assigned commonly, or in the form of a set of a plurality of separate bodies, to which a plurality of points are assigned individually (singly) or severally (plurally), respectively.

(13) The apparatus according to any one of modes (8) through (11), wherein the reference coordinate system is defined using three sets of position information indicative of positions of three points related to a unitary segment of the human body.

The "three points" set forth in the above mode (13) are, for example, three points arrayed with equal distances along an outer circumference of a transverse cross-section of the human torso taken along a selected generally horizontal plane.

(14) The apparatus according to any one of modes (8) through (11), wherein the reference coordinate system is defined using both two sets of position information indicative of positions of two points related to a unitary segment of the human body, and orientation information indicative of a direction in which gravity acts on one point related to the unitary segment.

The "two points" set forth in the above mode (14) are, for example, two points geometrically related to the human middle, which are assigned to a left-hand side end point and a right-hand side end point, of the human middle; two points geometrically related to a segment (ante-branchium) of a selected one of the human left and right arms, which is located between the wrist joint and the elbow joint of the selected arm; or two points geometrically related to the human shoulder, which are assigned to a left-hand side end point and a right-hand side end point of the shoulder.

(15) The apparatus according to any one of modes (2) through (14), wherein the controller selects any one of a plurality of display modes including a viewer-based display mode for use in displaying the image such that the viewer perceives the image at a position predetermined with respect to the reference segment, and a display-unit-based display mode for use in displaying the image such that the viewer perceives the image at a position predetermined with respect to a position of the display unit, and wherein the controller displays the image in accordance with the selected display mode.

In the apparatus according to the above mode (15), a display mode to be implemented for displaying an image is selected from a plurality of display modes including a viewer-based display mode for use in displaying the image such that the viewer perceives the image at a position predetermined with respect to the reference segment; and a display-unit-based display mode for use in displaying the image such that the viewer perceives the image at a position predetermined with respect to the position of the display unit.

Therefore, this apparatus would allow alter the display mode for displaying an image in accordance with the viewer's request or a command issued from a separate apparatus, facilitating enhancement in easiness-to-use and versatility of this apparatus.

The "controller" set forth in the above mode (15) may be configured to select a desired display mode, for example, in accordance with the viewers command, or a command signal issued from a separate apparatus.

The "plurality of display modes" set forth in the above mode (15) may be organized to additionally include a real-outside-world-based display mode in which an image is displayed to allow the viewer to perceive the displayed image at a position predetermined with respect to the position of the real outside world.

(16) The apparatus according to mode (15), wherein the controller selects any one of the plurality of display modes in response to a command from the viewer.

The "command from the viewer" set forth in the above mode (16) may be issued, for example, by the viewer manually operating a specified switch, by the viewer conducting a specified motion (excluding a motion for operating a switch), or by the viewer uttering a specified voice. The specified motion may be in the form of, for example, a head's motion, a limb's motion, an eye's blinking, apupil's movement, etc.

(17) The apparatus according to any one of modes (1) through (16), of a see-through type allowing the viewer to perceive the image representative of the display object such that the image is overlaid onto a real outside world.

This apparatus controls the display of an image to the viewer in accordance with the viewer's motion. Therefore, this apparatus, which is a see through display system for use in an environment where the image is viewed by the viewer with the real outside world such that the displayed image is overlaid on the real outside world, would more easily eliminate the risk that the viewer may feel unnaturalism about the relation of the displayed image with the real outside world, resulting from the dependence of the displayed image on the viewer's motion.

Further, this apparatus would permit proper switching of a target on which the viewer is allowed to focus with emphasis (i.e., a target at which the viewer is allowed to gaze specially), between the displayed image, and a specified object in the real outside world, in accordance with the viewer's motion. This results in easier improvement in easiness-to-use of this apparatus.

(18) The apparatus according to any one of modes (1) through (17), of a retinal scanning type in which a beam of light is scanned on the retina of the viewer two-dimensionally, to thereby allow the viewer to perceive the image, wherein the modulator includes a wavefront-curvature modulating unit modulating a curvature of wavefront of the beam of light entering from the apparatus into a pupil of the viewer, on a frame-by-frame basis, for an image to be displayed which is made up of a succession of image frames, or on a sub-area-by-sub-area basis, for an image to be displayed which is made up of a succession of image frames, each of which is divided into a plurality of sub-areas.

In this apparatus, light for forming an image projected onto the viewer's retina is modulated with respect to curvature of wavefront, on a frame-by-frame basis, wherein the image is made up of a succession of image frames, or on a sub-area-by-sub-area basis, wherein the image is made up of a succession of image frames, and wherein each image frame is divided into a plurality of sub-areas.

Therefore, this apparatus would facilitate the display of an image with variable depth, or the stereoscopic display of an image.

Each of the "sub-areas" set forth in the above mode (18) may be, for example, each one of pixels organizing an image frame, a pixel group comprised of adjacent pixels on a frame of an image, etc.

(19) The apparatus according to any one of modes (1) through (18), wherein the image includes a plurality of objects which are displayed together in a stereoscopic manner, using a plurality of sets of image information including depth-position information for specifying a depth position of each object, and position-on-plane information for specifying a position of each object on a plane corresponding to the depth position of the same object, the apparatus further comprising:

a selector selecting one of the plurality of objects as a specified object; and an image processor performing image processing for modifying a display format in which the image is displayed, based on the depth-position information for the specified object which has been selected by the selector.

This apparatus, because of the capability of modifying a display format (i.e., a form, format, or type of visual representation, a viewing format, a viewing mode, etc.) in which a to-be-displayed image (i.e., a specified object) is displayed, based on the depth position of a selected displayed object or a specified object, allows the display of the to-be-displayed image in a variable display format varying with the depth position of the specified object, enabling, for example, the viewer to more clearly visually perceive the specified object.

(20) The apparatus according to mode (19), wherein the image processor performs the image processing such that the specified object which has been selected by the selector is displayed in a display format different from that of at least one non-specified object which is at least one remainder of the plurality of objects.

This apparatus would allow a specified object to be displayed in a display format different from that of at least one non-specified object, providing improvement in the flexibility of the display format of the specified object.

(21) The apparatus according to mode (19) or (20), wherein the selector includes a specified-object detector detecting as the specified object a focused object which is one of the plurality of objects that the viewer is focusing on.

This apparatus would allow the detection of a specified object on which the viewer is focusing, and also allow the processing for the displayed image based on the depth position of the detected specified object. This results in, for example, the viewer's clearer visual perception of the specified object.

(22) The apparatus according to mode (21), wherein the specified-object detector includes:

a view-direction detector detecting a view direction of the viewer; and a determining unit retrieving one of the plurality sets of image information which corresponds to the object located in the detected view direction, based on a detection result of the view-direction detector, the determining unit further determining the specified object based on the retrieved set of image information.

This apparatus, as a result of the detection of the view direction of the viewer, identifies the specified object on which the viewer is focusing.

(23) The apparatus according to mode (21), wherein the specified-object detector includes:

a view-direction detector detecting view directions of the viewer for left and right eyes of the viewer, respectively; and a calculator calculating a point at which the viewer has gazed, based on both the view directions for the left and right eyes detected by the view-direction detector, and a distance between the left and right eyes, the calculator further detecting the specified object based on a calculation result of the calculator.

This apparatus, as a result of utilization of the distance between the viewer's both eyes in addition to the view direction of the viewer, identifies the specified object on which the viewer is focusing, with improved precision.

(24) The apparatus according to any one of modes (19) through (23), further comprising a depth-position detector detecting the depth position of each object, based on the depth-position information, wherein the image processor performs the image processing such that the specified object, optionally with at least one separate object which is displayed at the same depth position as that of the specified object, is displayed in a display format different from that of at least one non-specified object which is displayed at a depth position different from that of the specified object.

This apparatus would allow non-specified object displayed at a different depth position from that of specified object, to be displayed in a different form from that of the specified object. This results in the viewer's clearer visual perception of the specified object.

(25) The apparatus according to any one of modes (19) through (24), wherein the image processor includes a section of varying a luminance of the specified object.

This apparatus allows the luminance of a specified object to be varied in accordance with the depth position of the specified object, enabling, for example, the viewer to more clearly visually perceive the specified object.

(26) The apparatus according to any one of modes (19) through (25), wherein the image processor includes a section of highlighting a boundary of the specified object.

This apparatus allows the visual clearness of the boundary of a specified object to vary with a varying depth position of the specified object. This therefore enables, for example, the viewer's clearer visual perception of the specified object.

(27) The apparatus according to any one of modes (19) through (26), wherein the image processor includes a section of adding a separate boundary image to the specified object along an outline of the specified object.

This apparatus allows the attachment of a separate boundary image to a specified object along an outline of the specified object, enabling, for example, the viewer's clearer visual perception of the specified object.

(28) The apparatus according to any one of modes (24) through (27), wherein the image processor includes a section of displaying transparently or semi-transparently a non-specified object located in front of the specified object.

This apparatus, as a result of the transparent or semi-transparent displaying of non-specified object in front of a specified object, would allow the viewer to more clearly visually perceive the specified object, without visual obstruction by the non-specified object located in front of the specified object.

(29) An apparatus for displaying an image, wherein a to-be-displayed image includes a plurality of objects to be displayed together, and wherein the plurality of objects are displayed in a stereoscopic manner, using a plurality of sets of image information including depth-position information for specifying a depth position of each object, and position-on-plane information for specifying a position of each object on a plane corresponding to the depth position of the same object, the apparatus comprising:

a selector selecting one of the plurality of objects as a specified object; and an image processor performing image processing for modifying a display format in which the image is displayed, based on the depth-position information for the specified object which has been selected by the selector.

Figure 26:
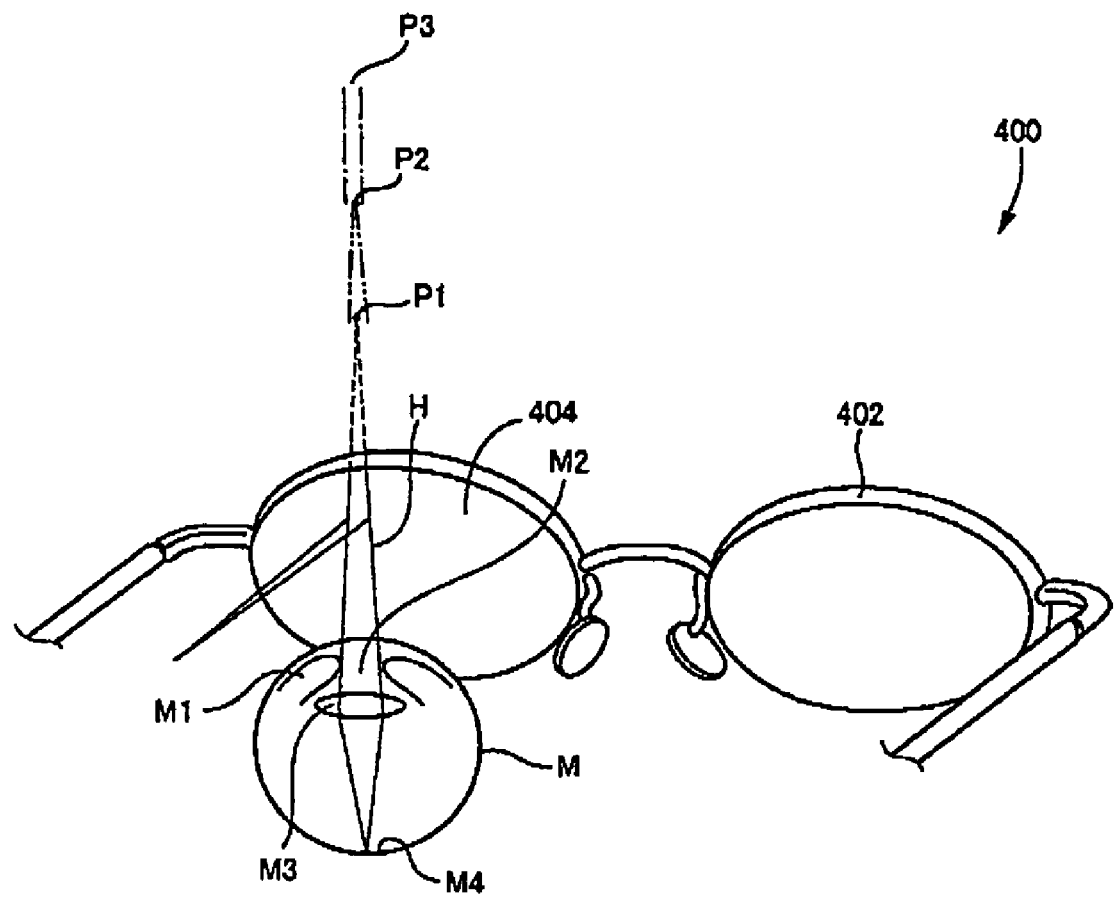
FIG. 26 is a perspective view for explaining an example of a conventional retinal scanning display.

As disclosed in Japanese Patent Application Publication No. HEI 11-271666, there is known retinal scanning display device for displaying a desired image directly on the retina of a viewer. As illustrated in FIG. 26, a conventional display device 400 is configured, for example, so as to modulate light in accordance with the image information, to direct the modulated light H to projection eyeglasses 402, and to scan the modulated light H, thereby allowing reflected light from a light-reflective area 404 of the projection eyeglasses 402 to optically render a desired image.

As illustrated in FIG. 26, once a viewer wears the projection eyeglasses 402, the modulated light H is reflected from an eyepiece of the projection eyeglasses 402, and then the reflected light is directed through a pupil M2 surrounded by an iris M1 of a viewer's eye M, subsequently impinging on a crystalline lens M3 for convergence. The converged light is scanned on a retina M4, thereby forming a desired image on the retina M4 of the viewer.

Such a retinal scanning display device, as disclosed in Japanese Patent No. 2874208, allows modification of the beam spread angle of the modulated light H, into different angles depicted in the broken lines, two-dotted lines, and dot-dash lines, respectively.

A position at which the viewer perceives a virtual image (a displayed image) is varied by modifying the beam spread angle of the modulated light H. The position is varied between positions P1, P2, and P3 as the beam spread angle changes. Therefore, such a retinal scanning display device allows the stereoscopic representation of a desired image as a result of the modification of the beam spread angle of the modulated light H.

Although the above retinal scanning display device allows the viewer to perceive a desired image in a stereoscopic manner, the viewer, when attempts to focus on a far subject for viewing, perceives a near subject fuzzily due to the near subject being out of focus, while the viewer, when attempts to focus on a near subject, perceive a far subject fuzzily due to the far subject being out of focus.

For example, in an aquarium holding a glass tank in which live bream is kept, a viewer, when attempts to view bream swimming in the glass tank at a short distance, naturally fuzzily perceives a far object for failure to focus on it. In addition, a viewer, when attempts to view bream swimming in the glass tank at a long distance, fuzzily perceives separate bream swimming in the glass tank at a short distance. This phenomenon is equivalent to that of the aforementioned retinal scanning display device.

In view of the circumstances described above, the purpose of the apparatus according to the above mode (29) is to provide an apparatus which allows the stereoscopic display of an image containing an object, and which allows the viewer to more clearly visually perceive the image, without being affected by a varying depth position of the object.

The apparatus according to the above mode (29), because of the capability of modifying a display format (a form of visual representation) in which a to-be-displayed image is displayed, based on the depth position of a specified object, would allow the to-be-displayed image to be displayed in a varying display format with a varying depth position of the specified object. This results in, for example, the viewer's clearer visual perception of a desired image.

Describing the definitions of the "image" and the "object" both set forth in the above mode (29), there exits a relationship between them that the object belongs to the image (entire image). However, the object is a part of the image (sub-image of the entire image), and therefore, the object can be referred to simply as "image," or "content of an image."

(30) The apparatus according to mode (29), wherein the image processor performs the image processing such that the specified object which has been selected by the selector is displayed in a display format different from that of at least one non-specified object which is at least one remainder of the plurality of objects.

This apparatus would allow a specified object to be displayed in a display format different from that of at least one non-specified object, providing improvement in the flexibility of the display format of the specified object.

(31) The apparatus according to mode (29) or (30), wherein the selector includes a specified-object detector detecting as the specified object a focused object which is one of the plurality of objects that the viewer is focusing on.

This apparatus would allow the detection of a specified object on which the viewer is focusing, and also allow the processing for the displayed image based on the depth position of the detected specified object. This results in, for example, the viewer's clearer visual perception of the specified object.

(32) The apparatus according to mode (31), wherein the specified-object detector includes:
a view-direction detector detecting a view direction of the viewer; and
a determining unit retrieving one of the plurality sets of image information which corresponds to the object located in the detected view direction, based on a detection result of the view-direction detector, the determining unit further determining the specified object based on the retrieved set of image information.

This apparatus, as a result of the detection of the view direction of the viewer, identifies the specified object on which the viewer is focusing.

(33) The apparatus according to mode (31), wherein the specified-object detector includes:
a view-direction detector detecting view directions of the viewer for left and right eyes of the viewer, respectively; and
a calculator calculating a point at which the viewer has gazed, based on both the view directions for the left and right eyes detected by the view-direction detector, and a distance between the left and right eyes, the calculator further detecting the specified object based on a calculation result of the calculator.

This apparatus, as a result of utilization of the distance between the viewer's both eyes in addition to the view direction of the viewer, identifies the specified object on which the viewer is focusing, with improved precision.

(34) The apparatus according to any one of modes (29) through (33), further comprising a depth-position detector detecting the depth position of each object, based on the depth-position information,
wherein the image processor performs the image processing such that the specified object, optionally with at least one separate object which is displayed at the same depth position as that of the specified object, is displayed in a display format different from that of at least one non-specified object which is displayed at a depth position different from that of the specified object.

This apparatus would allow non-specified object displayed at a different depth position from that of specified object, to be displayed in a different format from that of the specified object. This results in, for example, the viewer's clearer visual perception of the specified object.

(35) The apparatus according to any one of modes (29) through (34), wherein the image processor includes a section of varying a luminance of the specified object.

This apparatus allows the luminance of a specified object to be varied in accordance with the depth position of the specified object, enabling, for example, the viewer to more clearly visually perceive the specified object.

(36) The apparatus according to any one of modes (29) through (35), wherein the image processor includes a section of highlighting a boundary of the specified object.

This apparatus allows the visual clearness of the boundary of a specified object to be varied in accordance with the depth position of the specified object. This therefore enables, for example, the viewer's clearer visual perception of the specified object.

(37) The apparatus according to any one of modes (29) through (36), wherein the image processor includes a section of adding a separate boundary image to the specified object along an outline of the specified object.

This apparatus allows the attachment of a separate boundary image to a specified object along an outline of the specified object, enabling, for example, the viewer's clearer visual perception of the specified object.

(38) The apparatus according to any one of modes (34) through (37), wherein the image processor includes a section of displaying a non-specified object located in front of the specified object, transparently or semi-transparently.

This apparatus, as a result of the displaying of non-specified object in front of a specified object, transparently or semi-transparently, would allow the viewer to more clearly visually perceive the specified object, without visual obstruction by the non-specified object located in front of the specified object.

(39) The apparatus according to any one of modes (31) through (37), wherein the plurality of objects include at least one non-specified object which is located within a region forming a predetermined visual angle with the specified object, and
wherein the image processor includes a section of modifying the display format for the at least one non-specified object.

This apparatus, with the capability of modifying the display format of non-specified object within a region forming a predetermined visual angle with a specified object, would allow the processing including causing the non-specified object to be in a non-display state, etc. This results in, for example, the viewer's clearer visual perception of the specified object.

(40) The apparatus according to any one of modes (29) through (39), wherein the plurality of objects include the specified object, and a non-specified object other than the specified object, and
wherein the image processor includes a displayed-object-position modifier modifying the depth position of at least one of the specified object and the non-specified object and displaying the specified object and the non-specified object at respective depth positions.

This apparatus allows flexible modification of a relative relation in depth position between a specified object and a non-specified object, and displaying of these objects at respective depth positions. This results in, for example, the viewer's clearer visual perception of the specified object.

(41) The apparatus according to mode (40), further comprising:
a light-beam emitter emitting a light beam so as to reflect the position-on-plane information; and a wavefront-curvature modulator modulating a curvature of wavefront of the light beam emitted from the light-beam emitter, and wherein the displayed-object-position modifier controls the wavefront-curvature modulator.

This apparatus, as a result of the control of the wavefront-curvature modulator, allows any desired object to be displayed at any desired depth-position. This results in, for example, the viewer's clearer visual perception of the specified object.

(42) The apparatus according to mode (40) or (41), further comprising a depth-position sensor sensing the depth position of each object, based on the depth-position information, wherein the displayed-object-position modifier includes a section of moving the display position of the non-specified object which has an original depth-position located farther from the viewer than the depth position of the specified object, to a position closer to a vicinity of the specified object than the original depth-position, based on a sensing result of the depth-position sensor.

This apparatus allows a non-specified object (e.g., a background image) originally located farther from the viewer than a specified object, to be displayed at a position closer to the specified object than the original position of the non-specified object.

Therefore, this apparatus allows the viewer to visually perceive both objects with substantially the same diopter (focusing), without out-of-focus perception.

(43) The apparatus according to mode (40) or (41), further comprising a depth-position sensor sensing the depth position of each object, based on the depth-position information, wherein the displayed-object-position modifier includes a section of moving the display position of the non-specified object which has an original depth-position located farther from the viewer than the depth position of the specified object, to a position still farther from the viewer than the original depth-position, based on a sensing result of the depth-position sensor.

This apparatus allows a non-specified object originally located farther from the viewer than a specified object, to be displayed at a position still farther from the viewer than the original position of the non-specified object.

Therefore, this apparatus allows the viewer to visually perceive both objects, such that the viewer's perception of a distance between both object is enhanced, resulting in the viewer's clearer visual perception of the specified object.

(44) The apparatus according to mode (29), further comprising:

a light beam emitter emitting a single beam of light, such that the single beam instantaneously displays a single one of pixels of the image;

an overlapping-object detector detecting as a non-specified object, at least one of the plurality of objects which is originally displayed in front of and in overlapping relation with the specified object, as viewed from the viewer; and an overlapping-object displaying section, upon the overlapping-object detector detecting the non-specified object, displaying at least an originally-overlapping portion of the non-specified object in which the non-specified object, when displayed, originally overlaps with the specified object, such that the specified object is not occluded by the non-specified object.

This apparatus, even when a specified object is originally displayed behind and in overlapping relation with a non-specified object, would allow the viewer to perceive the specified object, without being fully occluded by the non-specified object.

(45) The apparatus according to mode (44), wherein the overlapping-object displaying section includes a first displaying block transparently displaying at least the originally-overlapping portion of the non-specified object.

This apparatus, when a specified object is originally displayed behind and in overlapping relation with a non-specified object located in front of the specified object, displays transparently at least a portion of the non-specified object in which the non-specified object originally overlaps with the specified object when displayed.

Therefore, this apparatus would allow the viewer to perceive the specified object, by allowing the viewer to see through, to a full extent, an originally-overlapped portion of the specified object with the non-specified object.

(46) The apparatus according to mode (44), wherein the overlapping-object displaying section includes a second displaying block semi-transparently displaying at least the originally-overlapping portion of the non-specified object.

This apparatus, when a specified object is originally displayed behind and in overlapping relation with a non-specified object located in front of the specified object, displays semi-transparently at least a portion of the non-specified object in which the non-specified object originally overlaps with the specified object when displayed.

Therefore, this apparatus would allow the viewer to perceive the specified object, by allowing the viewer to see through, to a partial extent, an originally-overlapped portion of the specified object with the non-specified object.

(47) The apparatus according to mode (46), wherein the second displaying block includes a color-ratio modifier displaying the originally-overlapping portion of the non-specified object, in a mixed color represented by mixing an original color of the non-specified object and a color of the specified object in a color ratio, and modifying the color ratio of the mixed color.

This apparatus, when a specified object is originally displayed behind and in overlapping relation with a non-specified object located in front of the specified object, allows addition to the non-specified object, a mixed color represented by mixing an original color of the non-specified object and a color of the specified object.

(48) The apparatus according to any one of modes (29) through (47), further comprising a scanner scanning a beam of light on a retina of a viewer.

This apparatus, as a result of the scan of a beam of light on the retina, allows direct rendering of a desired image on the retina.

(49) The apparatus according to any one of modes (29) through (48), further comprising an operating member to be operated by a viewer for selectively deactivating an operation of the image processor.

This apparatus allows selective deactivation of the operation of the image processor, for example, so as to reflect the viewer-user's demand, facilitating improvement in easiness-to-use of this apparatus.

(50) A method of projecting light onto a retina of a viewer, to thereby allow the viewer to perceive a display object via a virtual image, the method comprising the steps of:

emitting light;

modulating the light;

causing a display unit to output the modulated light to the retina of the viewer through an exit of the display unit, to thereby display in an image display region an image representative of the display object in the form of a virtual image, the display unit being mounted on a head of the viewer in operation; and controlling the emitter and the modulator so that the image is displayed in the image display region, wherein the step of controlling includes:

detecting a relative motion of the viewer with respect to a position of the viewer by treating the position of the viewer as a position reference for display; and performing display control which includes at least one of control of a display/non-display status of the image, and control of a display position of the image, in accordance with the detected relative motion.

(51) A method of displaying an image, wherein an to-be-displayed image includes a plurality of objects to be displayed together, and wherein the plurality of objects are displayed in a stereoscopic manner, using a plurality of sets of image information including depth-position information for specifying a depth position of each object, and position-on-plane information for specifying a position of each object on a plane corresponding to the depth position of the same object, the method comprising the steps of:

selecting one of the plurality of objects as a specified object; and modifying a display format in which the image is displayed, based on the depth-position information for the specified object which has been selected.

Several presently preferred embodiments of the invention will be described in detail by reference to the drawings in which like numerals are used to indicate like elements throughout.

Referring now to FIG. 1, a display system constructed according to a first embodiment of the present invention is schematically illustrated in block diagram. This display system is a retinal scanning display that projects a scanning beam of light onto a retina of a viewer's eye, to thereby allow the viewer to perceive a display object via a virtual image As illustrated in FIG. 1, the display system includes a display optical-system 10 that scans a beam of light for displaying an image and outputs the scanning beam of light toward the viewer's eye. The scanning beam of light defining an image is projected onto the retina of the viewer's eye through the pupil of the viewer's eye, resulting in perception of the image by the viewer.

Figure 2:
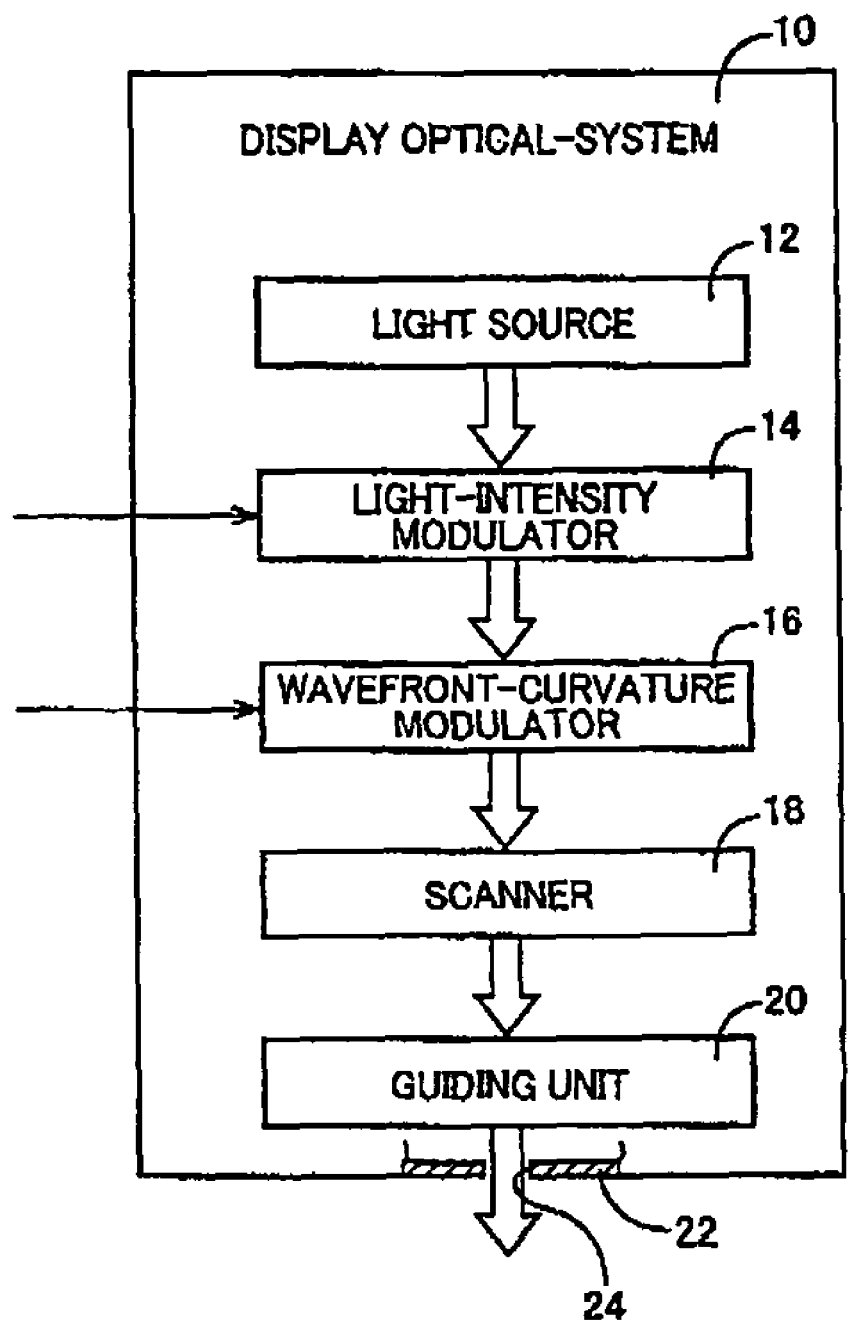
FIG. 2 is a block diagram schematically illustrating the configuration of a display optical-system 10 depicted in FIG. 1.

As schematically illustrated in FIG. 2 in block diagram, the display optical-system 10 is constructed to include in a common housing 22: a light source 12 which generates and outputs a beam of light; a light-intensity modulator 14; a wavefront-curvature modulator 16; a scanner 18; and a guiding unit 20.

An example of the light source 12 may be a laser generating a laser light beam, such as a semiconductor laser. The light-intensity modulator 14 is for modulating the intensity of the light beam entered therein from the light source 12, an example of which may be adapted to modulate the intensity of a light beam using the acousto-optic effect.

The wavefront-curvature modulator 16 is for modulating the curvature of wavefront of the light beam entered therein from the light-intensity modulator 14. An example of the wavefront-curvature modulator 16 may be adapted to modulate the curvature of wavefront of a light beam, using a converging lens or a reflecting mirror, which is disposed in the optical axis of the light beam so as to be variable in position or curvature.

The scanner 18 is for two-dimensionally scanning the beam of light entered therein from the wavefront-curvature modulator 16. An example of the scanner 18 may be constructed by combining a micro-mirror for a horizontal scan, using the resonant vibration of an oscillating body by an oscillator, and a galvano mirror for a vertical scan.

The guiding unit 20 is a section to guide the beam of light emerging from the scanner 18, toward the viewer's retina. An example of the guiding unit 20 may be a relay optical system, and an alternative example may be an optical system that allows the beam of light to merely pass through the optical system. The beam of light emerging from the guiding unit 20 enters the viewer's retina via an exit 24 formed in the housing 22. The exit 24 is filled with a transparent material to prevent foreign matters from entering the interior of the housing 22.

The display optical-system 10 is mounted, in operation, on a viewer's head. That is to say, the display system is of a head-mount type.

As is apparent from the above, in the present embodiment, the light source 12 constitutes an example of the "emitter" set forth in the above mode (1), the light-intensity modulator 14 and the wavefront-curvature modulator 16 each constitute an example of the "modulator" set forth in the same mode, and the guiding unit 20 and the exit 24 together constitute an example of the "display unit" set forth in the same mode.

It is added that, when the light source 12 has a self-contained function of modulating light intensity, like a semiconductor laser, it is not essential to provide the display system with the light-intensity modulator 14, which is separate from the light source 12.

It is further added that, when there is no need to vary in depth a to-be-displayed image on a frame-by-frame or pixel-by-pixel basis, the wavefront-curvature modulator 16 can be eliminated.

It is still further added that, although, in the present embodiment, there are mounted on the viewer's head, not only the guiding unit 20 and the exit 24, but also the light source 12, the light-intensity modulator 14, the wavefront-curvature modulator 16, and the scanner 1, the present invention may be practiced in an alternative arrangement in which the light source 12 and the light-intensity modulator 14 are mounted on an alternative segment of the viewer which is other than the head, for example, the middle (e.g., the waist), and in which a beam of light emerging from the light-intensity modulator 14 is transmitted to a head-mounted unit 40 via a flexible light-transmissive medium (e.g., an optical fiber).

As illustrated in FIG. 1, in the present embodiment, the display-optical system 10 is accommodated within a common housing 36 along with an interface 30, a magnetic-field receiver 32, and a signal processing circuit 34. In the present embodiment, the display optical-system 10, the interface 30, the magnetic-field receiver 32, and the signal processing circuit 34 together constitute the head-mounted unit 40.

Figure 3:
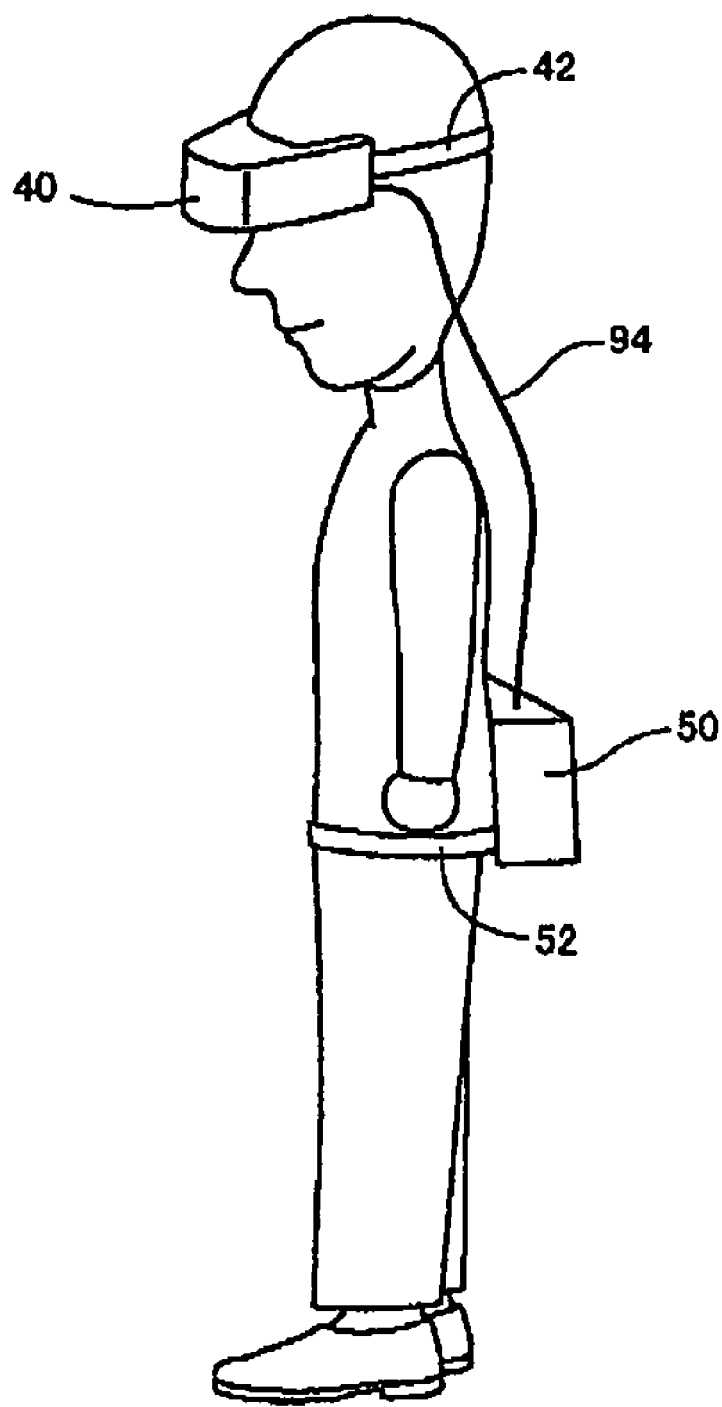
FIG. 3 is a perspective view exemplarily illustrating a head-mounted unit 40 and a middle-mounted unit 50 worn on a viewer's head and middle, respectively.

FIG. 3 is a perspective view for explaining an example of an arrangement in which the head-mounted unit 40 is mounted on the viewer's head. In this example, the head-mounted unit 40 is worn on the viewer's head with a belt 42 to prevent the head-mounted unit from being moved from its intended position.

As illustrated in FIG. 1, within the head-mounted unit 40, the display optical-system 10 and the magnetic-field receiver 32 are connected in parallel to the interface 30. The magnetic-field receiver 32, which is a sensor for detecting the intensity of a magnetic-field, is connected to the interface 30 via the signal processing circuit 34.

An example of the signal processing circuit 34 may be a converter that converts each field-intensity signal which is an analog signal outputted from the magnetic-field receiver 32 and which is representative of the intensity of the corresponding magnetic-field sensed by the magnetic-field receiver 32, into a digital signal (e.g., field-intensity data).

As illustrated in FIG. 1, the display system further includes a middle-mounted unit 50 which is mounted, in operation, on the viewer's middle of the viewer. FIG. 3 is a perspective view for explaining an example of an arrangement in which the middle-mounted unit 50 is mounted on the viewer's middle. In this example, the middle-mounted unit 50 is worn on the viewer's middle with a belt 52 to prevent the middle-mounted unit 50 from being moved from its intended position.

As illustrated in FIG. 1, the middle-mounted unit 50 is configured to include a computer 66 constructed by interconnecting a CPU 60 and a RAM/ROM 62 via a bus 64. A ROM portion of the RAM/ROM 62 has previously stored therein various programs including a position detection program which will be described later.

As illustrated in FIG. 1, there are further connected to the bus 64 a magnetic-field generator 68, a display-data conversion circuit 70, an operating unit 72, and an image information memory 74, via corresponding respective signal processing circuits 78, 80, 82, and 84. An Example of each signal processing circuit 78, 80, 82, 84 is an analog-to-digital signal converter that converts a signal format between an analog signal and a digital signal. An alternative example is a buffer that temporarily stores therein signals or data.

As illustrated in FIG. 1, the middle-mounted unit 50 further includes an interface 90. The interface 90 is electrically connected to the interface 30 of the head-mounted unit 40 via a flexible signal transmissive medium 94 (see FIG. 3). The bus 64 and the display-data conversion circuit 70 are connected in parallel to the interface 90.

The connection of the bus 64 of the middle-mounted unit 50 with the magnetic-field receiver 32 via the interface 90, the signal transmissive medium 94, the interface 30, and the signal processing circuit 34, in this description order, allows the computer 66 to retrieve the field-intensity signals from the magnetic-field receiver 32. With respect to the retrieved field-intensity signals, the aforementioned position detection program is executed by the computer 66, allowing the detection of the position and the orientation of the viewer's head with respect to the viewer's middle.

The magnetic-field generator 68 is disposed in the middle-mounted unit 50 for detecting the relative positional relationship of the head to the middle, of the viewer, in corporation with the magnetic-field receiver 32 of the head-mounted unit 40.

Figure 4:
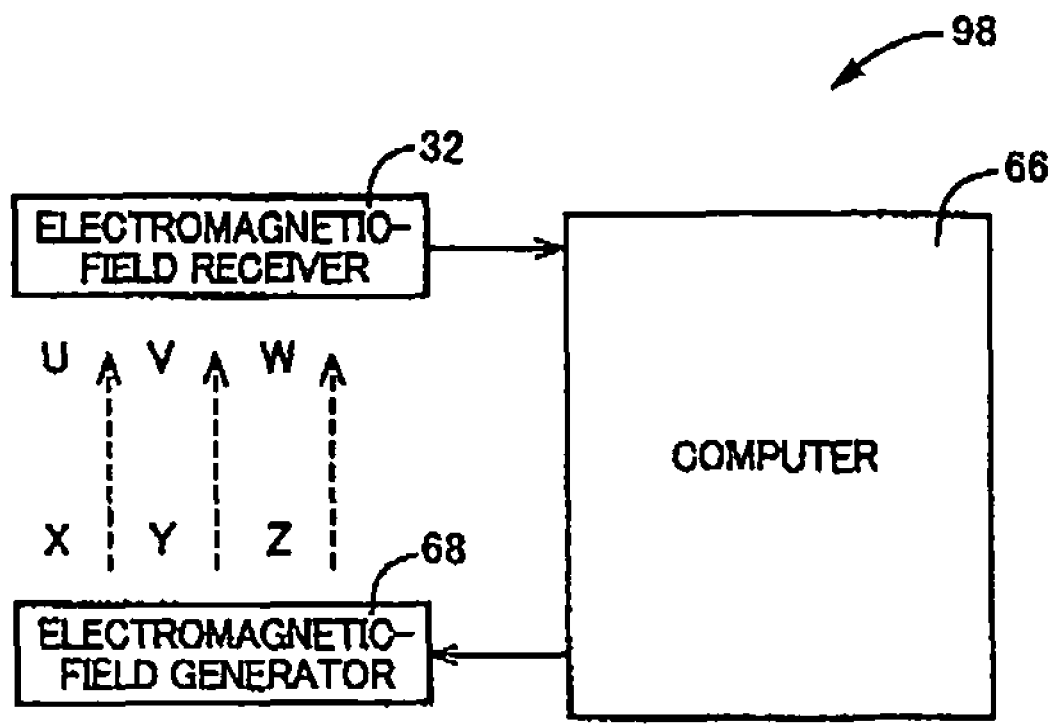
FIG. 4 is a block diagram illustrating some components selected from all the components of the display system depicted in FIG. 1, which are in use for detecting relative position and orientation of the head of the viewer with respect to the middle of the viewer.

In the present embodiment, as illustrated in FIG. 4, the magnetic-field generator 68, the magnetic-field receiver 32, and a portion of the computer 66 which is assigned to execute the aforementioned position detection program corporate to constitute a relative-relation detecting device 98 for detecting the position and the orientation of the viewer's head (more precisely, the position and the orientation of the head-mounted unit 40) with respect to the viewer's middle (more precisely, the position of the middle-mounted unit 50).

The relative-relation detecting device 98 detects the relative position and orientation of the viewer's head with respect to the viewer's middle, using a method in common to or similar with a magnetic position tracking method employed in a magnetic position tracking device whish is known as a position tracker or a position/orientation tracker.

An example of such a magnetic position tracking method is disclosed in U.S. Pat. No. 4,849,692, entitled "DEVICE FOR QUANTITATIVELY MEASURING THE RELATIVE POSITION AND ORIENTATION OF TWO BODIES IN THE PRESENCE OF METALS UTILIZING DIRECT CURRENT MAGNETIC FIELDS," and incorporated herein by reference.

As illustrated in FIG. 4, for performing the magnetic position tracking method, the magnetic-field generator 68 is provided with multiple generation coils for generating magnetic-fields, consisting of three orthogonal generation coils (i.e., X, Y, and Z coils). Similarly, the magnetic-field receiver 32 is provided with multiple sensing coils for sensing magnetic-fields, consisting of three orthogonal sensing coils (i.e., U, V, and W coils). Each sensing coil senses the corresponding field-intensity signal indicative of the magnetic-fields generated by the magnetic-field generator 68.

In the magnetic-field generator 68, the multiple generation coils are incorporated into the middle-mounted unit 50. The orientations in which the multiple generation coils are to be arranged are defined in an environment, for example, where the positive direction of a Y axis is oriented ahead of the viewer, and the positive direction of a Z axis is oriented vertically and upwardly. This definition is applicable to the arrangement of the multiple sensing coils of the magnetic-field receiver 32.

It is added that, the aforementioned three generation coils may be located at a point in the form of an integral winding. Alternatively, these coils may be located on a generally flat plane traversing the middle-mounted unit 50. For example, two of the three generation coils may be disposed at a left-hand side end point and a right-hand side end point of the viewer's middle, respectively, while the remaining one is centrally disposed between both end points of the viewer's middle. The disposition described above can be also employed for the three sensing coils of the magnetic-field receiver 32.

In the present embodiment, the magnetic-fields generated from the three generation coils belonging to the multiple generation coils are received by the three sensing coils belonging to the multiple sensing coils, resulting in the output of a total of nine sets of field intensity data from the three sensing coils. There can be used, for example, a time division or frequency division format to identify which one of the three generation coils is generating a magnetic-field which has been received by each sensing coil. Based on these sets of field intensity data, the aforementioned position detection program is executed by the computer 66 for detecting the relative position and orientation of the viewer's head with respect to the middle.

Figure 5:
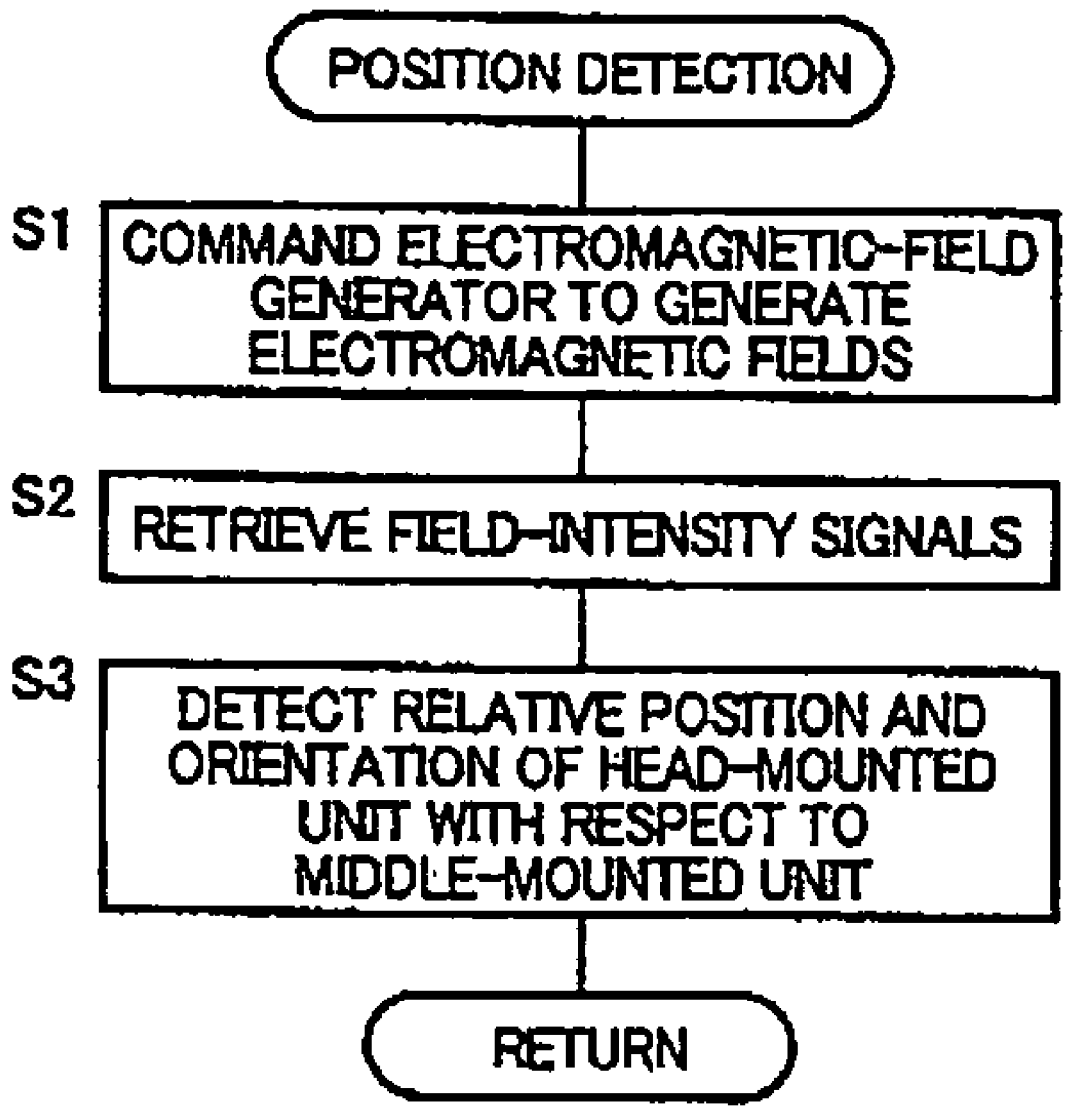
FIG. 5 is a flow chart schematically illustrating a position detection program executed by a computer 66 depicted in FIG. 4.

FIG. 5 schematically illustrates in flow chart the position detection program. The position detection program is repeatedly executed while the computer 66 is being powered.

Each cycle of execution of the position detection program begins with a step S1 to output a signal for commanding the magnetic-field generator 68 to generate magnetic-fields. In response to the signal, the magnetic-field generator 68 causes the generation coils to generate the respective magnetic-fields. The magnetic-field generator 68 is adapted, for example, so as to excite the three generation coils to generate the respective magnetic-fields in a time division format.

The step S1 is followed by a step S2 to retrieve the field-intensity signals from the magnetic-field receiver 32. Each field-intensity signal, which is a signal indicative of the intensity of the magnetic-field sensed by each sensing coil, is retrieved from the magnetic-field receiver 32 in association with each sensing coil.

The step S2 is followed by a step S3 to detect, in response to the retrieved field-intensity signals, the relative position and orientation of the head-mounted unit 40 with respect to the middle-mounted unit 50.

More specifically, the relative position and orientation of the head-mounted unit 40 is detected based on, for example, the detection results of the position (defined by X-, Y-, and Z-coordinate values) of a single special point representing the aforementioned multiple generation coils, and of at least two orientations (e.g., X- and Y-directions) related to the single representative point. The detection results, which include a set of position information and at least two sets of orientation information, are stored in the RAM/ROM 62.

Then, one cycle of the position detection program is terminated.

As is apparent from the above, in the present embodiment, the magnetic-field receiver 32, the magnetic-field generator 68, and a portion of the computer 66 which is assigned to execute the position detection program together constitute an example of the "detector" set forth in the above mode (2), the head constitutes an example of the "to-be-detected segment" set forth in the same mode, and the middle constitutes an example of the "reference segment" set forth in the same mode.

Further, in the present embodiment, the magnetic-field receiver 32 constitutes an example of the "first portion" set forth in the above mode (3), the magnetic-field generator 68 constitutes an example of the "second portion" set forth in the same mode, and a portion of the computer 66 which is assigned to execute the position detection program constitutes an example of the "detecting device" set forth in the same mode.

Still further, in the present embodiment, the magnetic-field generator 68 constitutes an example of the "signal generator" set forth in the above mode (4), the magnetic-field receiver 32 constitutes an example of the "receiver" set forth in the same mode, and the signal for causing the magnetic-field generator 68 to generate magnetic-fields constitutes an example of the "detection signal" set forth in the same mode.

In the present embodiment, three different coordinate systems are conceptually used for allowing the viewer to perceive a visual image of a display object (content). That is to say, these coordinate systems are: a definition coordinate system for use in defining a display object; a display coordinate system for use in defining an image to be displayed in an image display region; and a reference coordinate system for use in detecting the position and the orientation of the viewer's head (more precisely, the position and the orientation of the head-mounted unit 40).

Figure 6:
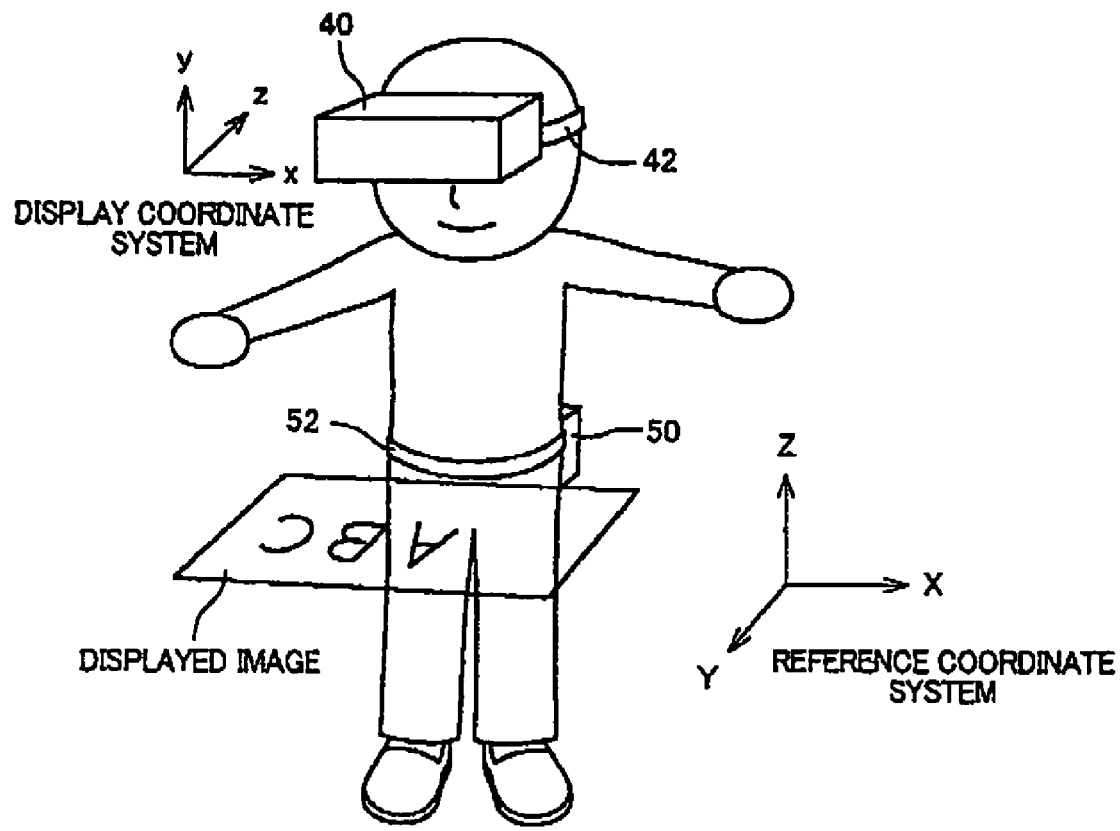
FIG. 6 is a perspective view for explaining display and reference coordinate systems in use for the display system depicted in FIG. 1.

In the present embodiment, as illustrated in FIG. 6, the display coordinate system is fixed with respect to the head-mounted unit 40, while the reference coordinate system is fixed with respect to the middle-mounted unit 50. This arrangement allows the detection of position and orientation of the viewer's head with respect to the middle-mounted unit 50, and additionally allows the presentation of an image in the image display region at a position determined by treating the position of the middle-mounted unit 50 as a position reference.

More specifically, the position and the orientation of the head-mounted unit 40 is detected with respect to a spatial position of the middle-mounted unit 50, and based on the detection results, a display position of a to-be-displayed image is determined by using the spatial position of the middle-mounted unit 50 as a position reference.

As a result, the viewer can perceive the image only when the viewer moves his or her head down to gaze at his or her middle (e.g., his or her waist). In this case, a display position of the image with respect to the display coordinate system is varied in accordance with a varying relative positional relation between the middle-mounted unit 50 and the head-mounted unit 40.

Still more specifically; once the viewer has bent (moved down) his or her head to gaze at his or her middle, an image comes into a viewer's field of view. In contrast, once the viewer has erected (moved up) his or her head, the image disappears from the viewer's filed of view.

In addition, while the viewer's head is in a bent position allowing the viewer to gaze at his or her middle, once the viewer has moved his or her head to an allowable extent, the image moves accordingly within and with respect to the viewer's field of view, so as to allow the viewer to perceive the image as if it were fixed with respect to the viewer's middle. In contrast, once the viewer has moved his or her head to an excessively large extent, the image disappears from the viewer's field of view.

Then, the aforementioned coordinate systems described above will be described in more detail below.

The reference coordinate system is a coordinate system used as a reference for allowing the detection of the position and the orientation of the head-mounted unit 40 with respect to a spatial position of the middle-mounted unit 50.

Coincidentally, the reference coordinate system is also a coordinate system which is used for allowing the determination to be made as to whether or not a desired image will be displayed in the image display region with respect to the position of the middle-mounted unit 50 (i.e., whether an image will be brought into an ON-state (display or visible state) or an OFF-state (non-display or invisible state) in the image display region, and which is used, if the determination result suggests that the desired image will be displayed, for determining a display position of the image.

On the other hand, the display coordinate system is a coordinate system originally for use in displaying an image within the image display region with respect to the position of the head-mounted unit 40.

As illustrated in FIG. 6, the reference coordinate system is an X-Y-Z coordinate system fixed with respect to the middle-mounted unit 50. The positions and the orientations of the multiple generation coils (i.e., X, Y, and Z coils) of the magnetic-field generator 68 allow a spatial position or the origin of the reference coordinate system to be defined uniquely to a current viewer.

In contrast, as illustrated in FIG. 6, the display coordinate system is an x-y-z coordinate system fixed with respect to the head-mounted unit 40. The positions and the orientations of the multiple sensing coils (i.e., U, V, and W coils) of the magnetic-field receiver 32 allow a spatial position or the origin of the display coordinate system to be defined uniquely to a current viewer.

That is to say, in the present embodiment, the reference coordinate system is specified using the positions and the orientations of the multiple generation coils (i.e., X, Y, and Z coils) built in the middle-mounted unit 50. Similarly, the display coordinate system is specified using the positions and the orientations of the multiple sensing coils (i.e., U, V, and W coils) built in the head-mounted unit 40.

This is no more than an example of how to specify the coordinate systems, and the present invention may be practiced in, for example, an alternative arrangement in which the reference coordinate system is specified by a combination of representative two points of the middle-mounted unit 50, which is to say, two positions of selected two of the three generation coils; and a direction which gravity acts on a third point which coincides with either one or none of the representative two points of the middle-mounted unit 50.

Similarly, the present invention may be practiced in an alternative arrangement in which the display coordinate system is specified by a combination of representative two points of the head-mounted unit 40, which is to say, two positions of selected two of the three sensing coils; and a direction in which gravity acts on a third point that coincides with either one or none of the representative two points of the head-mounted unit 40.

For any one of the above arrangements, the direction of gravity acting on a specific point may be detected using a gravity sensor adapted to directly detect gravity.

In an alternative example, the direction of gravity may be detected, for example, using a combination of a spherical electrically conductive member; and a rotating body having an inner circumferential surface on which the conductive member rolls. The rotating body moves integrally with a measured object which is to be measured with respect to the direction of gravity acting on the measured object.

In this alternative example, the rotating body is constructed such that multiple contact points are provided to the inner circumferential surface of the rotating body. These contact points are originally disposed to be electrically insulated from each other. Once the conductive member rolls on the inner circumferential surface of the rotating body, at least two of the contact points are rendered to be electrically conductive via the conductive member, at a contact position varying as the conduct member rolls.

Identifying ones of the contact points with which the conductive member is in contact at a time may be achieved by detecting electric resistance, electric capacitance, etc., for every pair of the contact points, with each pair being comprised of selected two of the contact points.

Once the current position of the conductive member on the inner circumferential surface of the rotating body has been identified in the above manner, the orientations of the rotating body and the measured object are measured, provided that the position of the center of the rotating body is known (e.g., during movement, the center is kept unchanged in position).

In the present embodiment, two different display modes are available for displaying an image to the viewer. These display modes are a middle-mounted-unit-based display mode, and a head-mounted-unit-based display mode.

The middle-mounted-unit-based display mode is for displaying an image to allow the viewer to perceive the image at a position determined by using a spatial position of the middle-mounted unit 50 as a position reference.

The head-mounted-unit-based display mode is for displaying an image to allow the viewer to perceive the image at a position determined by using a spatial position of the head-mounted unit 40 as a position reference. The middle-mounted-unit-based display mode is a mode for displaying an image with respect to a viewer's reference segment, with the viewer's middle being assigned as the reference segment.

That is to say, in the present embodiment, the middle constitutes an example of the "reference segment" set forth in the above mode (2) or (15), the middle-mounted-unit-based display mode constitutes an example of the "viewer-based display mode" set forth in the above mode (15), and the head-mounted-unit-based display mode constitutes an example of the "displayer-unit-based display mode" set forth in the same mode.

Further, in the present embodiment, assuming that, during a sequence of image display, the viewer's middle does not move, while other segments of the viewer's body move, in position with respect to a real outside world, the middle-mounted-unit-based display mode functions also as an example of a real-outside-world-based display mode.

As described above, in the present embodiment, several different display modes are available, and this display system requires the viewer to select one of those display modes to be implemented. For enabling the viewer's selection in accordance with the viewer's manipulation, the operating unit 72 is provided.

Additionally, in the present embodiment, definition data defining a display object (i.e., display-object data) has been stored in the image information memory 74. The definition data has been produced to represent the display object in the definition coordinate system.

Upon the head-mounted-unit-based display mode being implemented, the definition data is mapped onto the display coordinate system without any substantial coordinate transformation for the original definition data, as illustrated in FIG. 27 (CTM1: Coordinate Transformation Matrix equal to a unit matrix).

As a result, display data for displaying an image with respect to the display coordinate system is obtained as data identical with the definition data. That is to say, the head-mounted-unit-based display mode allows the display coordinate system and the definition coordinate system to be treated to be identical with each other.

In contrast, upon the middle-mounted-unit-based display mode being implemented, substantial coordinate transformation is performed for the definition data, in accordance with the position and the orientation of the head-mounted unit 40 with respect to the middle-mounted unit 50. This results in generation of the display data.

More specifically, during implementation of the middle-mounted-unit-based display mode, the definition data for defining a display object with respect to the definition coordinate system is mapped onto the reference coordinate system without any substantial coordinate transformation for the original definition data, as illustrated in FIG. 27 (CTM2: Coordinate Transformation Matrix equal to a unit matrix).

Subsequently, the definition data is transformed into the displaying data for displaying an image with respect to the display coordinate system, in accordance with a relative positional relation between the position and orientation of the viewer's head, and the reference coordinate system, as illustrated in FIG. 27 (CTM3: Coordinate Transformation Matrix not equal to a unit matrix). As a result, the definition data is mapped onto the display coordinate system.

Briefly describing the relation between the aforementioned display modes and the coordinate systems, the definition coordinate system, originally, has no relation with the display coordinate system, and has no relation with the reference coordinate system. Nevertheless, once the head-mounted-unit-based display mode is selected, the definition coordinate system is fixed with respect to the display coordinate system, thereby allowing the viewer to perceive an image as if it were fixed with respect to the head-mounted unit 40.

In contrast, once the middle-mounted-unit-based display mode is selected, the definition coordinate system is fixed with respect to the reference coordinate system, thereby allowing the viewer to perceive an image as if it were fixed with respect to the middle-mounted unit 50, as a result of a required substantial coordinate transformation.

Figure 7:
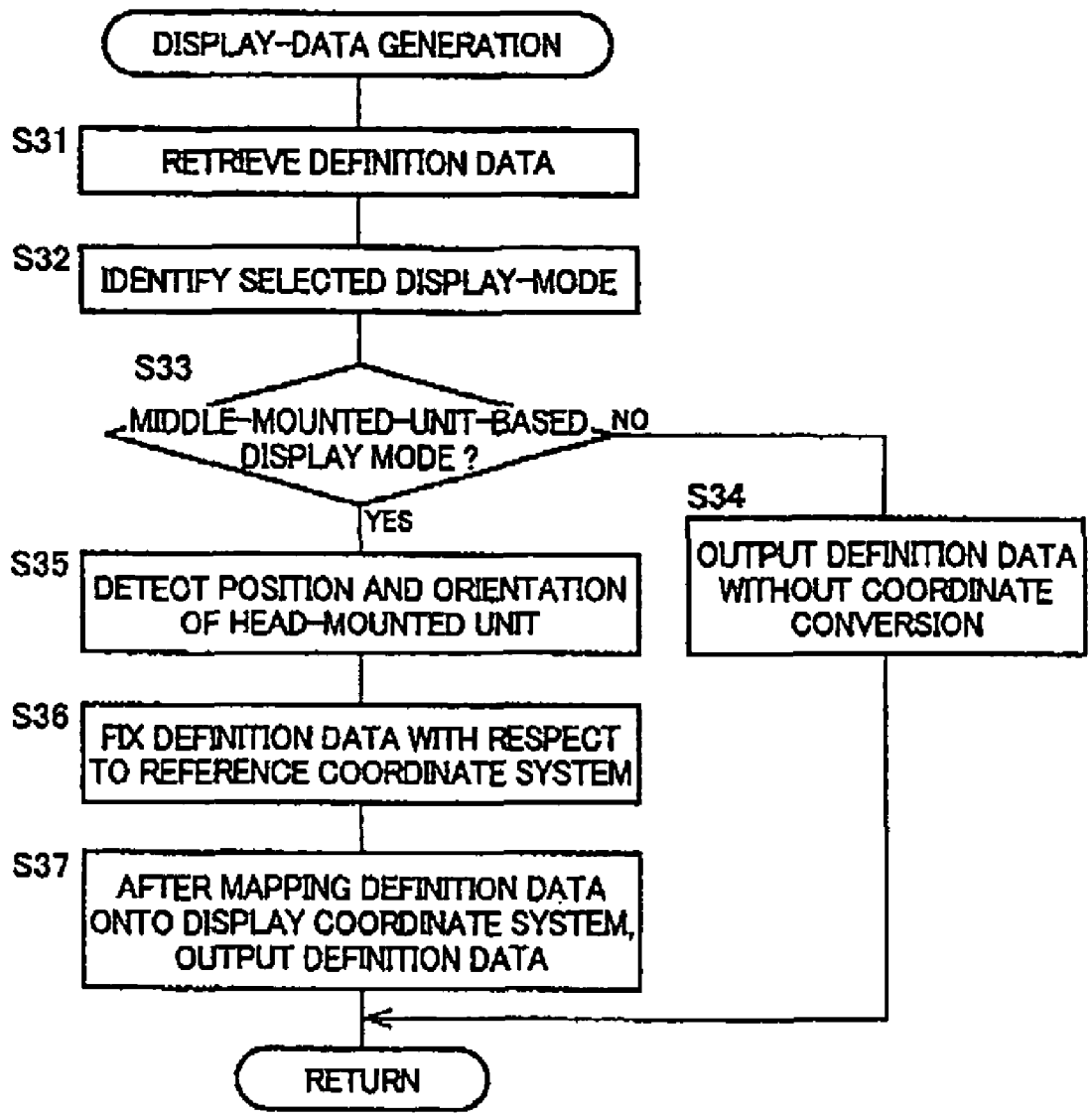
FIG. 7 is a flow chart schematically illustrating a display data generation program executed in a display-data conversion circuit 70 by a computer.

There has been described above the process for producing the display data from the definition data, i.e., converting the definition data into the display data, in a selected one of the display mode. This process is performed by the display-data conversion circuit 70. The display-data conversion circuit 70 is configured in an arrangement allowing a display data generation program schematically illustrated in flow cart in FIG. 7, to be executed principally using a computer (not illustrated) separate from the computer 66.

However, it is not essential that the display-data conversion circuit 70 is constructed with a computer, and alternatively, the display-data conversion circuit 70 may be constructed with, for example, a DSP (Digital Signal Processor).

In the display-data conversion circuit 70, the display data generation program is repeatedly executed. Each execution of this display data generation program begins with a step S31 illustrated in FIG. 7 to retrieve the image information as the definition data, from the image information memory 74.

The step S31 is followed by a step S32 to identify one of the head-mounted-unit-based display mode and the middle-mounted-unit-based display mode, which has been selected by the viewer, in accordance with an output signal of the operating unit 72.

The step S32 is followed by a step S33 to determine whether or not the above-identified selected display mode is equal to the middle-mounted-unit-based display mode.

If the selected display mode is equal not to the middle-mounted-unit-based display mode but to the head-mounted-unit-based display mode, then the determination of the step S33 becomes negative "NO," and this program proceeds to a step S34.

The step S34 is implemented to fix the reference coordinate system with respect to the display coordinate system. As a result, the retrieved definition data is output to the display optical-system 10 as the display data, without any coordinate transformation. That is to say, the head-mounted-unit-based display mode is established by treating the display coordinate system and the definition coordinate system to be identical with each other.

The display data represents, for example, a desired light intensity (luminance), and a desired depth (curvature of wavefront), for each cycle of image display, each frame of a to-be-displayed image, each field of each frame of a to-be-displayed image, or each pixel of a to-be-displayed image.

A subset of the display data which represents a desired value of the light intensity is eventually delivered to the light-intensity modulator 14, allowing the light-intensity modulator 14 to output a beam of light, with its light intensity being coincident with the desired light intensity.

Similarly, a subset of the display data which represents a desired value of the depth of a display object is eventually delivered to the wavefront-curvature modulator 16, allowing the wavefront-curvature modulator 16 to output a beam of light, with its curvature of wavefront being coincident with the desired curvature of wavefront.

Then, one cycle of the display data generation program is terminated.

In contrast, if the selected display mode is equal to the middle-mounted-unit-based display mode, then the determination of the step S33 becomes affirmative "YES," and this program proceeds to a step S35.

The step S35 is implemented to detect the relative position and orientation of the head-mounted unit 40 with respect to the position of the middle-mounted unit 50. More specifically, the latest detection result of the relative position and orientation of the head-mounted unit 40 is retrieved from the RAM/ROM 62.

The step S35 is followed by a step S36 to fix the definition coordinate system with respect to the reference coordinate system. As a result, the retrieved definition data is fixedly mapped onto the reference coordinate system. That is to say, the middle-mounted-unit-based display mode is established by treating the reference coordinate system and the definition coordinate system to be identical with each other.

The step S36 is followed by a step S37 to map the mapped definition data onto the display coordinate system so as to reflect the detection result of the relative position and orientation of the head-mounted unit 40.

This mapping is performed, for example, to allow a displayed image to move within the viewer's field of view, so as to reflect a relative change in the detection result of the relative position and orientation of the head-mounted unit 40.

In this example, the relative change means a change of the detection result from a reference detection result, and the reference detection result means a detection result of the relative position and orientation of the head-mounted unit 40 which was obtained when there was established a relative positional relation between an image defined by the definition data and the reference coordinate system. That is to say, in this example, a displayed image is perceived by the viewer as if it were in fixed relation to the reference coordinate system.

In the step S37, the thus mapped definition data is output as the display data to the display optical-system 10.

Then, one cycle of execution of the display data generation program is terminated.

As is apparent from the above, in the present embodiment, the middle-mounted unit 50 constitutes an example of the "controller" set forth in the above mode (1), (5), (7), (8), (15) or (16).

Next, a display system constructed according to a second embodiment of the present invention will be described.

This display system according to the present embodiment is operable for displaying an image containing a plurality of objects different in depth position from one another, and this display system is adapted to perform image processing for controlling a display format in which the plurality objects are displayed.

The present embodiment is different from the first embodiment, in that the present embodiment performs the above-described image processing, while the first embodiment fails to perform the image processing, and however, the present embodiment is common to the first embodiment in other aspects.

In view of the above, while the different elements of the present embodiment from those of the first embodiment will be described in greater detail below, the common elements of the present embodiment to those of the first embodiment will be referenced the same reference numerals or names as those in the description and illustration of the first embodiment, without redundant description or illustration.

Figure 8:
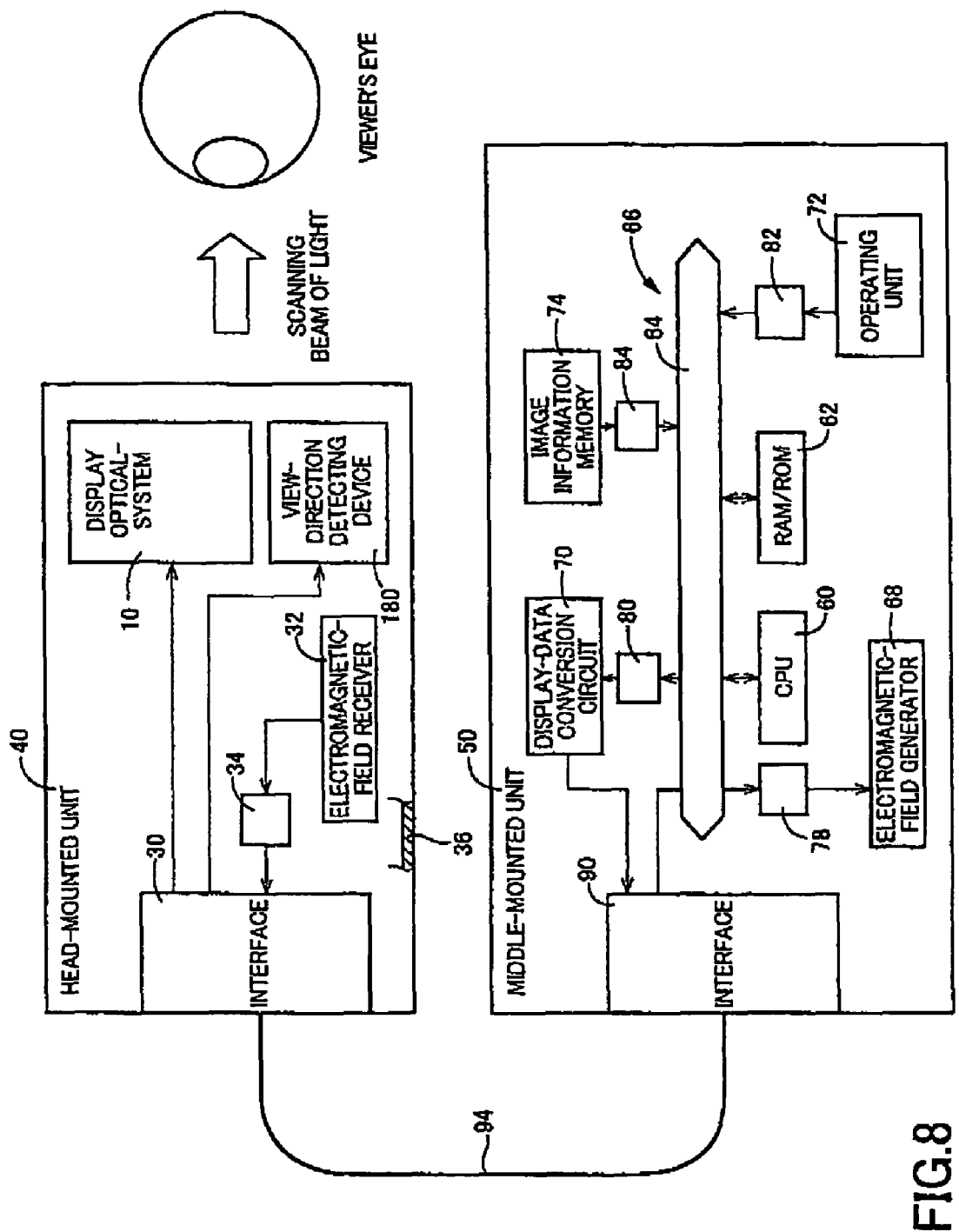
FIG. 8 is a block diagram schematically illustrating a display system constructed according to a second embodiment of the present invention.

In FIG. 8, the display system constructed according to the present embodiment is schematically illustrated in block diagram. This display system is constructed by adding a view-direction detecting device 180 to the display system according to the first embodiment. The view-direction detecting device 180 is mounted on the head-mounted unit 40 for detecting view directions from the viewer's both eyes.

The view-direction detecting device 180 is adapted to detect view directions of the viewer's both eyes, according to on a known principle.

An example of the view-direction detecting device 180 may be configured, as disclosed in Japanese Patent Application Publication No. HEI 7-167618 and Japanese Post-Examined Publication No. TOKU-KOU-SHO 61-59132, the contents of which are incorporated hereinto by reference, to photograph the viewer's both eye balls with an infrared camera having known distances from the both eyes, and to compute a view direction for each eye in accordance with a relative positional relation between a reflected image of the cornea and the center of the pupil, of each eye photographed.

Other conventional techniques of detecting a view direction are disclosed in Japanese Patent Application Publication No. 2004-255074 and Japanese Patent Application Publication No. HEI 5-199996, the contents of which are incorporated hereinto by reference.

In the present embodiment, for a plurality of objects to be displayed together in a single displayed image, there are stored in the image information memory 74 a plurality of sets of image information including depth-position information for specifying a depth position of each object in association with the same object, and position-on-plane information for specifying a position of each object on a plane corresponding to the depth position of the same object.

In the present embodiment, the term "object" is used to mean an image that represents, for example, a specific physical object, and a region in which the image is displayed is defined as an object region.

For each pixel in the object region (focused pixel), once there are specified the position-on-plane information (X and Y coordinate values described later), and the depth-position information (a Z coordinate value described later), both of which correspond to each pixel, an object to which each pixel belongs is identified.

For example, a process of previously storing the position-on-plane and depth-position information for all the pixels within an object region corresponding to a specific object, in association with the specific object, would enable the specific object to be identified by reference to the position-on-plane and depth-position information for each pixel.

However, in an environment where an entirety of a specific object is displayed at a single depth position, a process of previously storing only the depth-position information in association with a specific object, would enable the specific object to be identified by reference only to the depth-position information for each pixel.

In addition, if the shape of an object allows, then a process of previously storing the position-on-plane information in association with a specific object can be eliminated for at least a part of a plurality of pixels belonging to the object.

Describing the depth-position and position-on-plane information in more detail below, each pixel in a displayed image is defined based on an X-Y-Z orthogonal coordinate system, as illustrated in, for example, FIG. 15. The depth position of each pixel in a displayed image is defined using a Z coordinate value, while the position of each pixel on a plane that is orthogonal to the depth direction is defined using X and Y coordinate values.

Accordingly, the depth-position information includes information representing Z coordinate values on a pixel-by-pixel basis. In addition, for pixels belonging to the same object, their depth positions of pixels are identical or close to each other. As a result, the depth-position information may include information representing Z coordinate values on an object-by-object basis.

In contrast, the position-on-plane information includes information indicating pairs of X and Y coordinate values on a pixel-by-pixel basis. The position-on-plane information further includes information for distinguishing an area where an object is present and an area where no object is present from each other, both on a plane having a depth position identical to that of the object, on an object-by-object basis.

For each object to be displayed at a corresponding depth position, the wavefront-curvature modulator 16 illustrated in FIG. 2 is operated based on the aforementioned depth-position information. The principle according to which the wavefront-curvature modulator 16 modulates the curvature of wavefront of light will be described in more detail below with reference to FIG. 13.

In addition, presupposed that a plurality of objects different in depth position from one another have no overlap with one another as viewed in a single view direction, the viewer's simultaneous perception of those objects can be achieved by constructing the wavefront-curvature modulator 16 to include a single modulating device for modulating the curvature of wavefront of light, and by causing the modulating device to modulate the curvature of wavefront of light at a higher rate.

In contrast, alternatively presupposed that those objects, are allowed to have overlaps with one another as viewed in a single view direction, the achievement of the viewer's simultaneous perception of those objects requires, for example, an arrangement in which the wavefront-curvature modulator 16 is constructed to include a plurality of modulating devices, each of which independently modulates the curvature of wavefront of light, and that the modulating devices are operated together, whereby the curvature of wavefront of light is modulated on an object-by-object basis.

To the same end, there may be an alternative arrangement in which all of a plurality of scan lines forming a single screen image are not assigned to a single object, but in which the scan lines are divided into a plurality of groups, and each group is assigned to each corresponding object.

This arrangement would allow the viewer to perceive a plurality of objects together, which have overlaps with one another as viewed from the viewer, with the aid of the eye's lag or spectrum, even if the wavefront-modulator 16 includes only one modulating device.

Although some structural variations of the wavefront-curvature modulator 16 have been described above, these variations can be employed in a wavefront-curvature modulator 208 described below.

Figure 9:
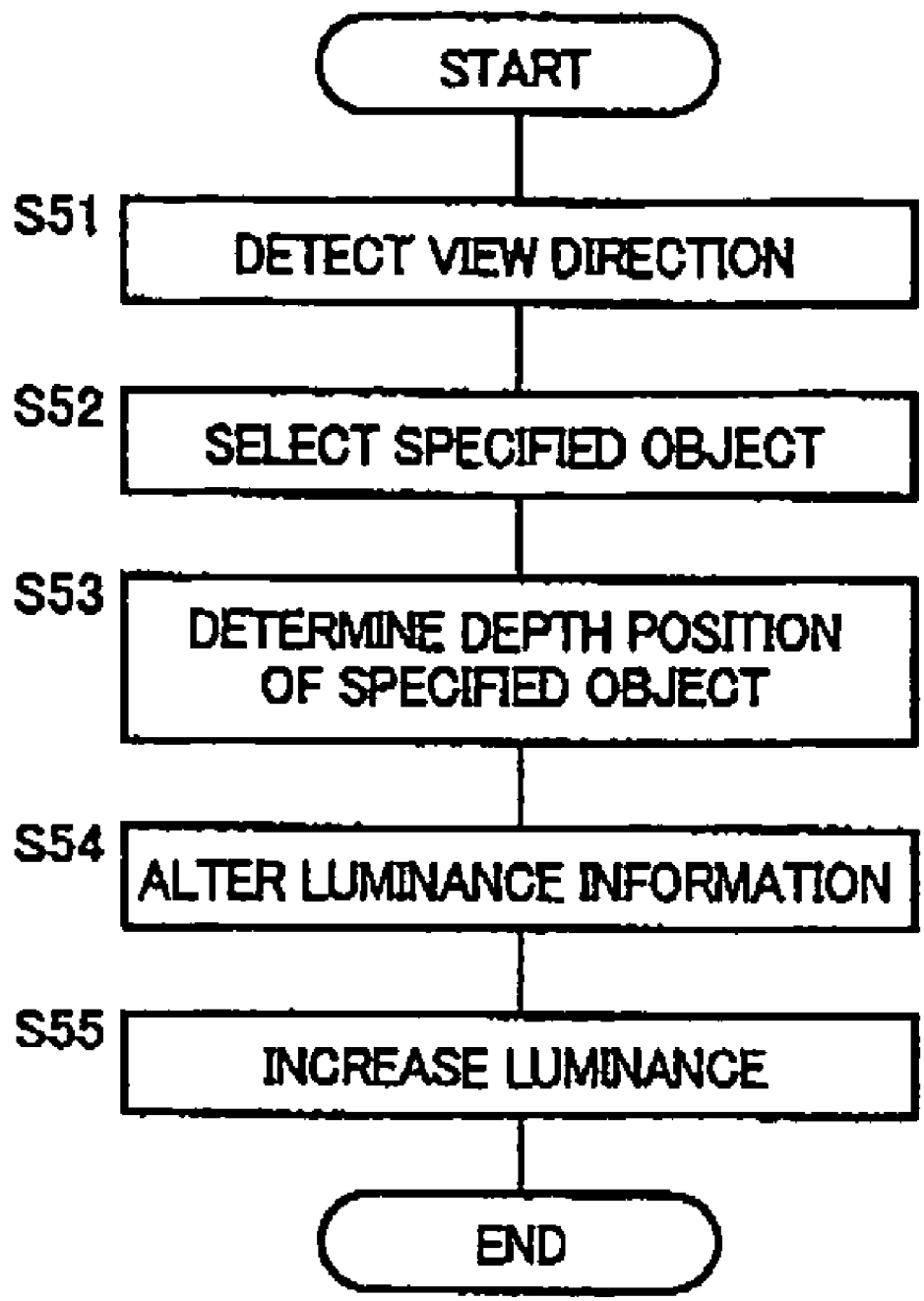
FIG. 9 is a flow chart schematically illustrating an image processing program executed by a computer 66 depicted in FIG. 8.

The ROM portion of the RAM/ROM 62 of the computer 66 has previously stored therein an image processing program for performing the aforementioned image processing. FIG. 9 schematically illustrates in flow chart the image processing program.

The image processing program is repeatedly executed while the computer 66 is being powered. Each cycle of execution of the image processing program begins with a step S51 illustrated in FIG. 9 to detect a viewer's view directions for both eyes, using the view-direction detecting device 180.

The step S51 is followed by a step S52 to select as a specified object, one of a plurality of objects in a current displayed image that the viewer is focusing on (gazing at), based on a relation between the detected view directions, and the geometry (e.g., special position and direction) of each object represented by a plurality of sets of image information which has been stored in the image information memory 74 for displaying the plurality of objects in the current displayed image.

More specifically, the step S52 is implemented, for example, on an object-by-object basis, so as to determine an intersection of a line indicative of each of the detected view directions and a plane identical in depth position with each object, and so as to determine whether or not the determined intersection is within an object region corresponding to each object. If the intersection is within in the corresponding object region, then the object is determined as an object that the viewer is focusing on.

The step S52 is followed by a step S53 to obtain a depth position of the selected specified object, based on the depth-position information of the plurality sets of image information which has been associated with the specified object, the depth position being represented by a coordinate value in the Z axis (i.e., a Z coordinate value) located with respect to the viewer so as to extend ahead from the viewer.

The step S53 is followed by a step S54 to determine whether or not the selected specified object is close to the viewer, based on comparisons between the obtained Z coordinate value and a predetermined reference value. If the specified object is close to with the viewer, then the step S54 is implemented to alter luminance information corresponding to the specified object thereby achieving a higher luminance with which the specified object is to be displayed, than a standard luminance. The luminance information has been stored in the image information memory 74 in association with each object.

The step 554 is followed by a step S55 to increase the luminance of the specified object for it to become higher than the standard luminance, as a result of the operation of the light-intensity modulator 14, based on the altered luminance information. In the present embodiment, the luminance of the entire specified object is increased to become higher than the standard luminance.

Then, one cycle of the image processing program is terminated.

Similarly with the first embodiment, the present embodiment, in response to a viewer's specific motion, would allow automated appearance (coming into view) of a displayed image and automated movement of the displayed image upon appearing.

Further, where a plurality of objects are displayed together, the present embodiment would allow one of the plurality of objects on which the viewer is focusing, to be automatically selected as a specified object, and would allow the image processing for displaying the selected specified object relatively clearly, to be automatically started.

As described above, the present embodiment would allow the operation of the image display processing to automatically reflect viewer's intention or instructions, without requiring any viewer's manual operation, resulting in the realization of a display system with enhanced usability.

As is apparent from the above, in the present embodiment, a portion of the computer 66 which is assigned to implement the steps S51 and S52 illustrated in FIG. 9 and the view-direction detecting device 180 corporate to constitute an example of the "selector" set forth in the above mode (19), and an example of the "specified-object detector" set forth in the above mode (21). In addition, a portion of the computer 66 which is assigned to implement the steps S53 and S54 illustrated in FIG. 9 constitutes an example of the "image processor" set forth in the above mode (19), and an example of the "image processor" set forth in the above mode (20).

Further, in the present embodiment, a portion of the computer 66 which is assigned to implement the step S51 illustrated in FIG. 9 and the view-direction detecting device 180 corporate to constitute an example of the "view-direction detector" set forth in the above mode (22), and a portion of the computer which is assigned to implement the step S52 illustrated in FIG. 9 constitutes an example of the "determining unit" set forth in the same mode.

It is added that, in the present embodiment, increasing the luminance of a specified object to become higher than a standard luminance permits the viewer to clearly visually perceive the specified object.

Alternatively, the present invention may be practiced in an arrangement in which the luminance values of non-specified objects which are ones of the plurality of objects other than a specified object, are actually decreased to become lower than a standard luminance, to thereby resultantly relatively increase the luminance of the specified object, resulting in the viewer's clearer visual perception of the specified object.

It is further added that, in the present embodiment, a specified object is selected or identified, based on the detected view directions, i.e., the view directions for the viewer's left and right eyes, and the aforementioned geometry of the specified object.

Alternatively, the present invention may be practiced in an arrangement, as described later in greater detail with reference to FIG. 22, in which the gaze points of the viewer's left and right eyes are calculated, based on the view directions for the left and right eyes and a known distance between the left and right eyes, and in which a specified object is selected or identified, based on the calculation result and the aforementioned geometry of the specified object.

It is still further added that, in the present embodiment, the luminance of a specified object is increased to become higher than a standard luminance, so that the specified object may be more clearly visually perceived by the viewer than remaining objects.

Alternatively, the present invention may be practiced in an arrangement in which the boundary of a specified object is displayed more clearly (visibly) than normal, or an arrangement in which a specified object is displayed together with a separate boundary line image attached to the specified object along the outline of the specified object, both for enabling the viewer's clearer visual perception of the specified object.

It is yet further added that, the present invention may be practiced in an arrangement in which non-specified objects located in front of a specified object are displayed transparently or semi-transparently, allowing the viewer to more clearly visually perceive the specified object, without visual obstruction by the non-specified objects.

Next, a retinal scanning display constructed according to a third embodiment of the present invention will be described.

Figure 10:
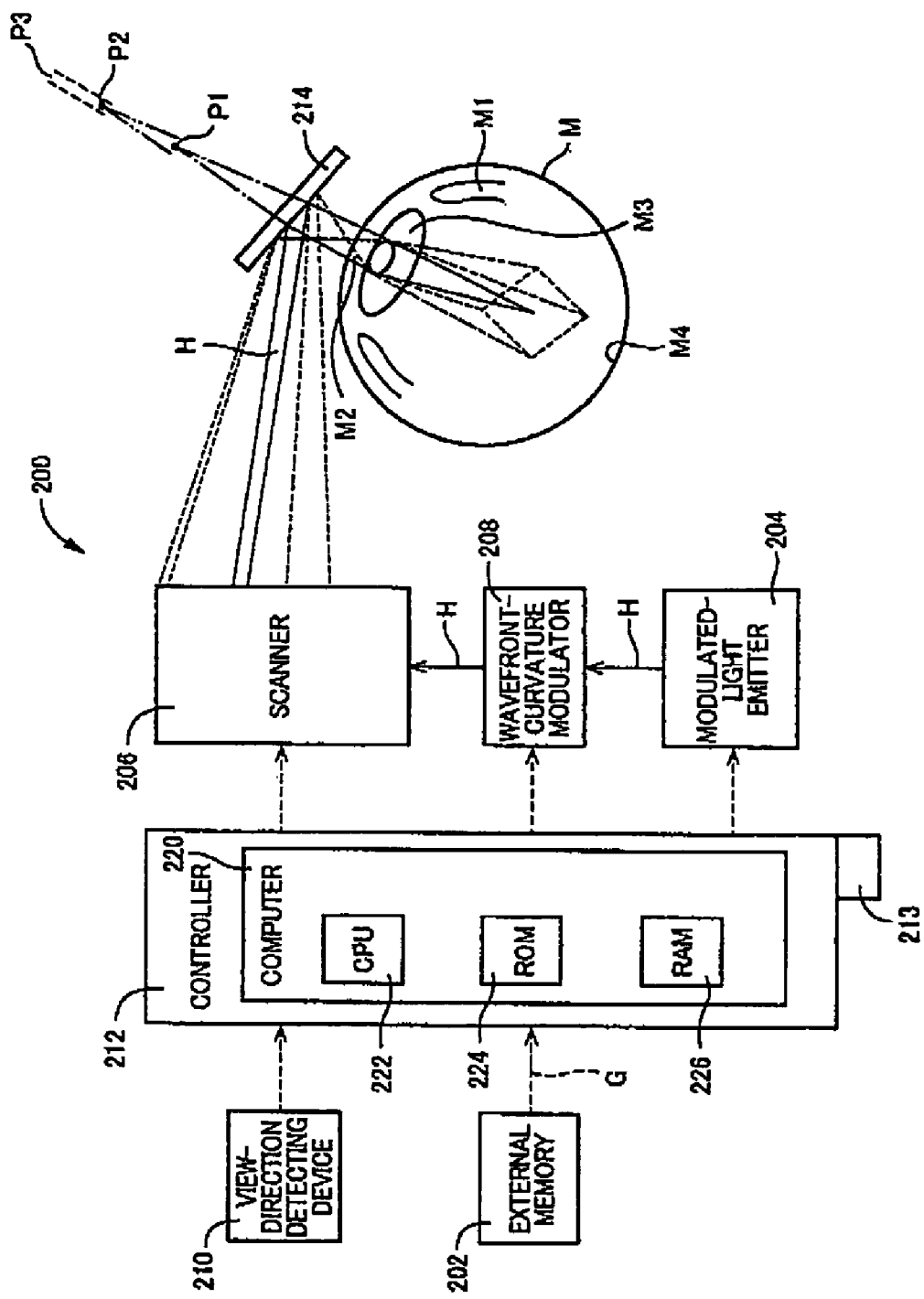
FIG. 10 is a view including a block diagram and an optical path diagram for explaining the construction and the operation of a retinal scanning display 200 constructed according to a third embodiment of the present invention.

FIG. 10 schematically illustrates in block diagram the configuration of a retinal scanning display (hereinafter, abbreviated as "RSD") 200 constructed according to the present embodiment. FIG. 10 also illustrates in optical path diagram an optical path along which the light travels, after leaving the RSD 200, until reaching a viewer's eye M.

The RSD 200 is an example of a display system in which image light indicative of a to-be-displayed image is scanned on a retina M4 of the viewer's eye M, to thereby directly project the image on the retina M4.

The RSD 200 allows a plurality of objects to be displayed together in a single displayed image. Where the plurality of objects are different from one another in the depth position at which each object is to be displayed, the depth position of each object, that is to say, the curvature of wavefront of each image light for displaying each corresponding object is controlled to allow the viewer to perceive the differences in depth position between the plurality of objects.

In the present embodiment, there is selected as a specified object, one of a plurality of objects displayed that the viewer is focusing (gazing at). Upon selection, the image processing is performed for modifying a display format in which the image including the plurality of objects is displayed, for allowing the viewer to clearly visually perceive the selected specified object.

More specifically, the image processing is performed for allowing a specified object and a non specified object which is a remaining one of the plurality of objects, to be displayed in different display formats.

Still more specifically, in the present embodiment, similarly with the second embodiment, the luminance of a specified object is increased to become higher than a standard luminance, enabling the viewer's clearer visual perception of the specified object.

As illustrated in FIG. 10, the RSD 200 is an optical device in which light H modulated in accordance with image information G is scanned directly on the retina M4 of the eye M, to thereby directly project an image on the retina M4.

This RSD 200 includes an external memory 202, a modulated-light emitter 204, a scanner 206, a wavefront-curvature modulator 208, a view-direction detecting device 210, and a controller 212.

The external memory 202 is an electronic component in which the image information G required for displaying a to-be-displayed image has been previously stored. The RSD 200, upon activated in response to the viewer's manual operation of a power switch 213 of the RSD 200, displays an image based on the image information G which has been previously stored in the external memory 202.

The image information G includes (a) a plurality of sets of geometrical information including position-on-plane information for specifying a two-dimensional position of an image to be displayed, and depth-position information for specifying a depth-position of an image to be displayed; (b) color information for specifying a color of an image to be displayed; and (c) luminance information for specifying a luminance of an image to be displayed.

The controller 212 controls the modulated-light emitter 204 based on the color information and the luminance information, controls the scanner 206 in response to a sync signal, and controls the wavefront-curvature modulator 208 based on the depth-position information.

The modulated-light emitter 204 is an optical instrument that modulates light based on the aforementioned color information and luminance information, and that outputs the modulated light H. The modulated light H output from the modulated-light emitter 204, after undergoing the wavefront-curvature modulation by the wavefront-curvature modulator 208, deflection by the scanner 206, and reflection by a light reflector 214, enters a pupil M2 surrounded by an iris M1 of the viewer's eye M. The modulated light H incident on the pupil M2, after focused to a crystalline lens M3, reaches the retina M4.

The scanner 206 is an optical instrument that scans the modulated light H on the retina M4 in response to the aforementioned sync signal, to thereby project an image on the retina M4.

The wavefront-curvature modulator 208 is an optical instrument that varies a beam spread angle (corresponding to the curvature of wavefront) of the modulated light H which has been reflected from the light reflector 214 and which eventually enters the eye M, to thereby vary a depth position at which the viewer perceives a displayed image. The operation of the wavefront-curvature modulator 208 is controlled by the controller 212 based on the aforementioned depth-position information.

More specifically, as illustrated in dot-dash lines in FIG. 10, the wavefront-curvature modulator 208 allows an image to be displayed so that the viewer may perceive the image at a closer position P1 to the viewer. Instead, as illustrated in two-dotted lines in FIG. 10, the wavefront curvature modulator 208 allows an image to be displayed so that the viewer may perceive the image at a farther position P2 from the viewer. Instead, as illustrated in broken lines in FIG. 10, the wavefront-curvature modulator 208 allows an image to be displayed so that the viewer may perceive the image at a still farther position P3 from the viewer.

The view-direction detecting device 210 is a device that detects a view direction of the viewer. The use of the viewer's view direction detected by the view-direction detecting device 210, would enable separation of a specified image (specified sub-image) which is a portion of a displayed image on which the viewer is focusing, and a non-specified image (non-specified sub-image) which is a separate portion of the same displayed image on which the viewer is not focusing. Because a current displayed image (displayed total-image) contains a plurality of objects (sub-images), a specified image is referred to as a specified object, while a non-specified image is referred to as a non-specified object.

The view-direction detecting device 210 may be configured in a similar manner with the aforementioned view-direction detecting device 180. The view-direction detecting device 210 may be configured, for example, so as to photograph the viewer's both eye balls with an infrared camera having known distances from the both eyes, and to compute a view direction for each eye in accordance with a relative positional relation between a reflected image of the cornea and the center of the pupil, of each eye photographed.

As illustrated in FIG. 10, the controller 212 is principally configured with a computer 220. As is well known, the computer 220 is configured to include a CPU 222, a ROM 224, and a RAM 226. The controller 212 performs predetermined operations by causing the CPU 222 to execute various programs which has been previously stored in the ROM 224.

As described above, the controller 212 controls the modulated-light emitter 204 based on the color information and the luminance information, controls the scanner 206 in response to a sync signal, and controls the wavefront-curvature modulator 208 based on the depth-position information. The controller 212 performs the image processing to alter the luminance of a specified object, not only for providing the function of displaying images in a normal manner, which is a basic function, but also for allowing the viewer to clearly visually perceive the specified object.

More specifically, the controller 212 performs the image processing to alter the luminance information corresponding to each object, based on a depth-position at which each object is to be displayed. In order to perform the image processing, the controller 212 modifies the image information G which has been previously stored in the external memory 202, in accordance with the image processing to be performed, and stores the modified image information G in the RAM 226. Thus, the controller 212 controls the modulated-light emitter 204, the scanner 206, and the wavefront-curvature modulator 208, based on the luminance information, the position-on-plane information, and the depth-position information, all of which are stored in the RAM 226, respectively.

Then, the external memory 202, the modulated-light emitter 204, the wavefront-curvature modulator 208, and the scanner 206 will be described in configuration in greater detail below.

Figure 11:
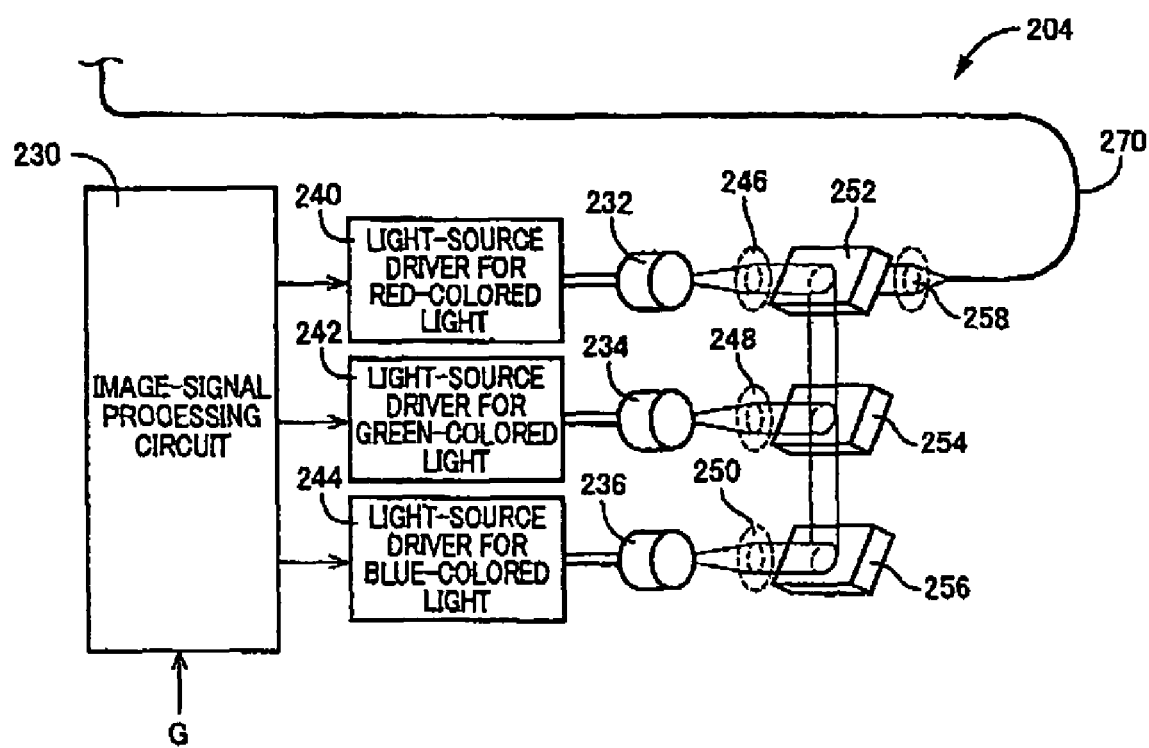
FIG. 11 is a view for explaining the construction of a modulated-light emitter 204 depicted in FIG. 10.

As illustrated in FIG. 11, the modulated-light emitter 204 includes an image-signal processing circuit 230, and also includes light sources, in the form of a light source 232 for red-colored light, a light source 234 for green-colored light, and a light source 236 for blue-colored light. This modulated-light emitter 204 further includes light-source drivers in the form of a light-source driver 240 for red-colored light, a light-source driver 242 for green-colored light, and a light-source driver 244 for blue-colored light.

This modulated-light emitter 204 yet further includes collimator lenses 246, 248 and 250: wavelength-selective mirrors 252, 254, and 256; and a focus lens 258.

The image-signal processing circuit 230 outputs, on a color-by-color basis, intensity-modulation signals to the light-source drivers 240, 242, and 244, which are for use in driving the corresponding respective light sources 232, 234, and 236, in accordance with the color information and the luminance information both output from the aforementioned controller 212.

The image-signal processing circuit 230, in the absence of modification to the color information and the luminance information by the aforementioned image processing, outputs the intensity-modulation signals to the light-source drivers 240, 242, and 244, respectively, in accordance with the original color information and the original luminance information.

In contrast, the image-signal processing circuit 230, upon the color information being modified, modifies the intensity-modulation signals in accordance with the modified color information. Therefore, the color of an image to be displayed can be changed into any color, and also an image can be displayed transparently as a result of no output of color.

On the other hand, the image-signal processing circuit 230, upon the luminance information being modified, modifies the intensity-modulation signals in accordance with the modified luminance information, and controls the light-source drivers 240, 242, and 244 based on the modified intensity-modulation signals. Due to this, the luminance of an image to be displayed can be changed to any level by increasing or decreasing the luminous intensity (or light intensity) of selected ones of the light sources 232, 234, and 236.

Figure 12:
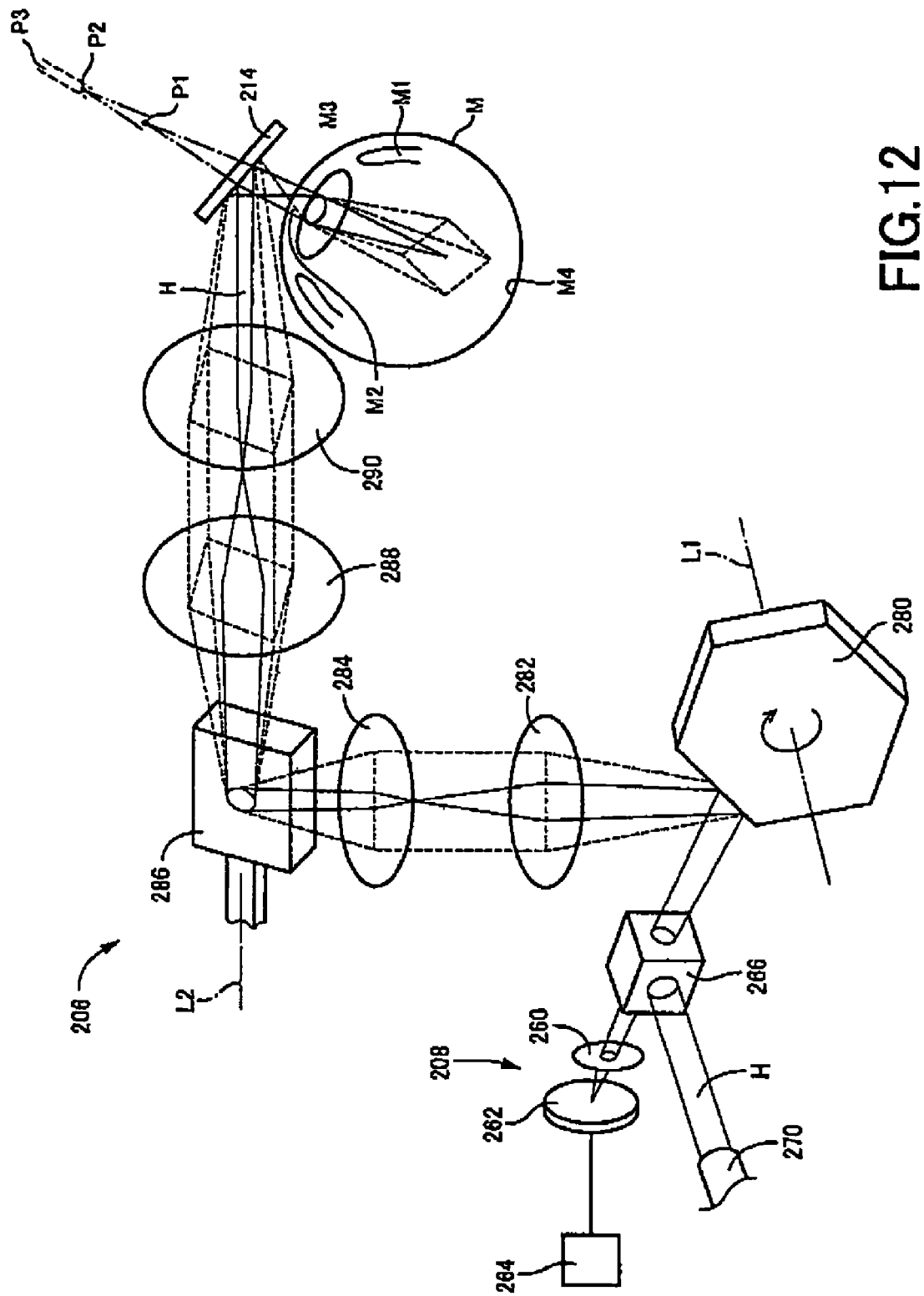
FIG. 12 is a view for explaining the construction of a scanner 206 and a wavefront-curvature modulator 208 both depicted in FIG. 10.
Figure 13:
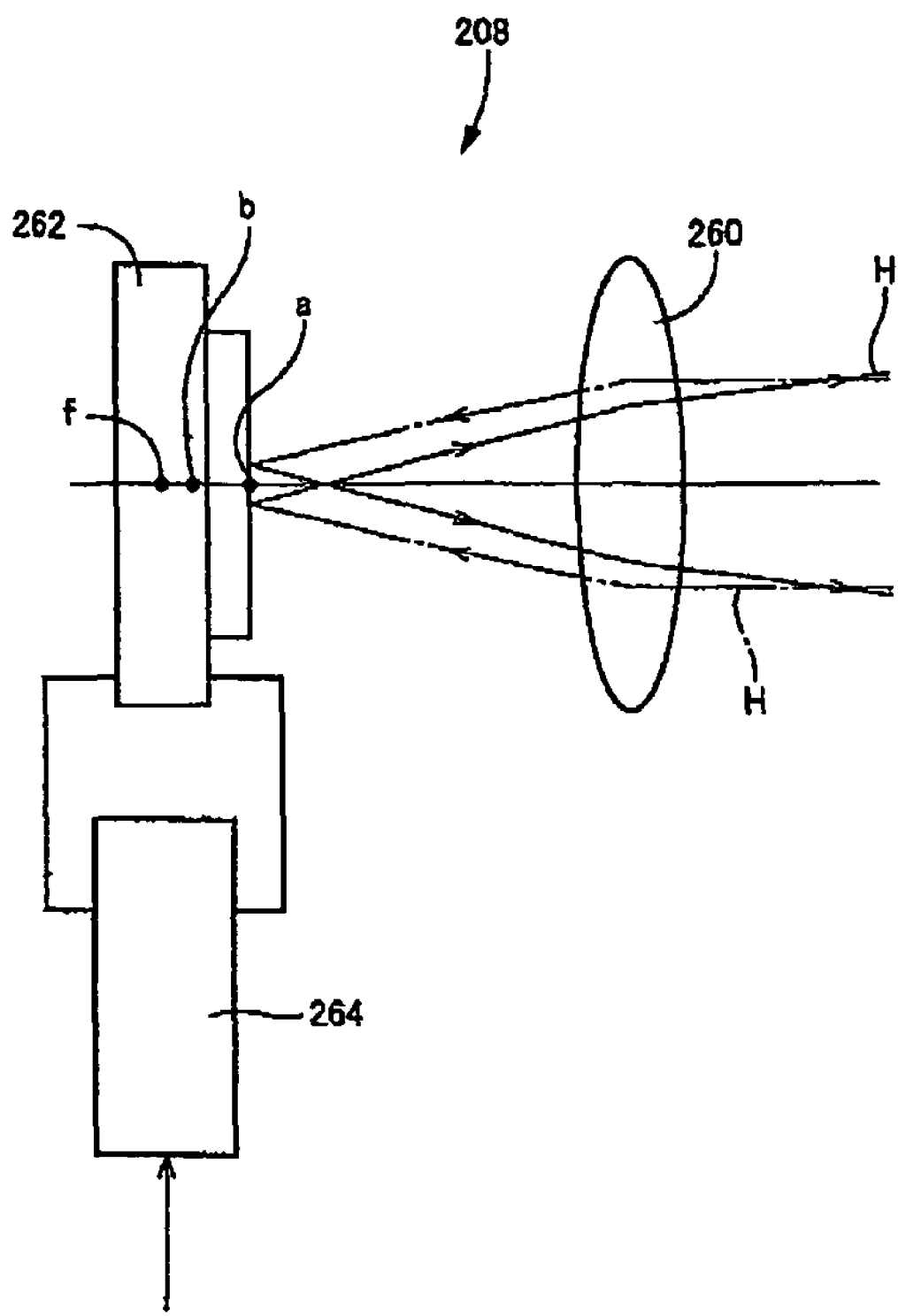
FIG. 13 is a view for explaining the principle according to which the wavefront-curvature modulator 208 modulates a curvature of wavefront.

Referring next to FIGS. 12 and 13, the configuration of the aforementioned wavefront-curvature modulator 208 will be described in greater detail below.

As illustrated in FIG. 12, the wavefront-curvature modulator 208 includes a convex lens 260, a movable mirror 262, a mirror actuator 264, and a semi-transparent mirror 266. As illustrated in FIGS. 11 and 12, the modulated light H emerging from the aforementioned modulated-light emitter 204 is relayed to the semi-transparent mirror 266 via an optical fiber 270. The semi-transparent mirror 266 functions as an entrance of the modulated light H into the wavefront-curvature modulator 208.

As illustrated in FIG. 13, the movable mirror 262 is disposed on the optical axis of the convex lens 260. The movable mirror 262 is so disposed as to be movable between a focal point "f" of the convex lens 260 and a position "a" positioned closer to the convex lens 260 than the focal point "f." A position "b" illustrated in FIG. 13 is defined as an intermediate position between the position "a" and the focal point "f." FIG. 13 illustrates the movable mirror 262 with its reflecting surface being located at the position "a."

As illustrated in FIG. 13, if the movable mirror 262 is located at the position "a," which is closer to the convex lens 260 than the focal point "f" of the convex lens 260, then the viewer perceives an image at a position P1 in the vicinity of the viewer, as illustrated in FIG. 12 in dot-dash lines. The reasons will be described below.

In an example illustrated in FIG. 13, the reflecting surface of the movable mirror 262 is located between the focal point "f" of the convex lens 260 and the convex lens 260. For this arrangement, the modulated light H, upon entry from the convex lens 260 into the movable mirror 262, as illustrated in FIG. 13 in dot-dash lines, is reflected from the movable mirror 262, and then is converted by the convex lens 260 into diverging light, as illustrated in FIG. 13 in solid lines. Once the modulated light B which has been converted into diverging light enters the viewer's eye M, the viewer perceives an image at the position P1 illustrated in FIG. 12.

In contrast, where the reflecting surface of the movable mirror 262 is located at the focal position "f" of the convex lens 260, the modulated light H reflected from the movable mirror 262, is collimated by the convex lens 260, and enters the viewer's eye M in the form of parallel light. As a result, the viewer perceives an image at a far position P3, as illustrated in FIG. 12 in broken lines.

On the other hand, where the reflecting surface of the movable mirror 262 is located at a position "b" between the position "a" and the focal point "f," the viewer perceives an image at the position P2, as illustrated in FIG. 12 in two-dotted lines.

The mirror actuator 264 illustrated in FIG. 13 is formed with, for example, a piezoelectric material. In this example where the mirror actuator 264 is formed with a piezoelectric material, the aforementioned movable mirror 262 may be attached to the mirror actuator 264 on one or more than one of faces of the piezoelectric material which is not parallel to a direction in which an electrical field is to be impressed to the mirror actuator 264.

In this example, variation in voltage or electrical field impressed across the piezoelectric material introduces variation in thickness of the piezoelectric material. The variation in thickness of the piezoelectric material allows the movable mirror 262 to move away from or toward the convex lens 260, resulting in the capability of moving the movable mirror 262 to any one of the positions "a" and "b," and focal point "f."

The position of the movable mirror 262 is controlled based on the depth-position information. Therefore, modification in the depth-position information allows the depth-position of an image to be displayed, to change to any position between the positions P1 and P3 illustrated in FIG. 12.

Referring next to FIG. 12, the configuration of the aforementioned scanner 206 will be described in greater detail below.

As illustrated in FIG. 12, the scanner 206 includes a horizontal scanning mirror 280, relay lenses 282 and 284 (e.g., convex lenses), a vertical scanning mirror 286, and relay lenses 288 and 290 (e.g., convex lenses).

As illustrated in FIG. 12, the horizontal scanning mirror 280 is provided rotatable about an axis of rotation L1. This horizontal scanning mirror 280 reflects the modulated light H emerged from the aforementioned semi-transparent mirror 266, in a direction dependent on a rotational position of the horizontal scanning mirror 280. The rotation of the horizontal scanning mirror 280 is controlled in response to the aforementioned sync signal.

The vertical scanning mirror 286 is provided to be capable of oscillatory rotation about an axis of rotation L2. The rotation of the vertical scanning mirror 286 is controlled in response to the aforementioned sync signal.

The relay lenses 282 and 284 relay the modulated light H, upon reflected from the horizontal scanning mirror 280, to the vertical scanning mirror 286. The relay lenses 28B and 290 relay the modulated light H, upon reflected from the vertical scanning mirror 286, to the retina M4, so as to allow the modulated light H to pass sequentially through the pupil M2 and the crystalline lens M3.

Figure 14:
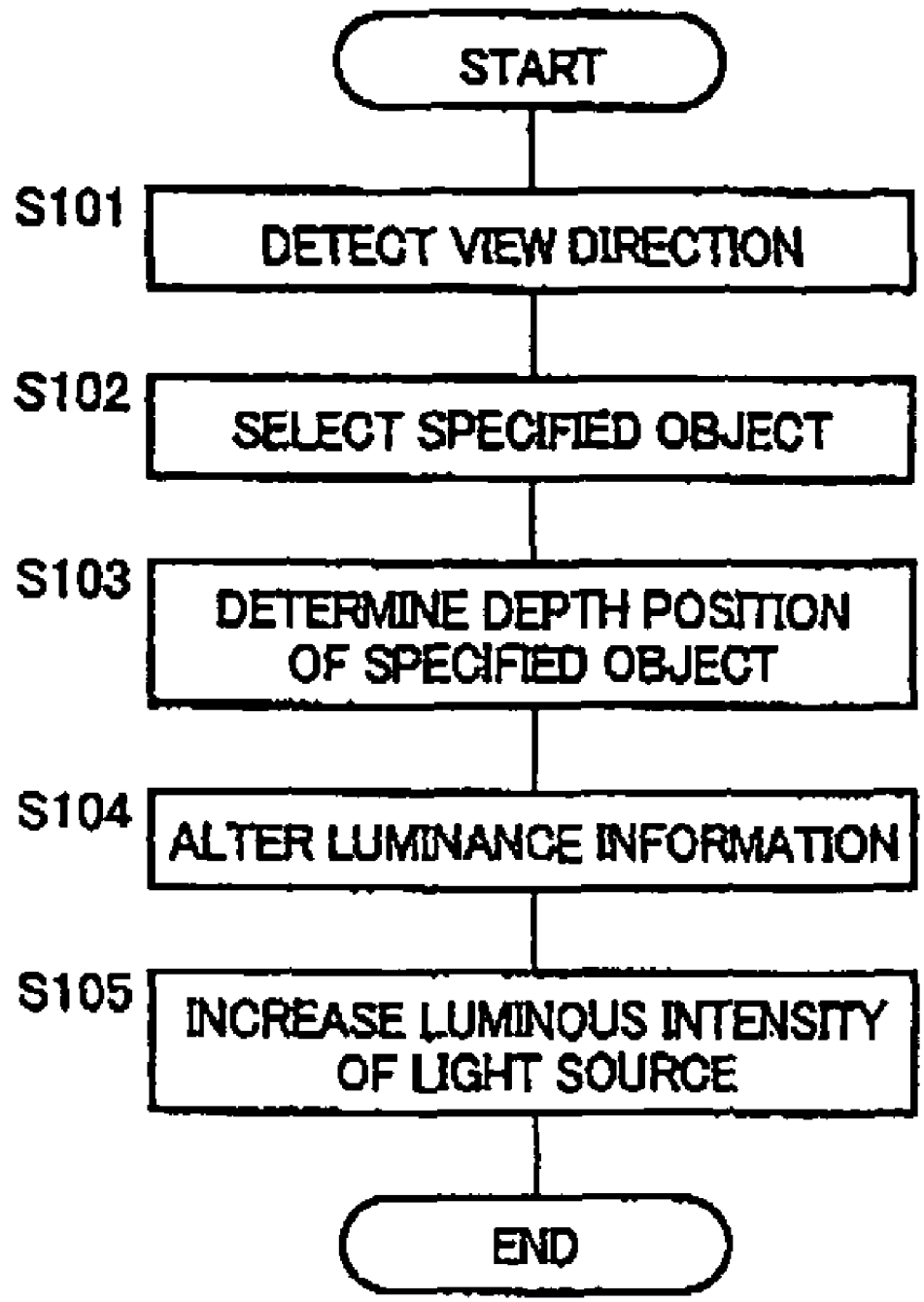
FIG. 14 is a flow chart schematically illustrating an image processing program executed by a computer 220 depicted in FIG. 10.

For performing the aforementioned image processing to allow the viewer to clearly visually perceive a specified object, an image processing program has been previously stored in the ROM 224 of the computer 220. FIG. 14 schematically illustrates in flow chart the image processing program.

Then, this image processing program will be described below, by briefly explaining commons steps in this image processing program to those in the image processing program in the second embodiment.

This image processing program is repeatedly executed while the computer 220 is being powered. Each execution of the image processing program begins with a step S101 illustrated in FIG. 14 to detect a viewer's view direction, using the view-direction detecting device 210.

Next, a step S102 is implemented, similarly with the step S52 illustrated in FIG. 9, to select as a specified object, one of a plurality of objects in a current displayed image, on which the viewer is focusing (gazing at), based on a relation between the detected view direction, and the geometry (e.g., special position and direction) of each object represented by a plurality of sets of image information which has been stored in the external memory 202 for displaying the plurality of objects in the current displayed image.

The step S102 is followed by a step 5103 to obtain a depth position of the selected specified object, based on the depth-position information of the plurality sets of image information which has been associated with the specified object, the depth position being represented by a coordinate value in the Z axis (i.e., a Z-axis coordinate value) located with respect to the viewer so as to extend ahead from the viewer.

The step 5103 is followed by a step 5104 to determine whether or not the selected specified object is close to the viewer, based on comparisons between the obtained Z-axis coordinate value and a predetermined reference value. If the specified object is close to with the viewer, then the step S104 is implemented to alter luminance information corresponding to the specified object, to increase the luminance with which the specified object is to be displayed, for the luminance to become higher than a standard luminance. The luminance information has been stored in the external memory 202 in association with each object.

The step S104 is followed by a step S105 to control selected one or more than one of the light source drivers 240, 242, and 244 for red-, green-, blue-colored light, in relation to the displaying of the specified object, based on the altered luminance information.

It follows that the luminous intensity or light intensity of the selected one or more than one of the light sources 232, 234, and 236 is increased for it to become higher than a standard luminance, resulting in the luminance of the specified object being increased to become higher than a standard luminance. In the present embodiment, the luminance of the entire specified object is increased to become higher than the standard luminance.

Then, one cycle of the image processing program is terminated.

Next, the image processing performed as a result of the execution of the image processing program will be described in greater detail, by way of an example of an image illustrated in FIG. 15.

Figure 15:
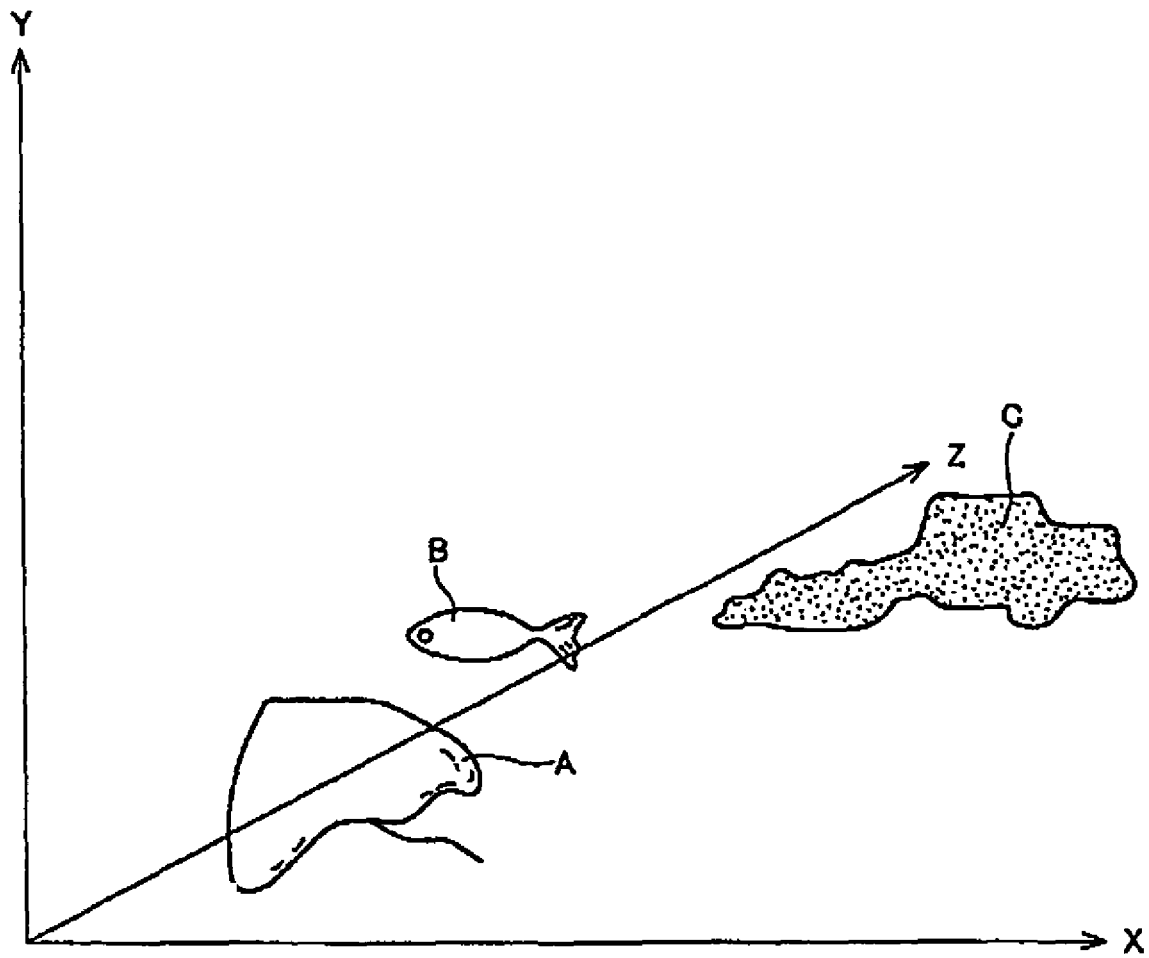
FIG. 15 is a perspective view illustrating an example of a display image for explaining the image processing program depicted in FIG. 14.

In the example illustrated in FIG. 15, there is displayed in a stereoscopic manner, an image indicating that a ray (a type of sea-fish). A, a bream B, and coral C are located within a glass tank, such that the ray A is closer to the viewer than the bream B, and such that the bream B is closer to the viewer than the coral C. In this example, a set of sub-images of the ray A, the bream B, and the coral C constitute an example of a plurality of objects to be displayed together. In the following description, it is presupposed that the viewer is focusing on the image of the bream B with the plurality of objects being displayed together.

Once the aforementioned image processing program is executed by the computer 220 for the above example, the step S101 is initiated to detect the viewer's view direction using view-direction detecting device 210. The step S102 follows to select as a specified object on which the viewer is focusing, one of the plurality of objects which is located on the line indicative of the detected view direction, which is to say, in this example, the image of the bream B.

The step S103 follows to obtain the depth position of the image of the bream B, which is to say, a coordinate value on the Z-axis indicating the position of the bream B as illustrated in FIG. 15, based on the depth position information of the image information G which has been previously stored in the external memory 202.

The step S104 follows to determine whether or not the position of the bream B on the Z axis is close to the viewer. If the bream B is close to the viewer, then the S104 is implemented to alter the luminance information associated with the bream B to increase the luminance of the image of the bream B.

The step S105 follows to enter the image information G including the luminance information which has been modified in relation to the image of the bream B, into the modulated-light emitter 204. Due to this, in timely relation with the presentation of the image of the bream B, the luminous intensities of the light sources 232, 234, and 236 are increased via the light-source drivers 240, 242, and 244, resulting in increase in luminance of the entire image of the bream B.

As is apparent from the above, once the present embodiment is practiced when a specified object on which the viewer is focusing is close to the viewer, the luminance of the specified object is increased, to thereby allow the viewer to perceive the specified object more clearly than the remaining objects located farther from the viewer than the specified object.

It is added that, in the present embodiment, the luminance of a specified object is variable in two values, depending on whether or not the specified object is close to the viewer.

Alternatively, the present invention may be practiced in an arrangement in which the luminance of a specified object is variable in more than two values. In addition, the present invention may be practiced in a still alternative arrangement in which the luminance of a specified object is continuously varied as the specified object becomes closer to the viewer.

It is further added that the present invention may be practiced in a further alternative arrangement in which the luminance of a specified object is increased as the specified object becomes farther from the viewer. The employment of this arrangement is employed would allow the viewer to clearly visually perceive the specified object, despite that the specified object is located far from the viewer.

As is apparent from the above, in the present embodiment, a portion of the computer 220 which is assigned to execute the steps S101 and S102 illustrated in FIG. 14 and the view-direction detecting device 210 corporate to constitute an example of the "selector" set forth in the above mode (29), and an example of the "specified-object detector" set forth in the above mode (31). In addition, a portion of the computer 220 which is assigned to execute the steps S103 and S104 illustrated in FIG. 14 constitutes an example of the "image processor" set forth in the above mode (29), and an example of the "image processor" set forth in the above mode (30).

Further, in the present embodiment, a portion of the computer 220 which is assigned to execute the step S101 illustrated in FIG. 14 and the view-direction detecting device 210 corporate to constitute an example of the "view-direction detector" set forth in the above mode (32), and a portion of the computer 220 which is assigned to execute the step S102 illustrated in FIG. 14 constitutes an example of the "determining unit" set forth in the same mode.

Still further, in the present embodiment, a portion of the computer 220 which is assigned to execute the steps S104 and S105 illustrated in FIG. 14 constitutes an example of the "image processor" set forth in the above mode (35).

Figure 16:
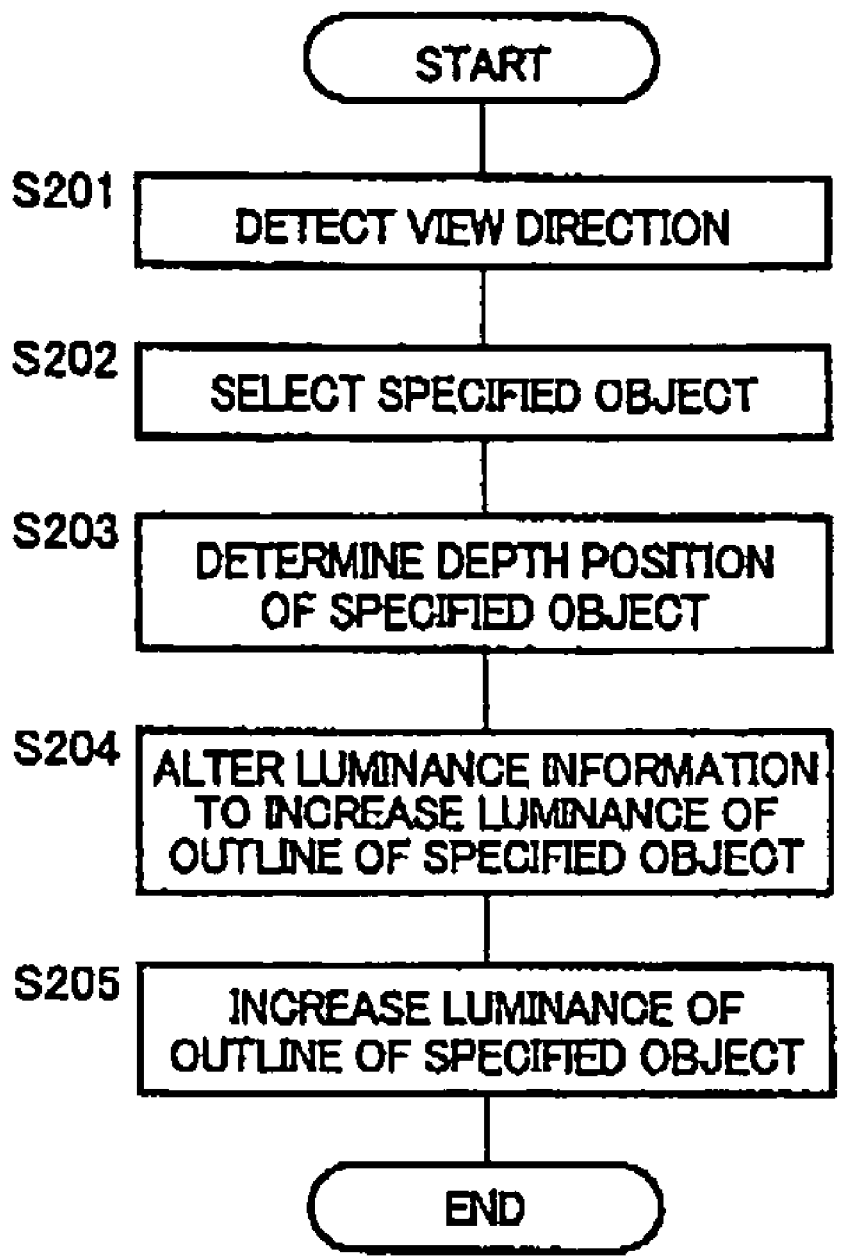
FIG. 16 is a flow chart schematically illustrating an image processing program executed by a computer 220 of a retinal scanning display 200 constructed according to a fourth embodiment of the present invention.

Referring next to FIG. 16, a fourth embodiment of the present invention will be described. The present embodiment is different from the second or third embodiment, only with respect to elements related to image processing for displaying a specified object more clearly than a non-specified object, and the present embodiment is common to the second or third embodiment, with respect to other elements.

In view of this, for the illustrative purposes of the present embodiment, only the different elements of the present embodiment from the second or third embodiment will be described in greater detail, while the common elements of the present embodiment to those of the second or third embodiment will be referenced the same reference numerals or the same names, without redundant description or illustration.

In the second or third embodiment, a specified object is highlighted by increasing the luminance of the specified object. In contrast, in the present embodiment, the boundary of a specified object is displayed to be more visible than normal, more specifically, in the present embodiment, to be brighter than normal, for highlighting the specified object.

For performing the above-described image processing, an image processing program schematically illustrated in FIG. 16 has been stored in the ROM 224. This image processing program will be described below, such that, for the common steps of this image processing program to those of the image processing program illustrated in FIG. 14, the corresponding step numbers will be referred to instead of redundant description.

Each cycle of execution of this image processing program illustrated in FIG. 16 begins with a step S201 to detect a viewer's view direction, in the similar manner with that of the step S101. The step S201 is followed by a step S202 to select as a specified object, one of a plurality of objects being displayed together, on which the viewer is focusing, based on the detected view direction, in the similar manner with that of the step S102.

The step S202 is followed by a step S203 to determine the depth position of the selected specified object, in the similar manner with that of the step S103. The step S203 is followed by a step S204 to alter the luminance information associated with the specified object, to allow the luminance of a sub-plurality of a plurality of pixels filling the specified object, the sub-plurality forming the boundary of the specified object, to be increased to become higher than a standard luminance.

The step S204 is followed by a step S205 to control the modulated-light emitter 204 based on the altered luminance information, in the similar manner with that of the step S105. As a result, the luminance of the boundary of the specified object is locally increased to become higher than a standard luminance, and the boundary is highlighted.

Then, one cycle of execution of this image processing program is terminated.

More specifically, upon execution of this image processing program for an example illustrated in FIG. 15, the luminance information which has been previously stored in the external memory 202 is modified so as to increase in luminance only the boundary of an image of a bream B which is a specified object. The modulated-light emitter 104 enhances in luminance a plurality of pixels forming the boundary of the image of the bream B, based on the modified luminance information.

As is evident from the above, in the present embodiment, a portion of the computer 220 which is assigned to implement the steps S204 and S205 illustrated in FIG. 16 constitutes an example of the "image processor" set forth in the above mode (36).

Figure 17:
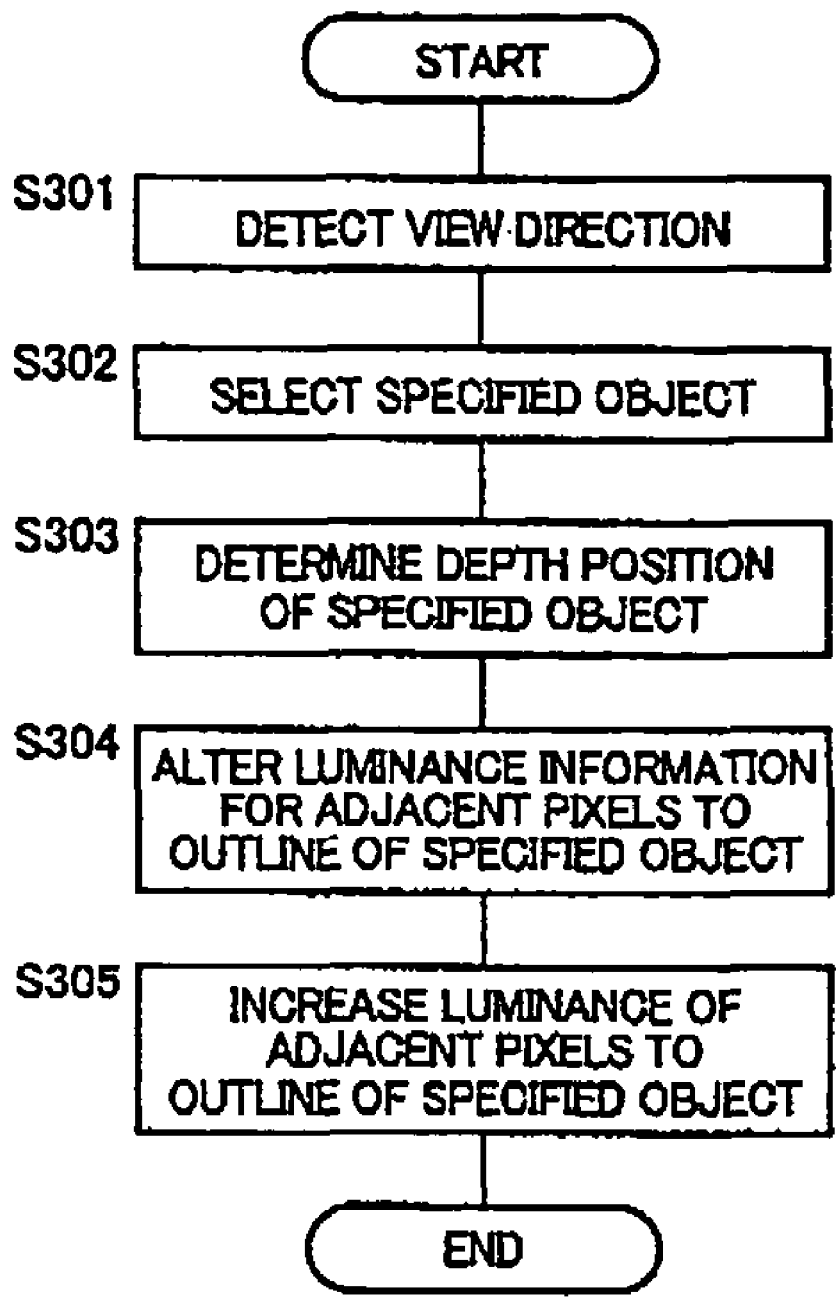
FIG. 17 is a flow chart schematically illustrating an image processing program executed by a computer 220 of a retinal scanning display 200 constructed according to a fifth embodiment of the present invention.

Referring next to FIG. 17, a fifth embodiment of the present invention will be described. The present embodiment is different from the second or third embodiment, only with respect to elements related to image processing for displaying a specified object more clearly than a non-specified object, and the present embodiment is common to the second or third embodiment with respect to other elements.

In view of this, for the illustrative purposes of the present embodiment, only the different elements of the present embodiment from the second or third embodiment will be described in greater detail, while the common elements of the present embodiment to those of the second or third embodiment will be referenced the same reference numerals or the same names, without redundant description or illustration.

In the second or third embodiment, a specified object is highlighted by increasing the luminance of the specified object. In contrast, in the present embodiment, selected pixels which are disposed outside and adjacent to the boundary of a specified object and which are located along the boundary are displayed to be more visible than normal, more specifically, in the present embodiment, to be brighter than normal, for highlighting the specified object.

For performing the above-described image processing, an image processing program schematically illustrated in FIG. 17 has been stored in the ROM 224. This image processing program will be described below, such that, for the common steps of this image processing program to those of the image processing program illustrated in FIG. 14, the corresponding step numbers will be referred to instead of redundant description.

Each cycle of execution of this image processing program illustrated in FIG. 17 begins with a step S301 to detect a viewer's view direction, in the similar manner with that of the step S101. The step S301 is followed by a step S302 to select as a specified object, one of a plurality of objects being displayed together, on which the viewer is focusing, based on the detected view direction, in the similar manner with that of the step S102.

The step S302 is followed by a step S303 to determine the depth position of the selected specified object, in the similar manner with that of the step S103. The step S303 is followed by a step S304 to select the adjacent pixels, a sub-plurality of a plurality of pixels conceptually located on a flat plane having the same depth position as the specified object, the sub-plurality being located outside the boundary of the specified object and within a predetermined distance from the boundary.

The step S304 is further implemented to alter the luminance information corresponding to the selected specified object, to increase the luminance of the selected adjacent pixels to become higher than a standard luminance.

The step S304 is followed by a step S305 to control the modulated-light emitter 204 based on the altered luminance information, in the similar manner with that of the step S105. As a result, the luminance of the adjacent pixels of the boundary of the specified object is locally increased to become higher than a standard luminance, and the adjacent pixels are highlighted.

Then, one cycle of execution of this image processing program is terminated.

More specifically, upon execution of this image processing program for an example illustrated in FIG. 15, the luminance information which has been previously stored in the external memory 202 is modified so as to increase in luminance only the adjacent pixels outside the boundary of an image of a bream B which is a specified object. The modulated-light emitter 104 enhances the luminance of adjacent pixels outside the boundary of the image of the bream B, based on the modified luminance information.

As is evident from the above, in the present embodiment, a portion of the computer 220 which is assigned to implement the steps S304 and S305 illustrated in FIG. 17 constitutes an example of the "image processor" set forth in the above mode (37).

Figure 18:
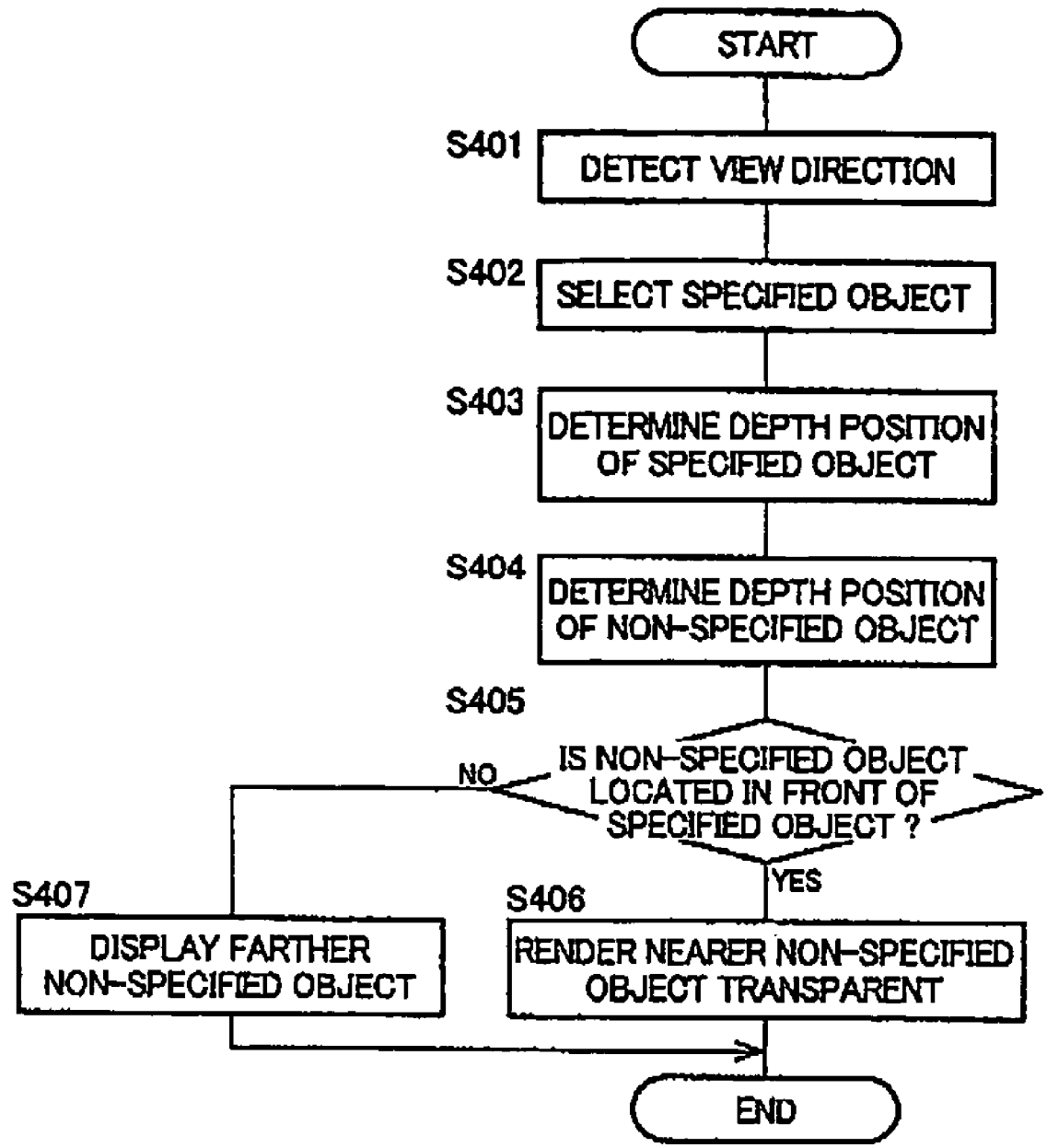
FIG. 18 is a flow chart schematically illustrating an image processing program executed by a computer 220 of a retinal scanning display 200 constructed according to a sixth embodiment of the present invention.

Referring next to FIG. 18, a sixth embodiment of the present invention will be described. The present embodiment is different from the second or third embodiment, only with respect to elements related to image processing for displaying a specified object more clearly than a non-specified object, and the present embodiment is common to the second or third embodiment with respect to other elements.

In view of this, for the illustrative purposes of the present embodiment, only the different elements of the present embodiment from the second or third embodiment will be described in greater detail, while the common elements of the present embodiment to those of the second or third embodiment will be referenced the same reference numerals or the same names, without redundant description or illustration.

In the second or third embodiment, a specified object is highlighted by increasing the luminance of the specified object. In contrast, in the present embodiment, in the presence of a non-specified object in front of a specified object, both belonging to a plurality of objects to be displayed together, the non-specified object is displayed transparently. This allows the viewer to clearly visually perceive the specified object, without visual obstruction by the non-specified object, despite that the non-specified object is planed to be present in front of the specified object.

For performing the above-described image processing, an image processing program schematically illustrated in FIG. 18 has been stored in the ROM 224. This image processing program will be described below, such that, for the common steps of this image processing program to those of the image processing program illustrated in FIG. 14, the corresponding step numbers will be referred to instead of redundant description.

Each cycle of execution of this image processing program illustrated in FIG. 18 begins with a step S401 to detect a viewer's view direction, in the similar manner with that of the step S101. The step S401 is followed by a step S402 to select as a specified object, one of a plurality of objects being displayed together, on which the viewer is focusing, in the similar manner with that of the step S102.

The step S402 is followed by a step S403 to determine the Z coordinate value indicative of the depth position of the selected specified object, in the similar manner with that of the step S103. The step S403 is followed by a step S404 to determine the Z coordinate value indicative of a depth position at which each of remaining or non-specified objects displayed together with the specified object is to be displayed.

The step S404 is followed by a step S405 to determine whether or not each non-specified object is planed to be displayed in front of the specified object, based on comparisons between the Z coordinate value corresponding to each non-specified object, and the Z coordinate value corresponding to the specified object.

If a current one of the non-specified objects is to be displayed in front of the specified object, then the determination of the step S405 becomes affirmative "YES," and the color information corresponding to the current non-specified object is altered to allow the current non-specified object to be displayed transparently. Then, one cycle of execution of this image processing program is terminated.

In contrast, if the current non-specified object is not to be displayed in front of the specified object, then the determination of the step S405 becomes negative "NO," and a step S407 follows not to alter the color information, for allowing the current non-specified object planed to be displayed farther from the viewer than the specified object, to be displayed with unchanged or original color. Then, one cycle of execution of this image processing program is terminated.

More specifically, upon execution of this image processing program for an example illustrated in FIG. 15, the step S402 is implemented to select an image of the bream B as a specified object. The step S403 follows to determine the Z coordinate value indicative of a depth position at which the image of the bream B is to be displayed, based on the depth-position information corresponding to the image of the bream B.

The step S404 follows to determine the Z coordinate value indicative of a depth potion at which the image of the ray A, which is a non-specified object, is to be displayed, and the Z coordinate value indicative of a depth position at which the image of the coral C, which is another non-specified object, is to be displayed.

The step S405 follows to determine whether or not each of the image of the ray A and the image of the coral C is a non-specified object to be displayed in front of the image of the bream B, as a result of the comparison between the corresponding respective Z coordinate values and the Z coordinate value of the image of the bream B, which is a specified object.

In the example illustrated in FIG. 15, the image of the ray A is a non-specified object to be displayed in front of the image of the bream 5, and therefore, the determination of the step S405 becomes affirmative "YES." The step S406 then follows to alter the color information corresponding to the image of the ray A, so as to allow the image of the ray A to be displayed transparently.

In contrast, the image of the coral C is a non-specified object behind the image of the bream B, and therefore, the determination of the step S405 becomes negative "NO." The step S407 then follows to display the image of the coral C with an unchanged color.

As is evident from the above, in the present embodiment, a portion of the computer 220 which is assigned to implement the steps S404 through S406 illustrated in FIG. 18 constitutes an example of the "image processor" set forth in the above mode (38).

It is added that, the present invention may be alternatively practiced in an arrangement in which a front object (for the example illustrated in FIG. 15, the image of the ray A) to be displayed in front of a back object (for the example illustrated in FIG. 15, the image of the bream B) is displayed not transparently but semi-transparently.

This arrangement may be practiced in an exemplary mode in which a region within the boundary of the front object is displayed with a mixed color represented by mixing two colors in a predetermined color ratio, wherein these two colors are comprised of the color of the front object indicated by the original color information which has been previously stored in the external memory 202 in association with the front object, and the color of the back object indicated by the original color information which has been previously stored in the external memory 202 in association with the back object to be displayed behind the front object.

The color ratio may be defined as, for example, a ratio of stimulus values between the original color of the front object and the original color of the back object, and such a ratio may be set to, for example, 9:1.

Figure 19:
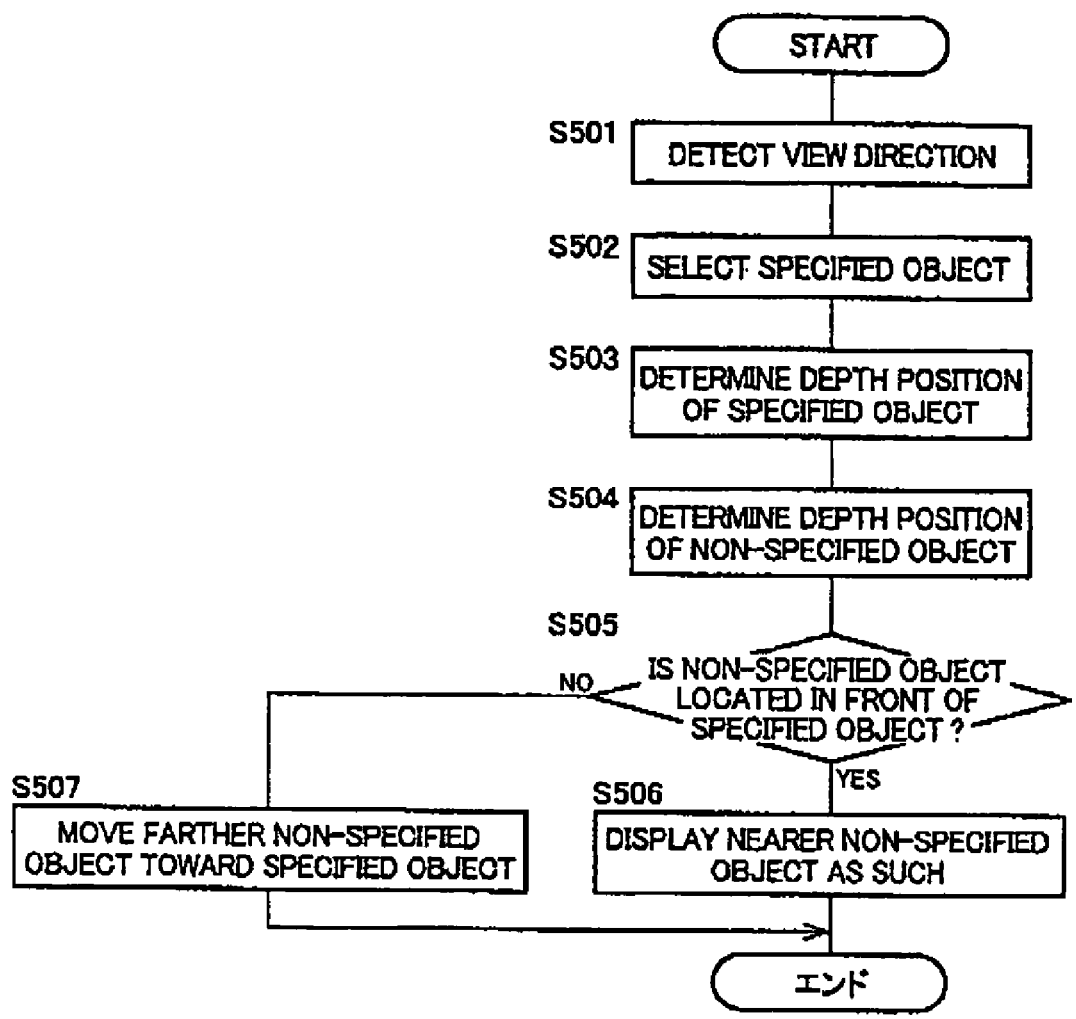
FIG. 19 is a flow chart schematically illustrating an image processing program executed by a computer 220 of a retinal scanning display 200 constructed according to a seventh embodiment of the present invention.

Referring next to FIG. 19, a seventh embodiment of the present invention will be described. The present embodiment is different from the sixth embodiment, only with respect to elements related to image processing for displaying a specified object more clearly than a non-specified object, and the present embodiment is common to the sixth embodiment with respect to other elements.

In view of this, for the illustrative purposes of the present embodiment, only the different elements of the present embodiment from the sixth embodiment will be described in greater detail, while the common elements of the present embodiment to those of the sixth embodiment will be referenced the same reference numerals or the same names, without redundant description or illustration.

In the sixth embodiment, a first non-specified object to be displayed in front of a specified object is displayed transparently, while a second non-specified object to be displayed behind the specified object is displayed with an unchanged or original color.

In contrast, in the present embodiment, a first non-specified object to be displayed in front of a specified object is displayed at an unchanged or original depth position, while a second non-specified object to be displayed behind the specified object is displayed at a depth position closer to the specified object than an original depth position of the second non-specified object.

For performing the above-described image processing, an image processing program schematically illustrated in FIG. 19 has been stored in the ROM 224. This image processing program will be described below, such that, for the common steps of this image processing program to those of the image processing program illustrated in FIG. 18, the corresponding step numbers will be referred to instead of redundant description.

Each cycle of execution of this image processing program illustrated in FIG. 19 begins with a step S501 to detect a viewer's view direction, in the similar manner with that of the step S401. The step S501 is followed by a step S502 to select as a specified object, one of a plurality of objects being displayed together, on which the viewer is focusing, in the similar manner with that of the step S402.

The step S502 is followed by a step S503 to determine the Z coordinate value indicative of the depth position of the selected specified object, in the similar manner with that of the step S403. The step S503 is followed by a step S504 to determine the Z coordinate value indicative of a depth position at which each of remaining or non-specified objects displayed together with the specified object is to be displayed, in the similar manner with that of the step S404.

The step S504 is followed by a step S505 to determine whether or not each non-specified object is planed to be displayed in front of the specified object, based on comparisons between the Z coordinate value corresponding to each non-specified object, and the Z coordinate value corresponding to the specified object, in the similar manner with that of the step S405.

If a current one of the non-specified objects is to be displayed in front of the specified object, then the determination of the step S505 becomes affirmative "YES," and a step S506 follows not to alter the depth-position information corresponding to the current non-specified object, for allowing the current non-specified object planed to be displayed in front of the specified object, to be displayed at an unchanged or original depth position. Then, one cycle of execution of this image processing program is terminated.

In contrast, if the current non-specified object is not to be displayed in front of the specified object, then the determination of the step S505 becomes negative "NO," and a step S507 follows to alter the depth-position information corresponding to the current non-specified object, for allowing the current non-specified object planed to be displayed farther from the viewer than the specified object, to be displayed at a depth position closer to the specified object than an original depth position of the current non-specified object. Then, one cycle of execution of this image processing program is terminated.

More specifically, upon execution of this image processing program for an example illustrated in FIG. 15, the step S502 is implemented to select an image of the bream B as a specified object. The step S503 follows to determine the Z coordinate value indicative of a depth position at which the image of the bream B is to be displayed, based on the depth-position information corresponding to the image of the bream B.

The step S504 follows to determine the Z coordinate value indicative of a depth potion at which the image of the ray A, which is a non-specified object, is to be displayed, and the Z coordinate value indicative of a depth position at which the image of the coral C, which is another non-specified object, is to be displayed.

The step S505 follows to determine whether or not each of the image of the ray A and the image of the coral C is a non-specified object to be displayed in front of the image of the bream B, as a result of the comparison between the corresponding respective Z coordinate values and the Z coordinate value of the image of the bream B, which is a specified object.

In the example illustrated in FIG. 15, the image of the ray A is a non-specified object to be displayed in front of the image of the bream B, and therefore, the determination of the step S505 becomes affirmative "YES." The step S506 then follows to display the image of the ray A at an unchanged depth position, which is to say, an original depth position. In contrast, the image of the coral C is a non-specified object to be displayed behind the image of the bream B, and therefore, the determination of the step S505 becomes negative "NO." The computer 220 proceeds to the step S507

The step S507 is implemented to alter the depth-position information corresponding to the image of the coral C, for allowing the image of the coral C to be displayed at a depth position altered to become closer to the image of the bream B than used to be.

The wavefront-curvature modulator 208 modulates the curvature of wavefront of the image light for displaying the image of the coral C, based on the altered depth-position information. As a result, the image of the coral C is displayed at a depth position altered to become closer to the image of the bream B than an original depth position of the image of the coral C.

As is evident from the above, in the present embodiment, a portion of the computer 220 which is assigned to implement the steps S504 through S507 illustrated in FIG. 19 constitutes an example of the "displayed-object-position modifier" set forth in the above mode (40), and an example of the "displayed-object-position modifier" set forth in the above mode (41). In addition, the modulated-light emitter 204 constitutes an example of the "light-beam emitter" set forth in the above mode (41), and the wavefront-curvature modulator 208 constitutes an example of the "wavefront-curvature modulator" set forth in the same mode.

Further, in the present embodiment, a portion of the computer 220 which is assigned to implement the steps S503 and S504 illustrated in FIG. 19 constitutes an example of the "depth-position sensor" set forth in the above mode (42), and a portion of the computer 220 which is assigned to implement the steps S505 and 5507 illustrated in FIG. 19 constitutes an example of the "displayed-object-position modifier" set forth in the same mode.

Figure 20:
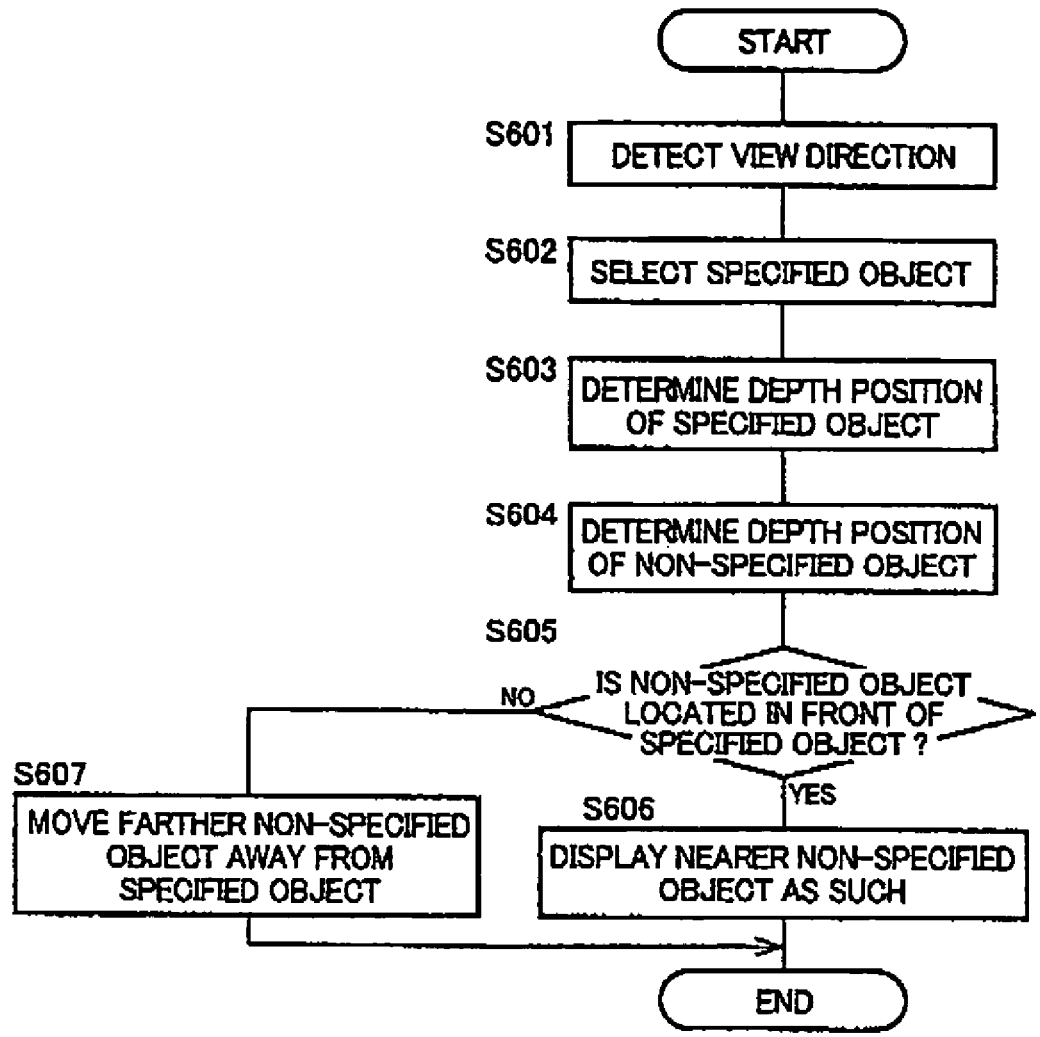
FIG. 20 is a flow chart schematically illustrating an image processing program executed by a computer 220 of a retinal scanning display 200 constructed according to a eighth embodiment of the present invention.

Referring next to FIG. 20, an eighth embodiment of the present invention will be described. The present embodiment is different from the seventh embodiment, only with respect to elements related to image processing for displaying a specified object more clearly than a non-specified object, and the present embodiment is common to the seventh embodiment with respect to other elements.

In view of this, for the illustrative purposes of the present embodiment, only the different elements of the present embodiment from the seventh embodiment will be described in greater detail, while the common elements of the present embodiment to those of the seventh embodiment will be referenced the same reference numerals or the same names, without redundant description or illustration.

In the seventh embodiment, a non-specified object to be displayed farther from the viewer than a specified object is displayed at a depth position closer to the specified object than the original depth position. In contrast, in the present embodiment, a non-specified object to be displayed farther from the viewer than a specified object is displayed at a depth position farther from the specified object than the original depth position.

For performing the above-described image processing, an image processing program schematically illustrated in FIG. 20 has been stored in the ROM 224. This image processing program will be described below, such that, for the common steps of this image processing program to those of the image processing program illustrated in FIG. 19, the corresponding step numbers will be referred to instead of redundant description.

Each cycle of execution of this image processing program illustrated in FIG. 20 begins with a step S601 to detect a viewer's view direction, in the similar manner with that of the step S501. The step S601 is followed by a step S602 to select as a specified object, one of a plurality of objects being displayed together, on which the viewer is focusing, in the similar manner with that of the step S502.

The step S602 is followed by a step S603 to determine the Z coordinate value indicative of the depth position of the selected specified object, in the similar manner with that of the step S503. The step S603 is followed by a step S604 to determine the Z coordinate value indicative of a depth position at which each of remaining or non-specified objects displayed together with the specified object is to be displayed, in the similar manner with that of the step S504.

The step S604 is followed by a step S605 to determine whether or not each non-specified object is planed to be displayed in front of the specified object, based on comparisons between the Z coordinate value corresponding to each non-specified object, and the Z coordinate value corresponding to the specified object, in the similar manner with that of the step S505.

If a current one of the non-specified objects is to be displayed in front of the specified object, then the determination of the step S605 becomes affirmative "YES," and a step S606 follows not to alter the depth-position information corresponding to the current non-specified object, for allowing the current non-specified object planed to be displayed in front of the specified object, to be displayed at an unchanged or original depth position. Then, one cycle of execution of this image processing program is terminated.

In contrast, if the current non-specified object is not to be displayed in front of the specified object, then the determination of the step S605 becomes negative "NO," and a step S607 follows to alter the depth-position information corresponding to the current non-specified object, for allowing the current non-specified object planed to be displayed farther from the viewer than the specified object, to be displayed at a depth position farther from the specified object than an original depth position of the current non-specified object. Then, one cycle of execution of this image processing program is terminated.

More specifically, upon execution of this image processing program for an example illustrated in FIG. 15, the step S602 is implemented to select an image of the bream B as a specified object. The step S603 follows to determine the Z coordinate value indicative of a depth position at which the image of the bream B is to be displayed, based on the depth-position information corresponding to the image of the bream B.

The step S604 follows to determine the Z coordinate value indicative of a depth potion at which the image of the ray A, which is a non-specified object, is to be displayed, and the z coordinate value indicative of a depth position at which the image of the coral C, which is another non-specified object, is to be displayed.

The step S605 follows to determine whether or not each of the image of the ray A and the image of the coral C is a non-specified object to be displayed in front of the image of the bream B, as a result of the comparison between the corresponding respective Z coordinate values and the Z coordinate value of the image of the bream B, which is a specified object.

In the example illustrated in FIG. 15, the image of the ray A is a non-specified object to be displayed in front of the image of the bream B, and therefore, the determination of the step S605 becomes affirmative "YES." The step S606 then follows to display the image of the ray A at an unchanged depth position, which is to say, an original depth position. In contrast, the image of the coral C is a non-specified object behind the image of the bream B, and therefore, the determination of the step S605 becomes negative "NO." The computer 220 proceeds to the step S607

The step S607 is implemented to alter the depth-position information corresponding to the image of the coral C, for allowing the image of the coral C to be displayed at a depth position altered to become farther from the image of the bream B than used to be.

The wavefront-curvature modulator 208 modulates the curvature of wavefront of the image light for displaying the image of the coral C, based on the altered depth-position information. As a result, the image of the coral C is displayed at a depth position altered to become farther from the image of the bream B than an original depth position of the image of the coral C.

As is evident from the above, in the present embodiment, a portion of the computer 220 which is assigned to implement the steps S604 through S607 illustrated in FIG. 20 constitutes an example of the "displayed-object-position modifier" set forth in the above mode (40), and an example of the "displayed-object-position modifier" set forth in the above mode (41).

Further, in the present embodiment, a portion of the computer 220 which is assigned to implement the steps S603 and S604 illustrated in FIG. 20 constitutes an example of the "depth-position sensor" set forth in the above mode (43), and a portion of the computer 220 which is assigned to implement the steps S605 and S607 illustrated in FIG. 20 constitutes an example of the "displayed-object-position modifier" set forth in the same mode.

Figure 21:
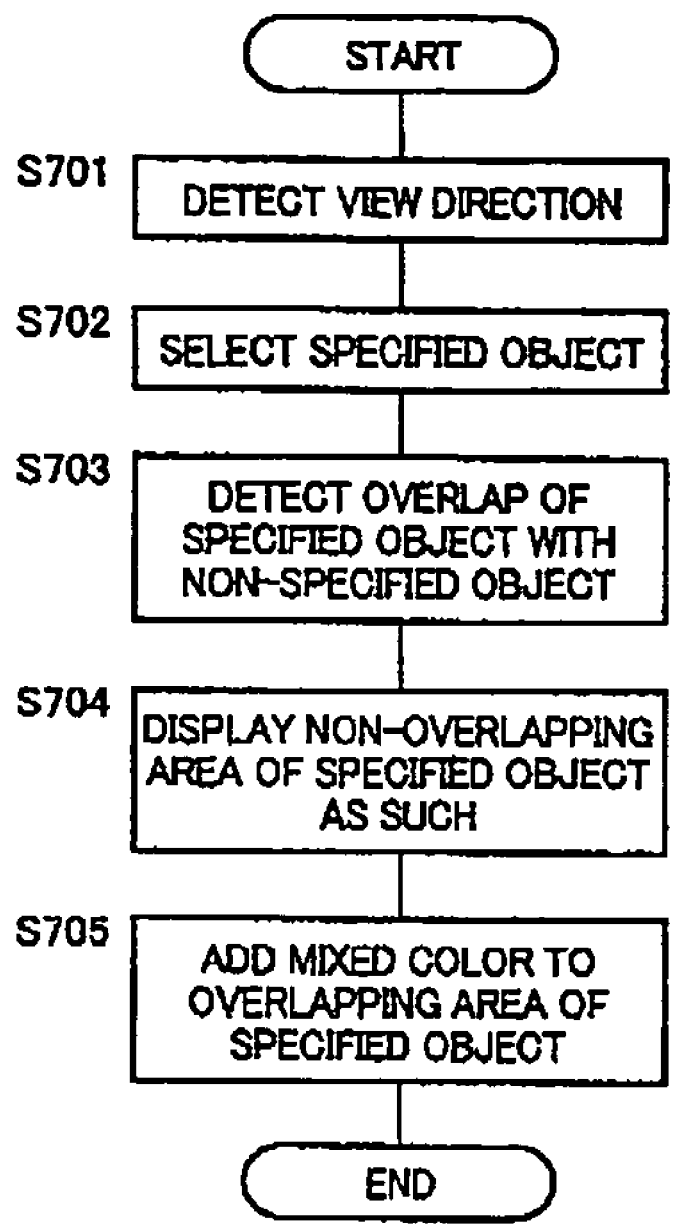
FIG. 21 is a flow chart schematically illustrating an image processing program executed by a computer 220 of a retinal scanning display 200 constructed according to a ninth embodiment of the present invention.

Referring next to FIG. 21, a ninth embodiment of the present invention will be described. The present embodiment is different from the second or third embodiment, only with respect to elements related to image processing for displaying a specified object more clearly than a non-specified object, and the present embodiment is common to the second or third embodiment with respect to other elements.

In view of this, for the illustrative purposes of the present embodiment, only the different elements of the present embodiment from the second or third embodiment will be described in greater detail, while the common elements of the present embodiment to those of the second or third embodiment will be referenced the same reference numerals or the same names, without redundant description or illustration.

In the second or third embodiment, a determination is not made as to whether or not a specified object has a portion to be displayed in overlapping relation with a non-specified object located in front of the specified object. In contrast, in the present embodiment, such a determination is made. Further, in the present embodiment, there is displayed semi-transparently an overlapping portion of a specified object with a non-specified object when displayed.

More specifically, in the present embodiment, the color of an overlapping portion of a specified object with a non-specified object when displayed, is changed from its original color to a mixed color represented by mixing an original color of the specified object and an original color of the non-specified object in a predetermined color ratio.

For performing the above-described image processing, an image processing program schematically illustrated in FIG. 21 has been stored in the ROM 224. This image processing program will be described below, such that, for the common steps of this image processing program to those of the image processing program illustrated in FIG. 14, the corresponding step numbers will be referred to instead of redundant description.

Each cycle of execution of this image processing program illustrated in FIG. 21 begins with a step S701 to detect a viewer's view direction, in the similar manner with that of the step S101. The step S701 is followed by a step S702 to select as a specified object, one of a plurality of objects being displayed together, on which the viewer is focusing, based on the detected view direction.

Figure 22:
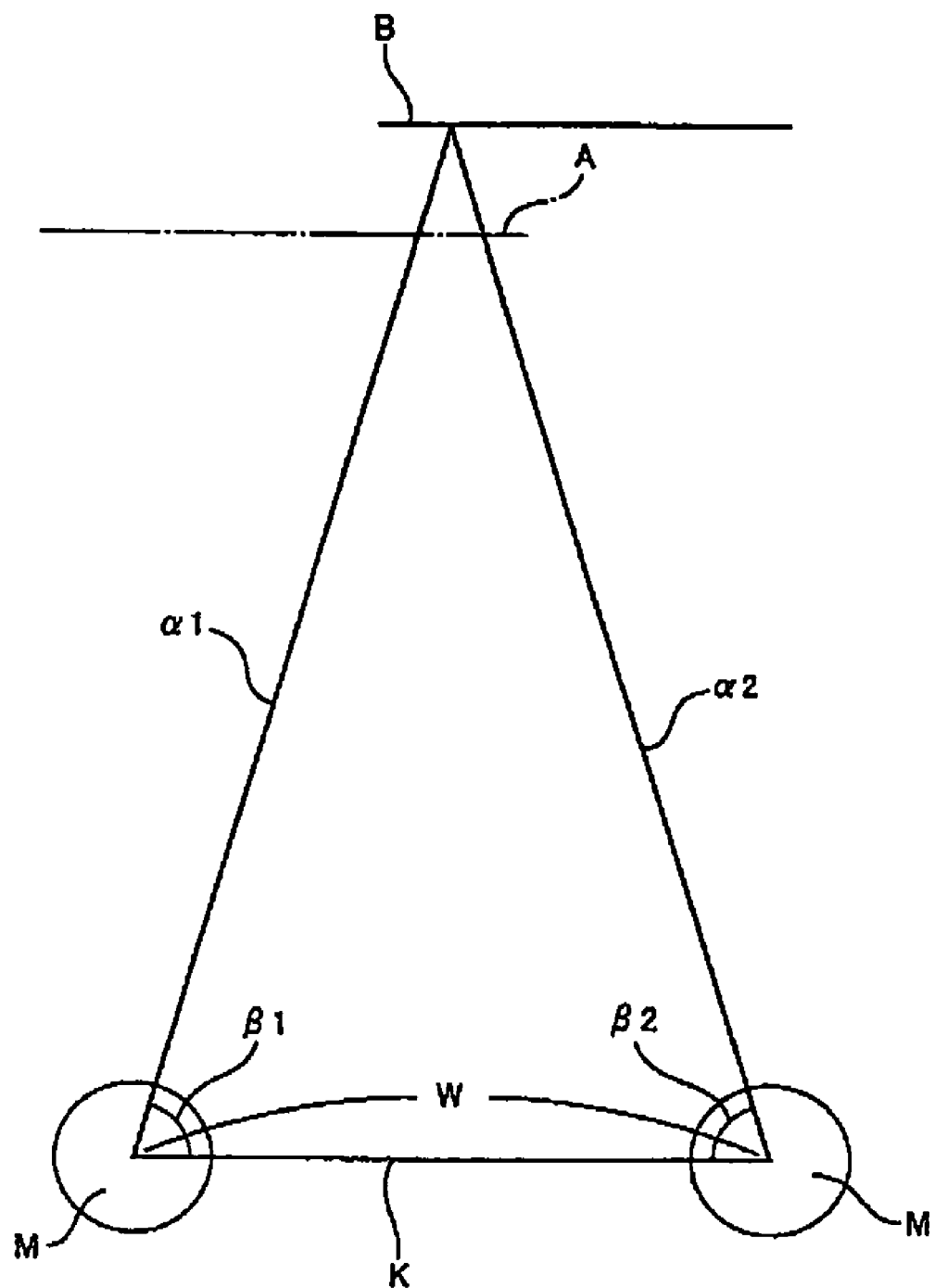
FIG. 22 is a top plan view for explaining how a step S702 depicted in FIG. 21 is implemented.

In the step S702, as illustrated in FIG. 22, firstly, the positions of the gaze points for viewer's both eyes (including at least a lateral position and a depth position) are measured, based on angles β1 and β2 defining corresponding respective view lines α1 and α2 for both eyes M and M, and a distance W between both eyes M and M, using the principle of triangulation. In FIG. 22, the "K" denotes a base line interconnecting both eyes M and M, and the angles β1 and β2 are defined as angles formed between the base line K and the view lines α1 and α2 for both eyes M and M, respectively. The distance W may be previously stored in the ROM 224 (or otherwise, the RAM 226) as a fixed value.

The step S702 is further implemented to select as a specified object, one of a plurality of objects at which the measured gaze point has been located, based on the aforementioned geometries respectively corresponding to these objects.

Figure 23:
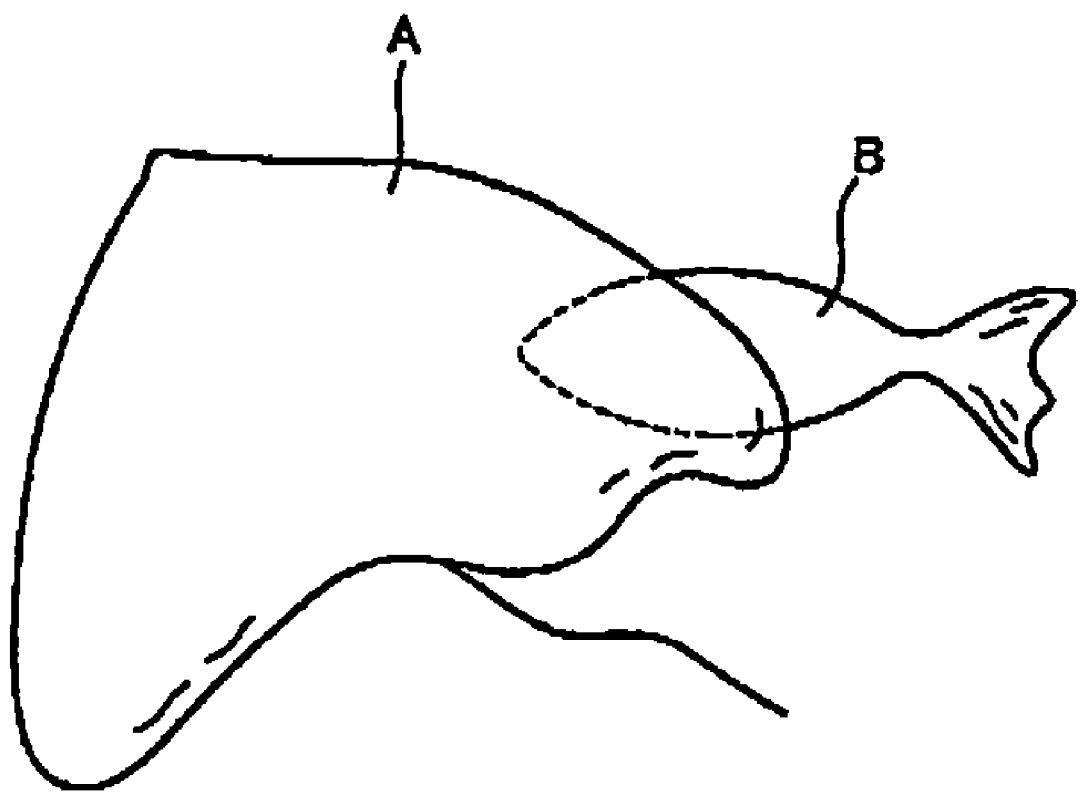
FIG. 23 is a front view illustrating an example of a display image for explaining the image processing program depicted in FIG. 21.

FIG. 22 illustrates in top plan view the images of the ray A and the bream B, in association with the example illustrated in FIG. 15. FIG. 23 illustrates in front view these images of the ray A and the bream B. As illustrated in FIG. 23, a portion of the image of the ray A overlaps with the image of the bream B as viewed in the viewer's view direction, and this arrangement is illustrated in FIG. 22 in top plan view. FIG. 22 also illustrates that the viewer's gaze point is located not on the image of the ray A but on the image of the bream B. In this example, the image of the bream B is selected as a specified object.

It is added that, although the step S702 is implemented to automatically select a specified object using triangulation, the present invention may be alternatively practiced in an exemplary arrangement in which, in response to a viewer's manual operation for selecting a specified object (e.g., a viewer's mouse click on a separate screen (e.g., a monitor screen) in which a specified object is being displayed, at the specified object), the specified object is manually selected.

The S702 is followed by a step S703 to geometrically determine an overlapping portion of the selected specified object with a non-specified object located in front of the specified object, based on the geometries represented by the depth-position information and the position-on-plane information both corresponding to the specified object; the geometries represented by the depth-position information and the position-on-plane information both corresponding to the non-specified object; and the detected view direction.

The step S703 is followed by a step S704 to display a remaining portion of the specified object, which is not to be displayed in overlapping relation with the non-specified object, in an unchanged color, which is to say, an original color.

The step S704 is followed by a step S705 to determine a mixed color represented by mixing the color of the specified object, the color of the non-specified object to be displayed in front of and in overlapping relation with the specified object, in a predetermined color ratio.

The step S705 is further implemented to alter the color information corresponding to the overlapping portion of the specified object with the non-specified object when displayed, to reflect the determined mixed color. As a result, the overlapping portion of the specified object with the non-specified object is displayed in a color which has been changed from its original color into the determined mixed color.

Then, one cycle of execution of this image processing program is terminated.

More specifically, upon execution of this image processing program for an example illustrated in FIGS. 22 and 23, the step S702 is implemented to select an image of the bream B as a specified object. The step S703 follows to detect that a portion of the image of the bream B overlaps with the image of the ray A, which is a non-specified object located in front of the image of the bream B.

The step S704 follows to cause the controller 212 to control the wavefront-curvature modulator 208, to thereby display the image of the bream B at its original depth position which has been previously stored in the external memory 202.

In the step S704, further, for a non-overlapping portion of the image of the bream B with the image of the ray A, the color information which has been previously stored in the external memory 202 is not altered, to thereby display the non-overlapping portion in its original color which has been previously stored in the external memory 208.

The step S705 follows to alter the color information which has been previously stored in the external memory 202, to thereby display the overlapping portion of the image of the bream B with the image of the ray A in a mixed color represented by mixing the original color of the image of the bream B which has been previously stored in the external memory 202, and the original color of the image of the ray A which has been previously stored in the external memory 202, in a predetermined color ratio.

As stated above, in the present embodiment, an overlapping portion of the image of the bream B with the image of the ray A is displayed in a mixed color represented by mixing the original color of the image of the bream B and the original color of the image of the ray A, resulting in the viewer's clearer visual perception of the image of the bream B, without visual obstruction by the image of the ray A, despite that the image of the bream B is located behind the image of the ray A.

It is added that, in the step S705, the aforementioned color ratio may be set to any ratio. The color ratio may be defined as, for example, a ratio of stimulus values between the original color of a specified object and the original color of a non-specified object located in front of the specified object, and the ratio may be set to, for example, 9:1.

It is further added that, in the step S705, if a non-specified object located in front of and in overlapping relation with a specified object is planned to be displayed semi-transparently, the aforementioned color ratio may be unchanged from an original color ratio between the original color of the specified object and the original color of the non-specified object.

It is still further added that, as illustrated in FIG. 22, where a back object (i.e., the image of the ray A, depicted in dot-dash lines) is located behind and in overlapping relation with a front object (i.e., the image of the bream B, depicted in solid lines), only the detection of the viewer's view direction would not allow correctly identifying one of those objects on which the viewer is focusing.

In contrast, in the present embodiment, not only the viewer's view direction but also the depth position of the viewer's gaze point are detected, resulting in correctly identifying one of objects overlapping with each other, on which the viewer is focusing.

As is evident from the above, in the present embodiment, the modulated-light emitter 204 constitutes an example of the "light beam emitter" set forth in the above mode (44), and the view-direction detecting device 204 and a portion of the computer 220 which is assigned to implement the steps S701 and S703 illustrated in FIG. 21 corporate to constitute an example of the "overlapping-object detector" set forth in the same mode.

Further, in the present embodiment, a portion of the computer 220 which is assigned to implement the step S705 illustrated in FIG. 21 constitutes an example of the "overlapping-object detector" set forth in the above mode (44), an example of the "second displaying block" set forth in the above mode (46), and an example of the "color-ratio modifier" set forth in the above mode (47).

Figure 24:
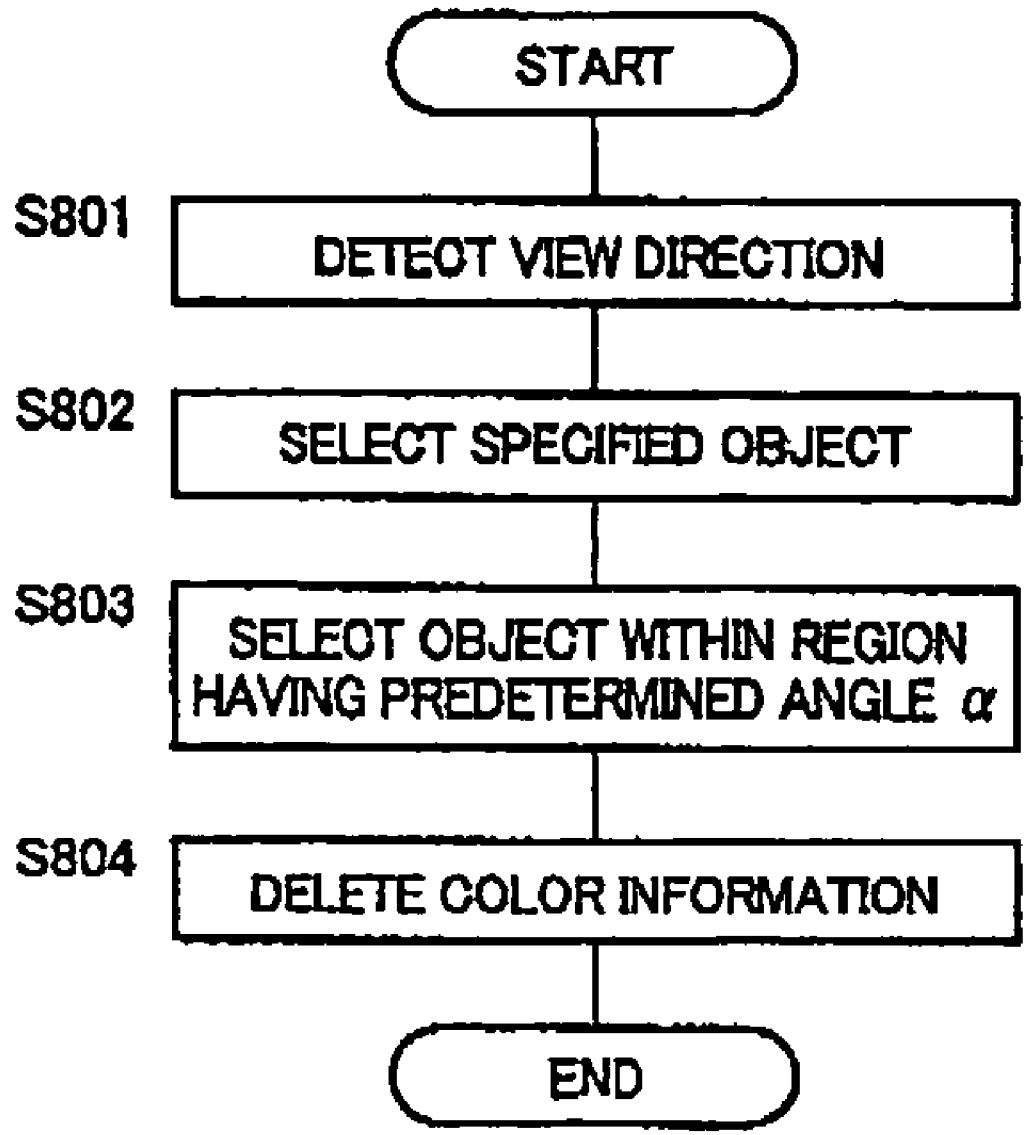
FIG. 24 is a flow chart schematically illustrating an image processing program executed by a computer 220 of a retinal scanning display 200 constructed according to a tenth embodiment of the present invention.

Referring next to FIG. 24, a tenth embodiment of the present invention will be described. The present embodiment is different from the second or third embodiment, only with respect to elements related to image processing for displaying a specified object more clearly than a non-specified object, and the present embodiment is common to the second or third embodiment with respect to other elements.

In view of this, for the illustrative purposes of the present embodiment, only the different elements of the present embodiment from the second or third embodiment will be described in greater detail, while the common elements of the present embodiment to those of the second or third embodiment will be referenced the same reference numerals or the same names, without redundant description or illustration.

Where a specified object and a non-specified object coexist within a region forming a predetermined visual angle, while the second or third embodiment is practiced so as not to display the non-specified object transparently, the present embodiment is practiced so as to display the non-specified object transparently.

For performing the above-described image processing, an image processing program schematically illustrated in FIG. 24 has been stored in the ROM 224. This image processing program will be described below, such that, for the common steps of this image processing program to those of the image processing program illustrated in FIG. 14, the corresponding step numbers will be referred to instead of redundant description.

Each cycle of execution of this image processing program illustrated in FIG. 24 begins with a step S801 to detect a viewer's view direction, in the similar manner with that of the step S101. The step S801 is followed by a step S802 to select as a specified object, one of a plurality of objects being displayed together, on which the viewer is focusing, based on the detected view direction, in the similar manner with that of the step S702.

The S802 is followed by a step S803 to select at least one of the non-specified objects (the plurality of objects excepting the specified object) which is located within a region forming a predetermined visual angle α with respect to the detected view direction.

The step S803 is followed by a step S804 to delete from the RAM 226, the color information corresponding to the selected non-specified object. As a result, a non-specified object which was planed to be displayed in the vicinity of the specified object is displayed transparently, meaning disappearance of the non-specified object from the image screen. This allows the viewer to more clearly visually perceive the specified object, without visual obstruction by any adjacent non-specified objects.

Then, one cycle of execution of this image processing program is terminated.

The aforementioned visual angle α may be pre-set, for example, on the basis of an angle-of-view required for the viewer to fully view a specified object, or may be set to a value n (n: an integer) times the required angle-of-view. In addition, the visual angle α may be pre-set to any value according to the viewer's instruction.

Figure 25:
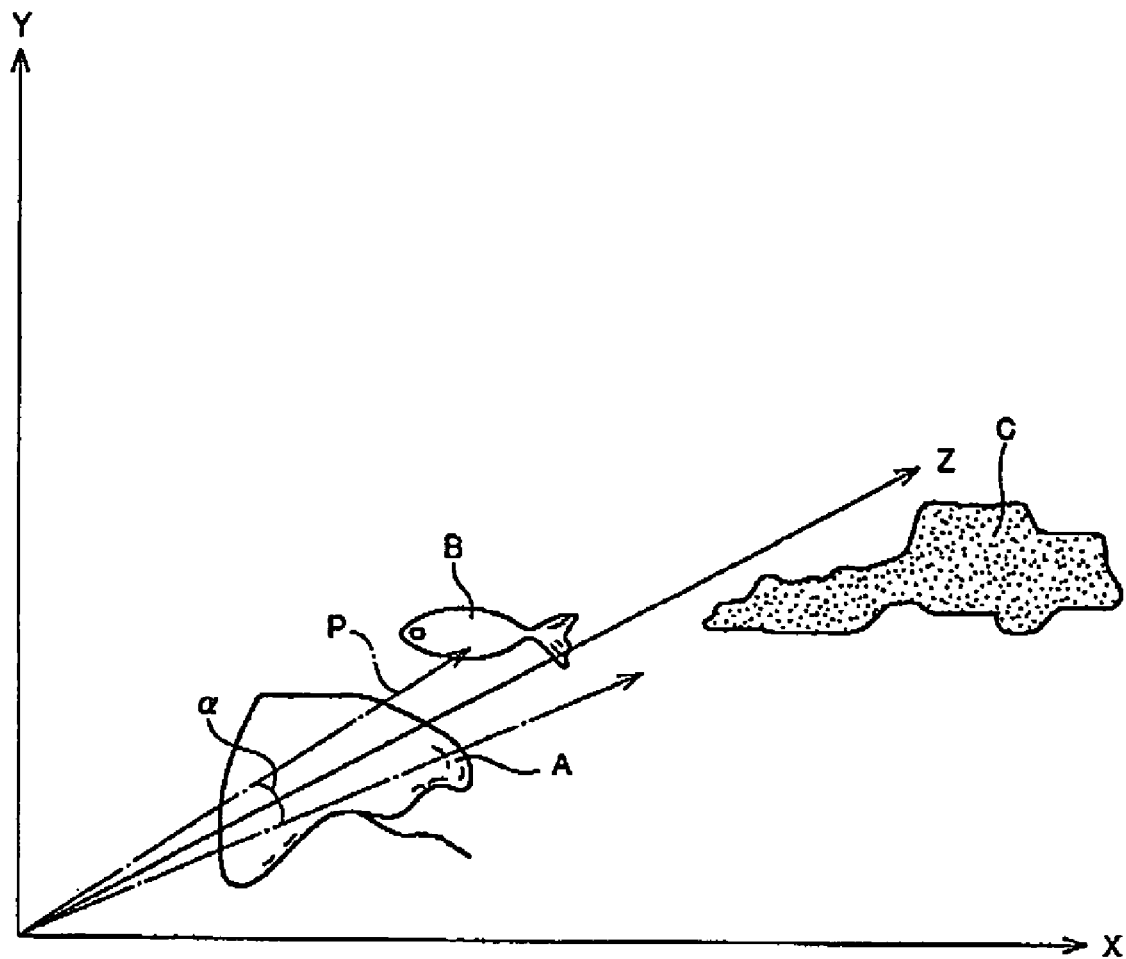
FIG. 25 is a front view illustrating an example of a display image for explaining the image processing program depicted in FIG. 24.

As illustrated in FIG. 25, upon execution of this image processing program for an example illustrated in FIG. 15, the step S802 is implemented to select an image of the bream B as a specified object.

The step S803 follows to select at least one non-specified object located within the aforementioned region. The region is defined as a region forming the predetermined visual angle α with respect to a view direction P. The visual angle α is pre-set to, for example, a value n (n: an integer) times an angle-of-view required for the viewer to fully view the image of the bream B. An example of the value is 10 deg., and an example of the required angle-of-view is 5 deg. In an example illustrated in FIG. 25, the image of the ray A is selected as a non-specified object located within the region forming the thus-pre-set visual angle α.

The step S804 follows to display the images of the bream b and the coral C, without display of the image of the ray A.

As is evident from the above, in the present embodiment, a portion of the computer 220 which is assigned to implement the steps S803 and S804 illustrated in FIG. 24 constitutes an example of the "image processor" set forth in the above mode (39).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for projecting light onto a retina of a viewer, to thereby allow the viewer to perceive a display object via a virtual image, the apparatus comprising:
   an emitter emitting light;
   a modulator modulating the light;
   a display unit outputting the modulated light to the retina of the viewer through an exit of the display unit, to thereby display in an image display region an image representative of the display object in the form of a virtual image, the display unit being mounted on a head of the viewer in operation;

a detector detecting a relative position of a to-be-detected segment of a human body of the viewer, with respect to a reference segment of the human body, the to-be-detected segment being selected from a plurality of segments constituting the human body which are displaceable relative to each other, for detection of a motion of the to-be-detected segment, and the reference segment being selected from the plurality of segments for establishment of a reference position related to the human body; and a controller controlling the emitter and the modulator so that the image is displayed in the image display region, the controller performing display control which includes at least one of control of a display/non-display status of the image, and control of a display position of the image, based on the detected relative position.

2. The apparatus according to claim 1, wherein the detector includes first and second portions which are displaceable relative to each other, the first portion being attached to the to-be-detected segment for allowing integral movement therewith, the second portion being attached to the reference segment for allowing integral movement therewith, and wherein the detector further includes a detecting device detecting a relative position between the first and second portions.

3. The apparatus according to claim 2, wherein one of the first and second portions functions as a signal generator generating a detection signal for use in detection of the relative position between the first and second portions, and wherein a remainder of the first and second portions functions as a receiver receiving the generated detection signal which propagates through space.

4. An apparatus for projecting light onto a retina of a viewer, to thereby allow the viewer to perceive a display object via a virtual image, the apparatus comprising:

an emitter emitting light;

a modulator modulating the light;

a display unit outputting the modulated light to the retina of the viewer through an exit of the display unit, to thereby display in an image display region an image representative of the display object in the form of a virtual image, the display unit being mounted on a head of the viewer in operation; and a controller controlling the emitter and the modulator so that the image is displayed in the image display region;

wherein the controller detects a relative motion of the viewer with respect to a position of the viewer by treating the position of the viewer as a position reference for display, performs display control which includes at least one of control of a display/non-display status of the image, and control of a display position of the image, in accordance with the detected relative motion, and activates the display control, upon satisfaction of the motion of the viewer with a predetermined condition, based on the detected relative.

5. The apparatus according to claim 1, wherein the plurality of segments include the head, and an upper limb, a lower limb, and a middle, of the viewer, wherein the head, optionally with at least one of the upper limb, and the lower limb, is assigned as the to-be-detected segment, and wherein the middle is assigned as the reference segment.

6. The apparatus according to claim 1, wherein the controller controls the emitter and the modulator so as to allow the viewer to perceive the image at a position predetermined with respect to the reference segment.

7. An apparatus for projecting light onto a retina of a viewer, to thereby allow the viewer to perceive a display object via a virtual image, the apparatus comprising:

an emitter emitting light;

a modulator modulating the light;

a display unit outputting the modulated light to the retina of the viewer through an exit of the display unit, to thereby display in an image display region an image representative of the display object in the form of a virtual image, the display unit being mounted on a head of the viewer in operation; and a controller that:

controls the emitter and the modulator so that the image is displayed in the image display region;

detects a relative motion of the viewer with respect to a position of the viewer by treating the position of the viewer as a position reference for display, and performs display control which includes at least one of control of a display/non-display status of the image, and control of a display position of the image, in accordance with the detected relative motion;

uses, for allowing the viewer to perceive the image in the image display region, (a) a definition coordinate system for use in defining the display object, and (b) a display coordinate system for use in defining the image to be displayed in the image display region, the display coordinate system being fixed with respect to the display unit;

detects a relative relationship between a position and an orientation of the head of the viewer and a reference coordinate system which is predetermined so as to be related to the human body;

converts definition data which defines the display object with respect to the definition coordinate system, into display data for displaying the image with respect to the display coordinate system, so as to reflect the detected relative relationship; and controls the emitter and the modulator based on the display data.

8. The apparatus according to claim 7, wherein the controller converts display-object data defining the display object with respect to the definition coordinate system, into the display data defined in the display coordinate system, and wherein the definition coordinate system is fixed with respect to the display coordinate system.

9. The apparatus according to claim 7, wherein the controller converts display-object data defining the display object with respect to the definition coordinate system, into the display data defined in the display coordinate system, and wherein the definition coordinate system is fixed with respect to the reference coordinate system.

10. The apparatus according to claim 7, wherein the controller converts display-object data defining the display object with respect to the definition coordinate system, into the display data defined in the display coordinate system, and wherein the definition coordinate system is fixed with respect to a third coordinate system which is different from the reference coordinate system and the display coordinate system, and which is related to any one of a plurality of segments constituting the human body of the viewer.

11. The apparatus according to claim 7, wherein the reference coordinate system is defined using any one of (a) a combination of at least one set of position information indicative of at least one position of at least one point related to the human body, and at least two sets of orientation information indicative of orientations related to the at least one point;

(b) a combination of at least two sets of position information indicative of positions of at least two points related to the human body, and at least one set of orientation information indicative of at least one orientation related to at least one of the at least two points; and (c) a combination of at least three sets of position information indicative of positions of at least three points related to the human body.

12. The apparatus according to claim 7, wherein the reference coordinate system is defined using three sets of position information indicative of positions of three points related to a unitary segment of the human body.

13. The apparatus according to claim 7, wherein the reference coordinate system is defined using both two sets of position information indicative of positions of two points related to a unitary segment of the human body, and orientation information indicative of a direction in which gravity acts on one point related to the unitary segment.

14. The apparatus according to claim 1, wherein the controller selects any one of a plurality of display modes including a viewer-based display mode for use in displaying the image such that the viewer perceives the image at a position predetermined with respect to the reference segment, and a display-unit-based display mode for use in displaying the image such that the viewer perceives the image at a position predetermined with respect to a position of the display unit, and wherein the controller displays the image in accordance with the selected display mode.

15. The apparatus according to claim 14, wherein the controller selects any one of the plurality of display modes in response to a command from the viewer.

16. The apparatus according to claim 1, of a see-through type allowing the viewer to perceive the image representative of the display object such that the image is overlaid onto a real outside world.

17. The apparatus according to claim 1, of a retinal scanning type in which a beam of light is scanned on the retina of the viewer two-dimensionally, to thereby allow the viewer to perceive the image, wherein the modulator includes a wavefront-curvature modulating unit modulating a curvature of wavefront of the beam of light entering from the apparatus into a pupil of the viewer, on a frame-by-frame basis, for an image to be displayed which is made up of a succession of image frames, or on a sub-area-by-sub-area basis, for an image to be displayed which is made up of a succession of image frames, each of which is divided into a plurality of sub-areas.

18. The apparatus according to claim 1, wherein the image includes a plurality of objects which are displayed together in a stereoscopic manner, using a plurality of sets of image information including depth-position information for specifying a depth position of each object, and position-on-plane information for specifying a position of each object on a plane corresponding to the depth position of the same object, the apparatus further comprising:

a selector selecting one of the plurality of objects as a specified object; and an image processor performing image processing for modifying a display format in which the image is displayed, based on the depth-position information for the specified object which has been selected by the selector.

19. The apparatus according to claim 18, wherein the image processor performs the image processing such that the specified object which has been selected by the selector is displayed in a display format different from that of at least one non-specified object which is at least one remainder of the plurality of objects.

20. The apparatus according to claim 18, wherein the selector includes a specified-object detector detecting as the specified object a focused object which is one of the plurality of objects that the viewer is focusing on.

21. The apparatus according to claim 20, wherein the specified-object detector includes:

a view-direction detector detecting a view direction of the viewer; and a determining unit retrieving one of the plurality sets of image information which corresponds to the detected view direction, based on a detection result of the view-direction detector, the determining unit further determining the specified object based on the retrieved set of image information.

22. The apparatus according to claim 20, wherein the specified-object detector includes:

a view-direction detector detecting view directions of the viewer for left and right eyes of the viewer, respectively; and a calculator calculating a point at which the viewer has gazed, based on both the view directions for the left and right eyes detected by the view-direction detector, and a distance between the left and right eyes, the calculator further detecting the specified object based on a calculation result of the calculator.

23. The apparatus according to claim 18, further comprising a depth-position detector detecting the depth position of each object, based on the depth-position information, wherein the image processor performs the image processing such that the specified object, optionally with at least one separate object which is displayed at the same depth position as that of the specified object, is displayed in a display format different from that of at least one non-specified object which is displayed at a depth position different from that of the specified object.

24. The apparatus according to claim 18, wherein the image processor includes a section of varying a luminance of the specified object.

25. The apparatus according to claim 18, wherein the image processor includes a section of highlighting a boundary of the specified object.

26. The apparatus according to claim 18, wherein the image processor includes a section of adding a separate boundary image to the specified object along an outline of the specified object.

27. The apparatus according to claim 23, wherein the image processor includes a section of displaying transparently or semi-transparently a non-specified object located in front of the specified object.

28. A method of projecting light onto a retina of a viewer, to thereby allow the viewer to perceive a display object via a virtual image, the method comprising the steps of:

emitting light by an emitter;

modulating the light by a modulator;

causing a display unit to output the modulated light to the retina of the viewer through an exit of the display unit, to thereby display in an image display region an image representative of the display object in the form of a virtual image, the display unit being mounted on a head of the viewer in operation;

detecting a relative position of a to-be-detected segment of a human body of the viewer, with respect to a reference segment of the human body, the to-be-detected segment being selected from a plurality of segments constituting the human body which are displaceable relative to each other, for detection of a motion of the to-be-detected segment, and the reference segment being selected from the plurality of segments for establishment of a reference position related to the human body;

controlling the emitter and the modulator so that the image is displayed in the image display region; and performing display control which includes at least one of control of a display/non-display status of the image, and control of a display position of the image, based on the detected relative position.

* * * * *